United States Patent [19]

Peek et al.

[11] 3,806,663

[45] Apr. 23, 1974

[54] RADIO TELEPHONE SUBSCRIBER UNIT

[75] Inventors: Benjamin Roger Peek, Garland, Tex.; Hernando Javier Garcia, San Francisco, Calif.

[73] Assignee: Integrated Systems Technology, Inc., Garland, Tex.

[22] Filed: Mar. 7, 1972

[21] Appl. No.: 232,470

[52] U.S. Cl. .................................................. 179/41 A

[51] Int. Cl. ................................................ H04q 7/04

[58] Field of Search ............ 179/41 A; 325/55, 492, 325/64; 343/177

[56] References Cited

UNITED STATES PATENTS

| | | | |
|---|---|---|---|
| 2,571,031 | 10/1951 | Hansell | 325/492 |
| 3,351,714 | 11/1967 | Kunzelman et al. | 179/41 A |
| 3,387,270 | 6/1968 | Adlhoch et al. | 340/164 R |
| 3,458,664 | 7/1969 | Adloch et al. | 325/55 |
| 3,557,312 | 1/1971 | Vogelman et al. | 179/41 A |

*Primary Examiner*—William C. Cooper
*Assistant Examiner*—Thomas L. Kundert
*Attorney, Agent, or Firm*—Jack A. Kanz

[57] ABSTRACT

Disclosed is a radio telephone subscriber unit for communicating with a telephone company base terminal wherein control signals are transmitted between the base terminal and the subscriber unit for establishing a radio link-up therebetween. The subscriber unit can be operated in either an automatic or a manual mode. In the automatic mode, the control signals are transmitted by turning on and turning off discrete audio-frequency tones which are modulated onto radio-frequency carrier signals which are generated and transmitted by radio-frequency transmitters in the subscriber unit and at the base terminal. When the telephone call is originated by the base terminal, the audio-frequency control tones or signalling tones received and detected by the subscriber unit are converted into digital signals which are supplied to digital control logic within the subscriber unit. The control logic determines whether the coding of the tone-derived digital signals represent the phone number of the subscriber unit and, when the determination is affirmative, causes the subscriber unit to transmit certain acknowledgement and connect signals back to the base terminal for completing the radio link-up. When the telephone call is originated by the subscriber unit, the same control logic causes the subscriber unit to transmit coded tone burst signals to the base terminal for establishing a radio link-up therewith and for supplying thereto an indication of the phone number of the telephone being called. The subscriber unit includes an automatic channel search mechanism for enabling the subscriber unit to automatically tune in to an idle one of several base terminal carrier channels. The subscriber unit is particularly adapted for use as a self-contained portable battery operated unit and the subscriber unit includes means for automatically switching a significant portion of the control logic to a power conserving standby condition during the voice conversation portion of a telephone call as well as when a telephone call is not in progress. This minimizes the power drain on the power supply battery. In the manual mode, the control logic functions in a somewhat simpler manner, such control logic then being used only on base terminal originated calls to decode coded tone burst signals and to activate a ringing circuit in the subscriber unit when the proper phone number is received. In both modes, various provisions are made for minimizing the power drain on the power supply battery.

42 Claims, 21 Drawing Figures

PATENTED APR 23 1974

3,806,663

SHEET 18 OF 21

RADIO TELEPHONE SUBSCRIBER UNIT

BACKGROUND OF THE INVENTION

This invention relates to a radio telephone subscriber unit for communicating with a telephone company base terminal to connect the subscriber unit to the land line telephone system or to another radio telephone subscriber unit.

Various types of radio telephone systems are either in present day use or have been proposed for future use. These include mobile systems for use with land-based vehicles, marine systems for use with boats and ships and the like and airborne systems for use with aircraft in flight. These systems are characterized by the fact that the subscriber units are not normally tied to a fixed location, but are instead located aboard a motor vehicle or other craft which is capable of moving from place to place. While this adds a considerable degree of mobility to the telephone, there nevertheless remains a substantial area of telephone usage which has not yet been tapped. For sake of a name, this untapped area might be called the "portable" telephone area and involves the use of a compact light-weight cordless portable telephone which can be readily hand carried about by a person desiring to use same and which enables the placing and receiving of telephone calls with practically the same ease as an ordinary wireline connected telephone, with the geography of use of such portable telephone not being restricted to any greater extent than is the geography of use of a vehicular-type radio telephone. In other words, such portable telephone can be carried to and used any place within any geographical area for which the telephone companying provides vehicular or similar type radio telephone service.

It is an object of the invention, therefore, to provide a new and improved self-contained cordless portable radio telephone subscriber unit which may be readily hand carried to and used in different parts of a city, different cities and in rural areas.

In order to make the usage of such portable radio telephone subscriber units immediately available to the greatest extent possible, it is desirable for the present that such portable subscriber units be capable of use with the vehicular-type mobile telephone services presently provided by the various telephone companies. At the present time, the Bell System telephone companies and other telephone companies (hereinafter referred to collectively as "telephone company") provide two principal forms of mobile telephone service. One is known as "MTS" (Mobile Telephone Service) and the other is known as "IMTS" (Improved Mobile Telephone Service). The older MTS system is a manual system wherein each mobile telephone subscriber unit is assigned a particular operating channel (set of transmit and receive frequencies) for receiving calls and all calls are placed by going through the telephone company operator at the base terminal. In the newer IMTS system a number of radio channels are provided which are accessible to each of the subscriber units. Between calls, the subscriber units monitor a particular one of these multiple channels, which channel is designated by the base terminal transmitting an audio-frequency "idle" tone on such channel. When the existing idle channel goes into use, the idle tone signal is shifted to another channel and the idle subscriber units automatically tune to this new idle channel. In addition, the base terminal equipment and subscriber units in the newer IMTS system are constructed to enable the subscriber units to place and receive telephone calls automatically without having to go through a telephone company operator.

It is another object of the invention, therefore, to provide a new and improved portable radio telephone subscriber unit which can be readily used in existing telephone company mobile telephone systems.

It is a further object of the invention to provide a new and improved radio telephone subscriber unit capable of providing both automatic and manual operation with a minimum of additional circuitry.

Existing mobile radio telephone subscriber units are not readily adaptable to provide a very satisfactory form of portable subscriber unit. For one thing, existing mobile telephone subscriber equipment is usually relatively heavy and relatively bulky, this being no particular problem in such equipment's normal use—since such equipment is in a motor vehicle where the space and the weight carrying capability are usually available. Also, existing mobile telephone subscriber equipment is normally constructed to receive its operating power from the electrical system of the motor vehicle. Thus, since a relatively large amount of power is readily available, usage requirements are less strenuous and the rate of power consumption of such equipment is greater than is desired for the case of a self-contained battery operated portable telephone subscriber unit.

It is another object of the invention, therefore, to provide a new and improved radio telephone subscriber unit which is of a more compact and more light-weight construction than existing mobile telephone subscriber equipment.

It is a further object of the invention to provide a new and improved radio telephone subscriber unit having a power consumption rating which is considerably less than that of existing mobile telephone subscriber equipment.

It is an additional object of the invention to provide a new and improved radio telephone subscriber unit having a high degree of reliability even under fairly adverse operating conditions.

It is a further object to the invention to provide a new and improved radio telephone subscriber unit which is flexible in nature and which is readily adaptable to the specific requirements and different telephone company radio telephone systems.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF FIG. 1 RADIO TELEPHONE SUBSCRIBER UNIT

Figure 1:
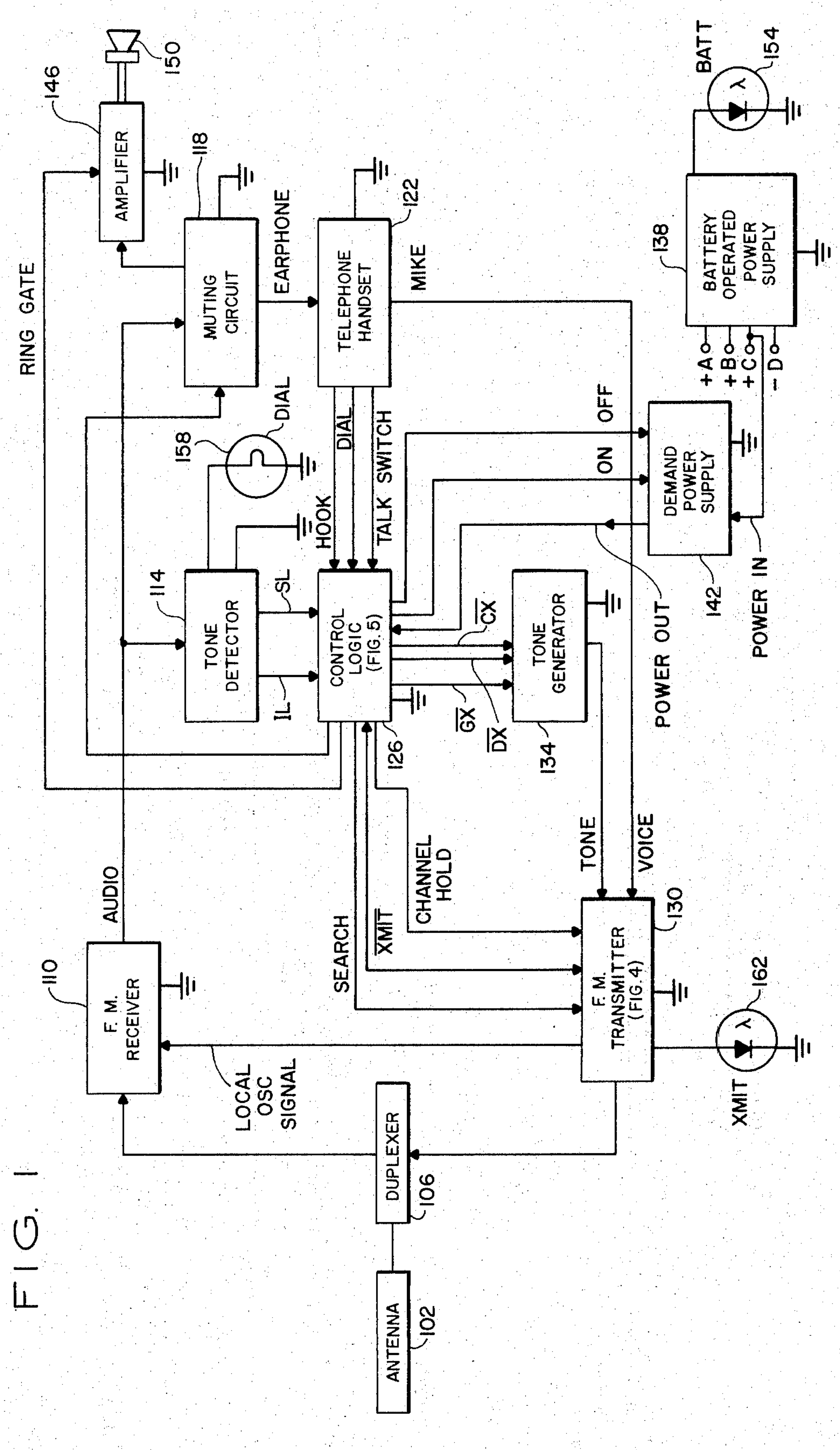
FIG. 1 shows in a block diagram fashion the general features of a portable radio telephone subscriber unit constructed in accordance with the present invention.

Referring to FIG. 1, there is shown a general block diagram of a radio telephone subscriber unit constructed in accordance with the present invention. For sake of an example, the FIG. 1 subscriber unit will be described for the case where it is constructed for use with the IMTS (automatic) and the MTS (manual) mobile telephone services presently provided by the telephone company. As such, reference will occasionally be made to the particular operating frequencies and particular signal specifications presently in use, it being clearly understood that such references are by way of example only and that the invention is not limited to use with such specific frequencies and signal specifications.

Each base terminal in the existing telephone company IMTS (automatic dial) mobile telephone system employs one or more or 11 different radio channels, each channel being comprised of a pair of carrier frequencies, one for the base terminal transmitter and the other for the mobile unit or subscriber unit transmitter. The base terminal transmitter carrier frequencies for the eleven different channels are spaced 30 kilohertz apart with the lowest carrier frequency being at 152.51 megahertz and the highest carrier frequency being at 152.81 megahertz. The mobile unit transmitter carrier frequencies are also spaced 30 kilohertz apart with the lowest mobile unit transmitter carrier frequency being at 157.77 megahertz and the highest mobile unit transmitter carrier frequency being at 158.07 megahertz. The base terminal and the mobile unit transmitter frequencies are paired in numerical order to form the individual channels, the lowest channel being formed by the lowest base terminal frequency and the lowest mobile unit frequency, etc. Both the base terminal and the mobile unit or subscriber unit employ frequency modulation (FM) type transmitters.

At any given instant, the base terminal designates only a single one of the eleven different channels as being available for communication purposes. This is accomplished by modulating a particular audio-frequency tone onto the radio-frequency carrier for the desired available channel, such tone being referred to as "idle" tone. The various subscriber units which are on active standby (in condition to receive a call) but which are not presently involved in a telephone call automatically tune to this idle channel and "listen" to detect the transmission of their telephone number by the base terminal. The telephone number of a particular subscriber unit is transmitted by alternately modulating in a coded manner the base terminal carrier with the idle tone audio frequency and a second audio frequency called a "seize" tone frequency. The presently used idle tone audio frequency is 2000 hertz and the presently used seize tone audio frequency is 1,800 hertz.

When the current idle channel becomes occupied, that is, becomes engaged in making a telephone call, then the steady idle tone is shifted to another channel and the turned on subscriber units which are not in use automatically tune themselves to this new idle channel. This process shifting the idle tone from channel to channel continues until all assigned channels for a given base terminal are in use, after which no more phone calls can be placed through that base terminal until such time as one of the assigned channels again becomes idle. When all assigned channels are in use, the "standby" subscriber units which are not in use simply continue searching through the channels in a sequential manner until one of the channels becomes idle at which time the subscriber units tune themselves to a new idle channel.

When the phone call is originated by the subscriber or mobile unit, such unit initially transmits a coded pattern of particular audio-frequency tones to establish the connection with the base terminal and to remove from an idle condition the particular base terminal channel being used. A set of three specific audio-frequency tones are employed by each subscriber unit for purposes of signalling the base terminal. These are commonly referred to as a "guard" tone, a "connect" tone and a "disconnect" tone, the presently used frequencies being 2150, 1633 and 1336 hertz, respectively. These tones are transmitted as frequency modulation of the subscriber unit radio-frequency carrier for the particular channel being used at the moment and are employed for signalling purposes during the making of both incoming and outgoing phone calls.

The telephone company MTS (manual) system is somewhat simpler in nature. Each mobile unit is assigned a particular channel which it always uses for the receiving of a phone call, unless the telephone company is specifically advised that a different channel is to be used. When the call is originated by the base terminal, the base terminal operator turns on the base terminal transmitter for the channel assigned to the particular mobile unit in question and then dials out the mobile unit phone number in a manual manner. The mobile unit phone number is transmitted by alternately modulating the base terminal radio-frequency carrier with two different audio tones in a coded pattern. A decoder circuit in the mobile unit recognizes its phone number and activates a ringing circuit in the mobile unit. The base terminal then transmits a ringing signal comprised of one of the two audio tones used for signalling purposes. The mobile unit user then answers the phone and carries on the conversation. When the phone call is originated by the mobile unit, the operation is entirely manual. The mobile unit user manually selects a free channel and causes the generation of the channel's carrier signal. The base terminal recognizes that the mobile unit is on the air by detecting the transmission of its carrier signal. Thereafter, the phone call is completed by way of voice conversation between the base terminal and mobile unit operators.

In the MTS system, the mobile unit does not transmit any signalling tones during the course of either an incoming call or outgoing call. The only audio-frequency signalling tones employed are those transmitted by the base terminal for purposes of activating the ringing circuit in a particular mobile unit. For sake of convenience only, the two manual mode base terminal signalling tones may sometimes be referred to herein as "idle" and "seize" tones. It is to be clearly understood, however, that this is strictly a misnomer because the telephone company does not employ an "idle" tone to mark an idle channel in the MTS system. In fact, the base terminal transmitter is off the air when the channel serviced by same is not in use. At the present time, the two tone signalling audio frequencies employed in the MTS system are 1,500 and 600 hertz.

BASE TERMINAL TO MOBILE (INCOMING) CALL — IMTS MODE

Considering now the subscriber unit of FIG. 1 and considering first the case of automatic mode (IMTS) incoming call (a call being received by the subscriber unit), the radio-frequency signal transmitted by the base terminal is received by an antenna 102 of the subscriber unit and supplied by way of a duplexer 106 to a frequency modulation (FM) radio receiver 110. FM receiver 110 demodulates or separates out the audio-frequency signals carried by the base terminal carrier signal and supplies such audio-frequency signals to a tone detector 114 and a muting circuit 118. Muting circuit 118 is a gated amplifier circuit and serves to control the passage of audio signals from the FM receiver 110 to an amplifier 146 and loud speaker 150 and to the earphone or earpiece portion of a telephone handset 122. In the present embodiment, telephone handset 122 is of the known type wherein the dialing mechanism as well as the earpiece and the microphone or mouthpiece are mounted in a unitary hand-held structure.

Tone detector 114 includes tuned amplifier and detector cricuits for producing output signals indicative of the presence and absence of the idle and seize tones when in the automatic mode or the presence and absence of the low and high frequency signalling tones when in the manual mode. Thus, if the audio-frequency signal applied to the tone detector 114 is either idle tone or the lower frequency manual mode tone, the tone detector applies a signal to a control logic unit 126 via lead IL and if the audio-frequency signal is either seize tone or the higher frequency manual mode tone, the tone detector applies a signal to the control logic unit via lead SL. The tone detector 114 might illustratively comprise the tone detector circuit disclosed in copending patent application Ser. No. 185,518, filed Oct. 1, 1971.

Radio frequency signals transmitted by the subscriber unit to the base terminal are generated by the FM transmitter 130 in response either to voice modulating signals from the microphone of the telephone handset 122 or tone modulating signals from a tone generator 134 operating under the control of the control logic unit 126. The FM transmitter generated signals are applied by way of the duplexer 106 to the antenna 102 for transmission to the base terminal. Whenever the transmitter 130 is transmitting, current is applied to a light-emitting diode 162 causing the diode to emit light to notify the subscriber user that transmission is taking place.

Now assume that the subscriber unit has just been turned on so that power is being supplied by a battery operated power supply 138 to a demand power supply 142 and to the other circuitry of the subscriber unit excluding certain circuitry of the control logic unit 126 which obtains its power via the demand power supply 142. Power supply 138 includes one or more lightweight batteries which represent the primary power source for the subscriber unit. Power supply 138 also includes various voltage regulator circuits for taking the terminal voltage of the battery pack (+A) and reducing it down to a series of lesser direct-current voltage levels (+B, +C and −D), which voltages are regulated to minimize changes in such levels as the battery terminal voltage falls off with use of the subscriber unit. By way of example only, the +A may be +13 volts, +B may be +10 volts, +C may be +5 volts and −D may be −6 volts. If the battery terminal voltage falls below some minimum level, current is applied to a light-emitting diode 154 causing the diode to emit light and thereby warn the subscriber unit user that the power supply is low. An exemplary battery operated power supply which could be utilized in the present invention is disclosed in copending patent application Ser. No. 175,305, filed Aug. 26, 1971.

Upon turning on the subscriber unit, the unit commences to search over the channels in a sequential manner until idle tone is detected on one of the channels. Searching over the channels is carried out under the control of the control logic unit 126 which successively applies channel search pulses to the FM transmitter 130 via the "search" lead to cause the transmitter to successively change its internally produced carrier frequency and also the frequency of the local oscillator signal applied to the FM receiver 110. The local oscillator signal and the signal received from the base terminal are heterodyned by a mixer in the FM receiver 110 to produce an output signal whose frequency equals the difference between the frequency of the local oscillator signal and the frequency of the received signal. When the idle tone is detected at the output of the receiver 110 by the tone detector 114, the detector applies a signal via the IL lead to the control unit 126. In response thereto, the control logic unit 126 ceases applying channel search pulses to the transmitter 130 via the "search" lead so that transmitter maintains the local oscillator signal at the then-current frequency which designates the channel on which the idle tone was received. The FM transmitter 130 is now "locked" to the channel over which the idle tone was received. The other units would which are turned on similarly lock onto this channel.

To establish a "connection" with a particular subscriber unit, the base terminal removes the idle tone and transmits a seize tone of duration of from 0.25 to 1.4 seconds. Replacement of the idle tone by the seize tone is graphically illustrated in FIG. 2 which is a timing diagram showing the sequence of signals transmitted between the base terminal and a subscriber unit for a base terminal to subscriber unit (incoming) call. The seize tone is detected by the tone detector 114 which applies a signal via the SL lead to the control logic 126 causing the control logic to turn on the demand power supply 142. Power is now supplied by way of the demand power supply to that circuitry in the control logic unit 126 not otherwise powered directly by the battery operated power supply 138.

Figure 2:
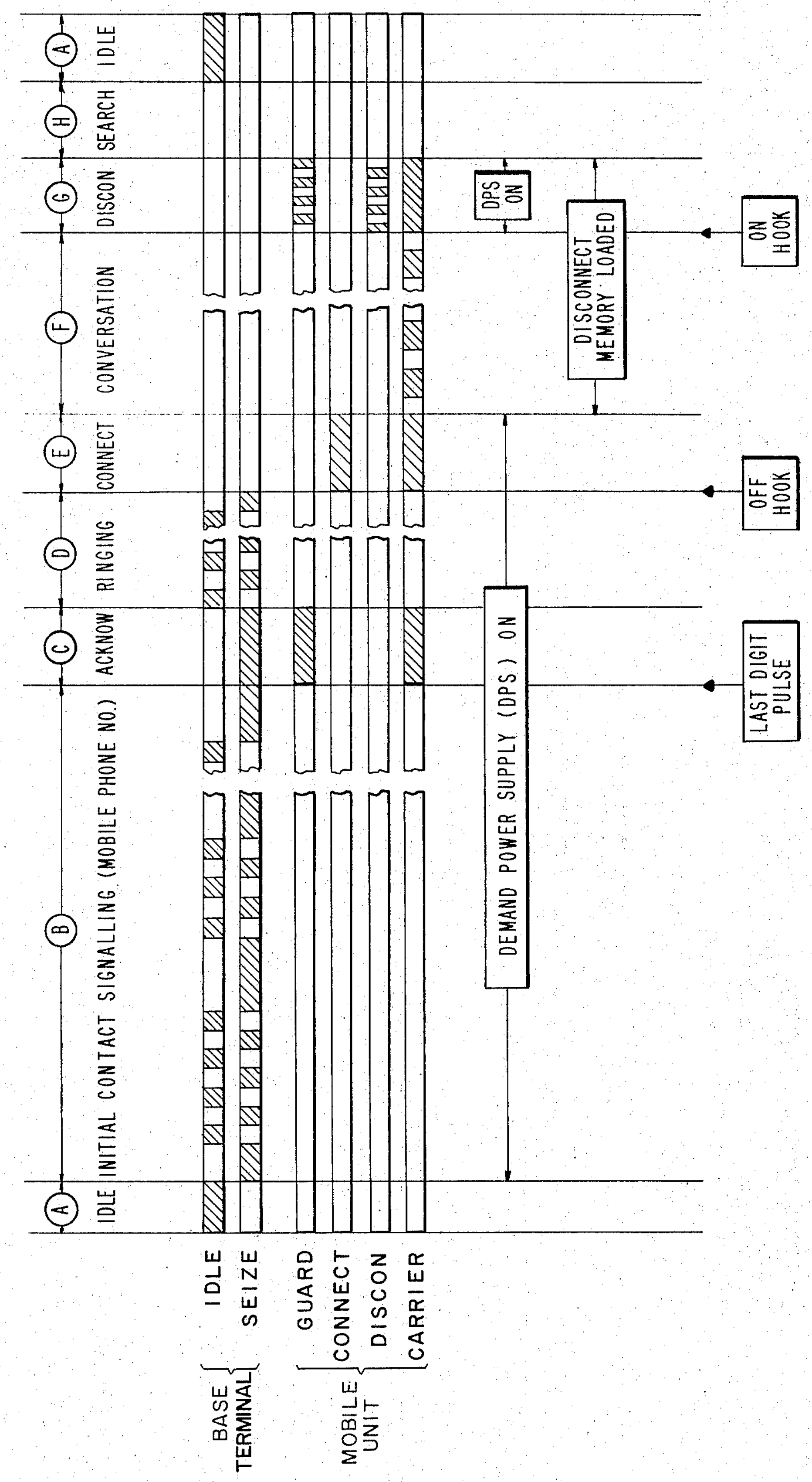
FIG. 2 is a timing diagram used in explaining the operation of the FIG. 1 subscriber unit for the case of automatic mode base terminal to subscriber unit (incoming) telephone calls.

After a short period of seize tone, the base terminal transmits the phone number of the subscriber unit being called. The phone number is designated by interrupting the seize tone with groups of idle tone bursts, the number of idle tone bursts in each group representing the digit value of one of the digits of the phone number. The duration of the idle tone burst and of the seize tone between the idle tone bursts is 50 milliseconds. The duration of seize tone between each group of idle tone bursts is approximately 300 milliseconds and is provided to specify the end of each digit of the phone number. Transmission of the subscriber unit phone number is represented by interval B in FIG. 2, only a portion of which is shown for convenience of illustration. FIG. 2 also shows that the demand power supply is turned on at the beginning of interval B.

After each group of idle tone pulses is received and the control logic unit 126 is signalled accordingly, the control logic unit compares the digit represented by the group with a corresponding "stored" digit to determine if the digits match. If a mismatch occurs for any pair of compared digits, the control logic unit 126 resets its logic circuitry, turns off the demand power supply 142, and commences supplying pulses via the "search" lead to the FM transmitter 130 to cause the subscriber unit to resume searching for the idle channel. If all pairs of compared digits match, the control logic unit 126 signals a tone generator 134 via the $\overline{GX}$ lead causing the tone generator to generate a guard tone (2150 hertz) which is applied to the FM transmitter 130 to modulate the transmitter carrier frequency. At the same time, the control logic 126 produces a transmit signal on lead $\overline{XMIT}$ which enables the transmitter 130 to supply the guard tone modulated carrier signal by way of the duplexer 106 to the antenna 102 for transmission to the base terminal. This guard tone, which continues for 750 milliseconds, serves as an acknowledgement signal indicating to the base terminal that the transmitted phone number was received and that the called subscriber unit is available (see interval C of FIG. 2). An illustrative tone generator which could be utilized for the tone generator 134 is the circuit disclosed in copending patent application Ser. No. 185,745, filed Oct. 1, 1971 and now U.S. Pat. No. 3,763,322.

At the same time the guard tone is transmitted to the base terminal, the control logic unit 126 signals an amplifier 146 via a "ring gate" lead causing the amplifier to increase its gain; the control logic unit 126 also signals the muting circuit 118 enabling it to pass audio signals received from the FM receiver 110 to the amplifier 146 and the telephone handset 122.

Upon termination of transmission of the guard tone by the subscriber unit, the base terminal commences to transmit a ringing signal comprising alternate pulses of idle tone and seize tone of 25 milliseconds each. Such pulses are transmitted for a period of 3 to 4 seconds followed by about 3 seconds of seize tone alone, which, in turn, is followed by alternate pulses idle and seize tone, etc. The alternate idle and seize tone signals are applied by the FM receiver 110 to the amplifier 146 via the muting circuit 118. The amplifier 146 amplifies the signals and applies them to a loudspeaker 150 which produces audible sound vibrations to alert the subscriber unit user that his unit is being called. The ringing signal sequence is represented by interval D of FIG. 2. Utilizing the audio amplifier 146 and the loudspeaker 150 to provide the audible indication to the subscriber unit user dispenses with the need for a conventional and more expensive ringing circuit.

If the call remains unanswered for about 45 seconds (during which time the ringing signals are being transmitted to the subscriber unit), the base terminal terminates transmission of the ringing signals after which the control logic unit 126 turns off the demand power supply 142 and causes the subscriber unit to commence searching for an idle channel.

Upon hearing the audible ringing sound, the subscriber unit user removes the handset 122 from its cradle or switch hook causing a signal to be applied via the "hook" lead to the control logic unit 126. In response thereto, the control logic unit applies a connect tone signal to the tone generator 134 via lead $\overline{CX}$ causing the tone generator to generate 400 milliseconds of connect tone (1633 hertz). The control logic unit also applies a transmit signal via lead $\overline{XMIT}$ to the transmitter 130 enabling it to transmit connect tone to the base terminal (see interval E of FIG. 2). Upon receipt of the connect tone, the base terminal removes the ringing signals from the channel and the conversation may commence. Following termination of transmission of the connect tone, the control logic unit 126 turns off the demand power supply 142 as indicated in FIG. 2.

During the course of the conversation, the control logic unit 126 monitors the transmitter (by means of the $\overline{XMIT}$ lead) to determine if transmissions are being made thereby, i.e., to determine if carrier frequency is being transmitted. If no carrier signal transmissions are made for a period of about 10 seconds, the control logic unit signals the FM transmitter 130 via lead $\overline{XMIT}$ causing the transmitter to generate a short burst of carrier frequency at this time and at ten second intervals thereafter until the subscriber unit user causes carrier frequency to be transmitted—either by speaking into the microphone of the telephone handset 122 or by manual operation of a push-to-talk switch on the handset (see interval F of FIG. 2). These bursts of carrier frequency ("channel hold" signals) notify the base terminal that the connection is to be maintained. If no provision were made for transmitting some such signal, the base terminal would disconnect the subscriber unit after about a 12 second lull in subscriber unit transmission. Transmitting bursts of carrier frequency rather than a continuous carrier signal conserves the power supply of the subscriber unit.

While in conversation, voice modulated radio signals are received from the base terminal by the antenna 102 and applied via the duplexer 106 to the receiver 110 which demodulates the signals and applies the resulting audio signal via the muting circuit 118 to the earphone inside the telephone handset 122. Voice transmission from the subscriber unit to the base terminal is carried out when the mouthpiece or microphone inside the telephone handset 122 picks up audible signals from the subscriber unit user and applies a resulting audio signal via the "voice" lead to the FM transmitter 130. This audio signal actuates the transmitter 130 to generate a voice modulated signal which is transmitted to the base terminal. As indicated earlier, provision is also made for actuating the transmitter 130 by depressing a push-to-talk switch located in the telephone handset 122. Depressing the push-to-talk switch results in a signal being applied via the "talk switch" lead to the control logic unit 126 which then actuates the transmitter 130 via the $\overline{XMIT}$ lead.

When the conversation is concluded, the subscriber unit user replaces the telephone handset 122 on the switch hook causing a signal to be applied via the "hook" lead to the control logic unit 126. In response thereto, the control logic unit 126 alternately applies signals via the $\overline{DX}$ and the $\overline{GX}$ leads to the tone generator 134 causing the tone generator to generate a 750 millisecond disconnect signal sequence consisting of alternate 25 milliseconds bursts of disconnect tone and guard tone together with the carrier frequency. This is illustrated as interval G of FIG. 2. The disconnect signal sequence is transmitted to the base terminal to inform the base terminal that the call is concluded and that the channel is free for further use. Upon termination of transmission of the disconnect signal sequence, the control logic unit 126 turns off the demand power supply 142 and initiates channel searching as previously described.

MOBILE-TO-BASE STATION (OUTGOING) CALL — IMTS MODE

Figure 3:
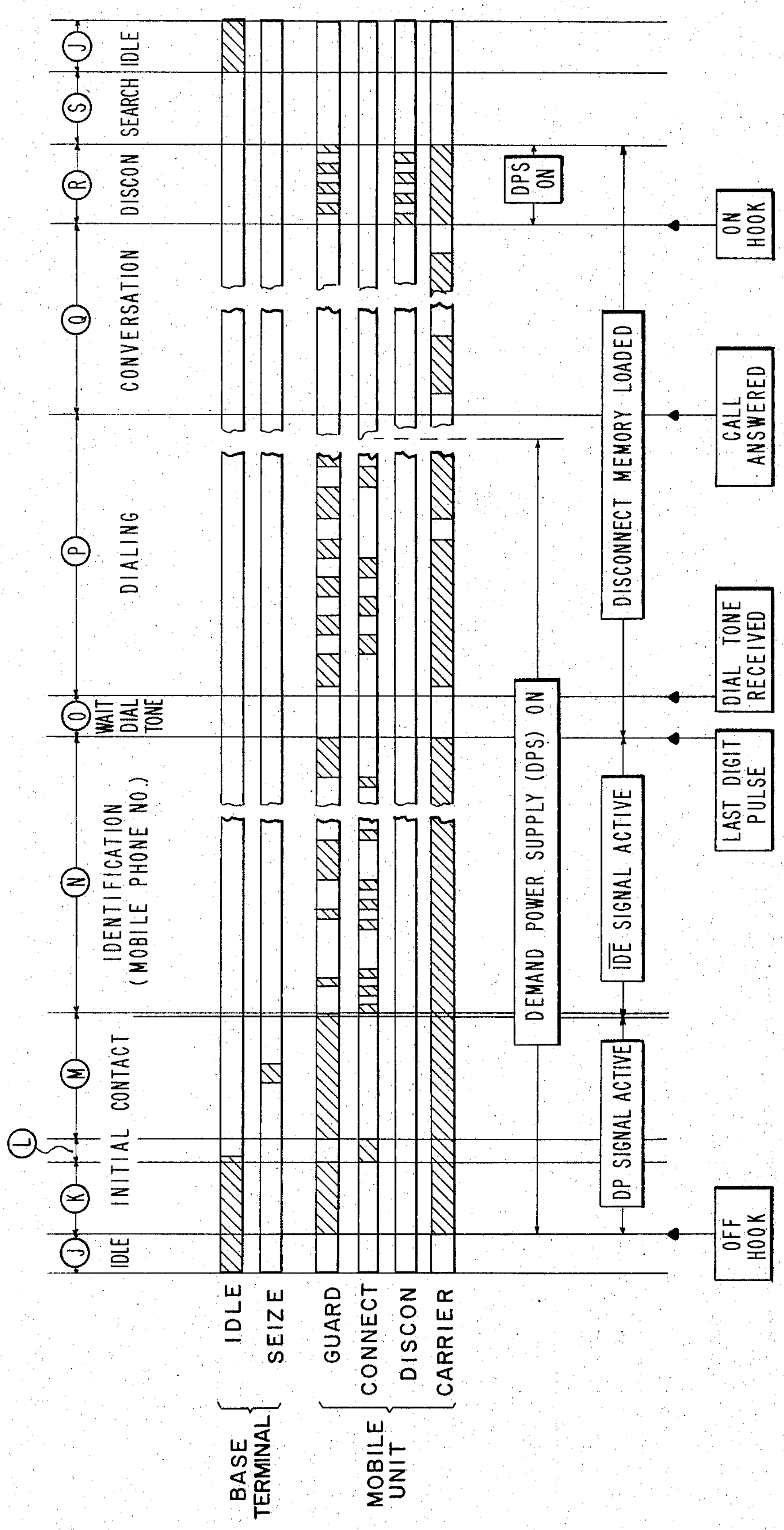
FIG. 3 is a timing diagram used in explaining the operation of the subscriber unit for the case of automatic mode subscriber unit to base terminal (outgoing) telephone calls.

FIG. 1 will now be described for a call initiated by the subscriber unit (outgoing call) for the IMTS mode of operation. FIG. 3 which is a timing diagram graphically illustrating the signals transmitted between the base terminal and a subscriber unit for a subscriber unit initiated call, will be utilized in conjunction with the FIG. 1 description.

Assuming that the FM transmitter 130 of the subscriber unit has "locked" onto an idle channel, the tone detector 114 detects the idle tone and energizes a lamp 158 to indicate to the subscriber unit user that an idle channel is available. To originate a call, the user removes the telephone handset 122 from the switch hook causing a signal to be applied via the "hook" lead to the control logic unit 126 in turn causing the control logic unit to turn on the demand power supply 142. (Note that if the telephone handset 122 is removed from the switch hook before the unit has "locked" onto an idle channel, the channel searching is stopped and the demand power supply 142 is not turned on.) The control logic unit 126 also signals the tone generator 134 and the FM transmitter 130 to transmit 350 milliseconds of guard tone (see interval K of FIG. 3). If, after the transmission of 350 milliseconds of guard tone, the control logic unit 126 determines that the idle tone is still present on the channel to which the subscriber unit is locked, the control logic unit signals the tone generator 134 and the FM transmitter 130 to transmit 50 milliseconds of connect tone (interval L of FIG. 3). If, after transmission of the connect tone, the control logic unit 126 determines that the idle tone has been removed from the channel to which the subscriber unit is locked, the control logic unit signals the tone generator 134 and the FM transmitter 130 to again transmit guard tone (interval M of FIG. 3).

If, after the transmission of the 350 milliseconds of guard tone, the control logic unit 126 determines that the idle tone is not being received, or if, after transmission of the 50 milliseconds of connect tone, the control logic unit determines that the idle tone is being received, then the demand power supply 142 is turned off, the control logic unit circuitry is reset, and the subscriber unit commences searching for an idle channel. Failure to detect the idle tone following the 350 milliseconds of guard tone indicates that the channel to which the subscriber unit was locked has been seized by another subscriber unit. Detecting the idle tone following the 50 milliseconds of connect tone indicates that the base terminal has not responded to the subscriber unit's "dial request." In either case, the subscriber unit simply starts over again to search for an idle channel.

During the transmission of the second period of guard tone, the subscriber unit "waits" for the arrival of a burst of seize tone from the base terminal. This seize tone burst indicates too the subscriber unit that the base terminal is ready to receive the subscriber unit's identification number, i.e., phone number. Following the arrival of the seize tone and approximately 190 milliseconds after the termination thereof, the subscriber unit commences transmitting its identification number under the control of the control logic unit 126 (interval N of FIG. 3). Each digit or numeral of the identification number consists of a number of 25 milliseconds bursts of connect tone corresponding in number to the numeral represented. Alternately interspersed between the connect tone bursts are unmodulated carrier frequency and guard tone. Thus, referring to interval N of FIG. 3, the first digit of the identification number there illustrated (the number 3) consists of carrier modulated by connect tone, unmodulated carrier frequency, carrier modulated by connect tone, carrier modulated by guard tone, and carrier modulated by connect tone. For convenience of illustration, only a portion of the identification interval N is shown.

Between the digits of the identification number, the unmodulated carrier frequency or carrier modulated by guard tone is transmitted for 190 milliseconds. Thus, again referring to interval N of FIG. 3, after the first digit of the identification number, unmodulated carrier frequency is transmitted and after the second digit (which is also the numeral 3), carrier modulated by guard tone is transmitted, etc. Following transmission of the last digit of the identification number, the control logic unit 126 applies a signal to the muting circuit 118 enabling the muting circuit to pass audio signals from the FM receiver 110 to the earphone of the telephone handset 122; the subscriber unit then simply waits for receipt of dial tone from the base station (see interval O of FIG. 3). After receipt of the dial tone, the subscriber unit user may commence to dial the number he desires to call.

Dialing is accomplished utilizing a dialing mechanism located on the telephone handset 122. When the dial is "cocked" (prior to releasing), the control logic 126, in response to a signal from the telephone handset 122, signals the tone generator 134 to generate guard tone. Upon release of the dial mechanism and in response to a sequence of signals from the telephone handset 122 resulting from alternately opening and closing a set of contacts, the control logic unit 126 causes the tone generator to generate a sequence of alternate connect and guard tone bursts, with the number of connect tone bursts corresponding to the value of the digit being dialed. Following the last connect tone burst of a digit, a guard tone pulse is transmitted and then both the carrier frequency and guard tone are interrupted until the dial mechanism is again cocked at which time the guard tone and carrier frequency are again generated. The process is then repeated as described above (interval P of FIG. 3). If approximately 10 seconds elapses between the dialing of digits, the control logic unit 126 turns off the demand power supply 142 and, upon the telephone handset 122 being placed on the switch hook, commences the disconnect operation as previously described for the case of an incoming call (interval G of FIG. 2).

Upon completion of dialing, the control logic unit 126 turns off the demand power supply (as indicated in FIG. 3) and the subscriber unit user listens for either the audible ringing signal (indicating that the called number is not busy) or the buy signal (indicating that the called number is busy). If the called party answers, the conversation may commence in the normal manner. As indicated earlier for an incoming call, during the course of the conversation when no voice transmissions are being made by the subscriber unit, the control logic unit 126 causes the transmitter 130 to transmit repetitive bursts of unmodulated carrier frequency to "hold" the channel. This is shown in interval Q of FIG. 3.

At the conclusion of the conversation, the subscriber unit user places the telephone handset 122 on the switch hook causing the control logic unit 126 to turn on the demand power supply 142 and to signal the tone generator 134 and FM transmitter 130 to transmit the disconnect signal sequence in the same manner as described earlier for the case of an incoming call (for the outgoing call, see interval R of FIG. 3). Following transmission of the disconnect signal sequence, the control logic unit 126 turns off the demand power supply 142 and the subscriber unit commences searching for an idle channel. It should be noted that the disconnect signal sequence is also transmitted to the base terminal following the replacement of the telephone handset 122 on the switch hook upon encountering a busy line.

If the called party hangs up before the subscriber unit user, the base terminal will "take down" the connection, but the subscriber unit will remain locked onto the channel until the user places the telephone handset on the switch hook—after which the disconnect signal sequence will be transmitted as previously described.

As is apparent from the description of the FIG. 1 subscriber unit, one of the significant features of the disclosed embodiment is the operation and control of the demand power supply 142. To briefly summarize, the demand power supply prevents the application of power from the battery operated power supply 138 to a large portion of the circuitry of the control logic unit 126, placing such circuitry on a "standby" basis, when no call is in progress and also during the conversation interval of a call. The drain on the battery operated power supply 138 is thus minimized. That portion of the circuitry of the control logic unit 126 which receives its power from the demand power supply 142 is noted in the more detailed drawings FIGS. 6–18. Specifically, the demand power supply illustratively supplies power to all circuitry of the control logic unit except those components connected to one of the battery operated power supply terminals +A, +B, +C or —D and those components designated by an asterisk in FIGS. 6–18.

MTS MODE

As previously indicated, when operating in the MTS (manual) mode, the subscriber unit does not transmit any signalling tones to the base terminal for either an incoming or an outgoing call. Also, no automatic channel searching takes place and the muting circuit 118 is always enabled or turned on to pass audio signals to the telephone handset. For an incoming call, the base terminal tramsmits the subscriber unit number over a particular channel assigned to that subscriber unit. Upon receipt of the appropriate number by the subscriber unit, the control logic unit 126 activates the amplifier 146 (to increase its gain) and enables the muting circuit 118 to pass signals from the FM receiver 110 to the amplifier 146 just as in the IMTS mode. No acknowledgement signal sequence, however, is transmitted to the base terminal. Rather, the base terminal after transmitting the subscriber unit number, commences to transmit a ringing signal. The ringing signal is applied by the receiver 110 by way of the muting circuit 118 to the amplifier 146 which actuates the speaker 150 to notify the subscriber unit user of the incoming call. The subscriber unit user may then remove the telephone handset 122 from the switch hook and commence the conversation. At the conclusion of the conversation, the subscriber unit user replaces the telephone handset 122 on the switch hook after which the control logic unit 126 resets its logic circuitry in preparation for another call.

For an outgoing call in the MTS mode, the subscriber unit user manually searches for a channel by operating appropriate buttons or switches in the F.M. transmitter 130 designating the different channels. Operating a particular switch causes the FM transmitter to generate the local oscillator signal designating the channel corresponding to the particular switch. When the user locates a channel which is not being used (determined simply by listening to hear if the channel is clear) the user operates the push-to-talk switch on the telephone handset 122 causing a signal to be applied via the "talk switch" lead to the control logic unit 126. The control logic unit 126 then signals the transmitter 130 to cause the transmission of a carrier signal (designating the selected channel) for the period during which the push-to-talk switch is operated. The carrier signal notifies the base terminal that the subscriber unit user desires to place a call on the selected channel. The base terminal operator then connects to the designated channel and orally receives the call request information from the subscriber unit user. The connection is then established by the base terminal operator and the conversation commences. Again, no signalling tones are transmitted from the subscriber unit user to the base terminal.

DESCRIPTION OF FIG. 4 FM TRANSMITTER

Figure 4:
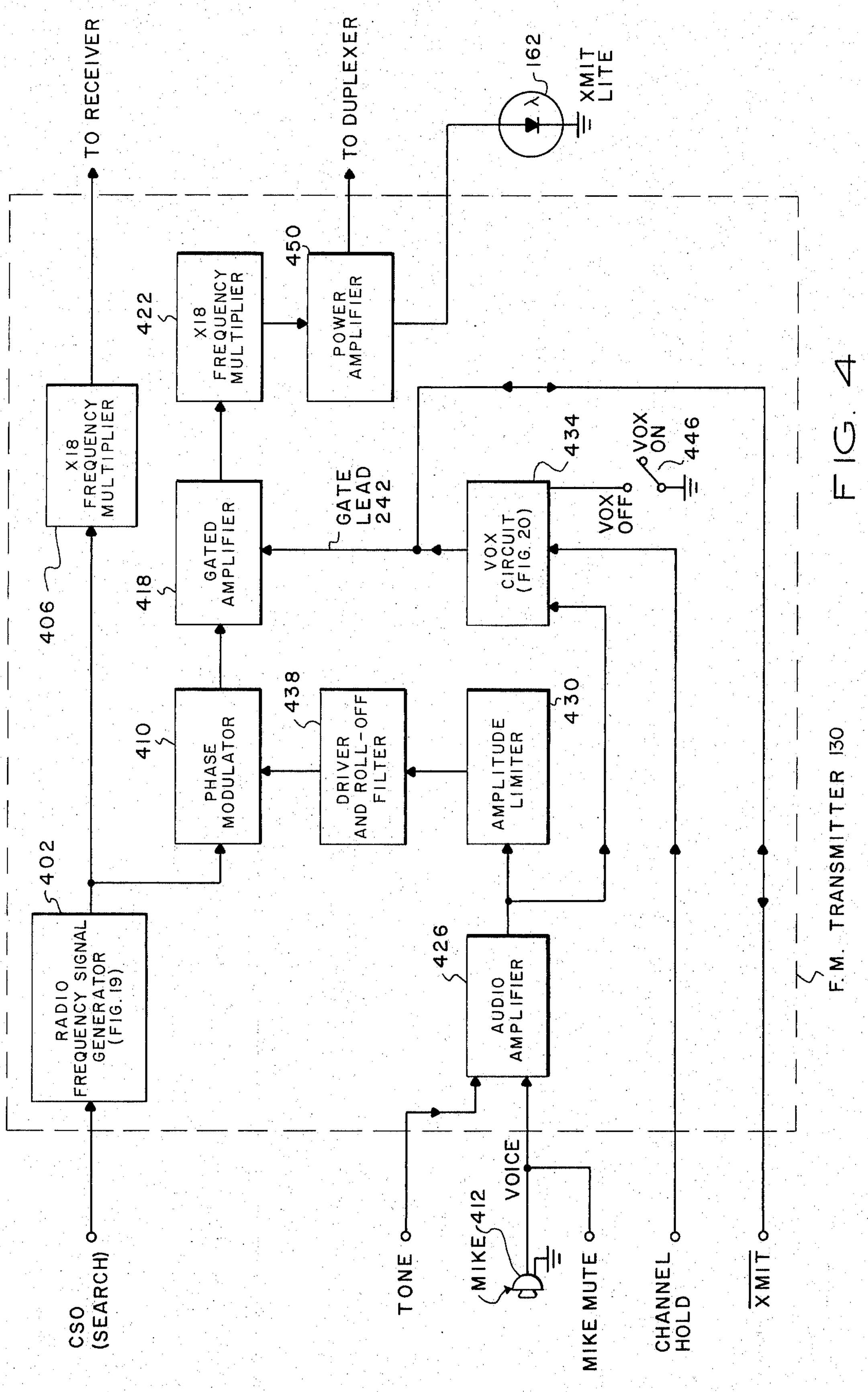
FIG. 4 is a more detailed block diagram of an FM transmitter used in the FIG. 1 subscriber unit.

FIG. 4 shows the FM transmitter 130 of FIG. 1 in greater detail. The transmitter includes a radio frequency signal generator 402 which is capable of generating the various channel carrier frequencies used in the radio telephone system. As will become more clear when describing the radio frequency signal generator 402 in greater detail in conjunction with FIG. 19, the signal generator includes a stepping circuit mechanism which is driven by the channel search pulses supplied to lead CSO ("search") to select a particular one of the carrier frequencies. The signal generated by the signal generator 402 is applied to a phase modulator 410 and a frequency multiplier 406. The frequency of the signals applied to the frequency multiplier 406 is increased by a factor of 18 and the resulting signals are applied to the FM receiver 110 (FIG. 1) for use as the local oscillator signal for tuning the receiver to the respective channels. When it is determined that the subscriber unit is tuned to an idle channel, the control logic unit 126 ceases applying channel search pulses to the radio frequency signal generator 402 and the signal generator remains "locked" to the signal specifying the idle channel, i.e., the signal generator continues to generate the carrier signal which determines the idle channel.

The signal applied by the radio frequency signal generator 402 to the phase modulator 410 is modulated in accordance with tone signals received from the tone generator 134 (FIG. 1) via the "tone" lead or voice signals received from the microphone 412 of the telephone handset 122 (FIG. 1) via the "voice" lead. (The "mike mute" lead is provided to "mute" the microphone 412 when the lead is grounded.) The tone signals or voice signals are applied to an audio amplifier 426 which amplifies the signals and applies them to an amplitude limiter 430 and a voice operated transmitter (VOX) circuit 434 (shown in greater detail in FIG. 20). The amplitude limiter 430 clips the peaks of the signal received from the audio amplifier 426 and applies the resultant signals to a driver and roll-off filter circuit 438. The driver and roll-off filter circuit 438 reduces the high frequency components of the signals to a relatively low amplitude and applies the resultant modulating signals to the phase modulator 410. The phase modulator 410 then "phase modulates" the signals received from the radio frequency generator 402 in accordance with the signals from the driver and roll-off filter circuit 438 and applies the modulated signals to a gated amplifier 418. Depending on the condition of a gate lead input 442, the gated amplifier 418 either does nothing with the modulated signals or amplifiers and applies them to a frequency multiplier 422. If signals are applied to the frequency multiplier 422, the multiplier increases the frequency of the signals by a factor of 18 and applies the resultant signals to a power amplifier 450. The power amplifier 450 increases the power of the signals and applies them to the duplexer 106 (FIG. 1) to be transmitted to the base station. While supplying the signal to the duplexer, the power amplifier 450 also applies current to the light-emitting diode 162 causing the diode to emit light and thereby indicate that transmission is taking place.

The gated amplifier 418 is actuated to amplify the signals received from the phase modulator 410 and to apply the resultant amplified signals to the frequency multiplier 422 in response to a signal received from the VOX circuit 434 or received over lead $\overline{XMIT}$ from the control logic unit. The VOX circuit 434 applies a signal to the gated amplifier 418 in response either to an amplified tone or voice signal from the audio amplifier 426 (provided a switch 446 is in the "VOX ON" position) or a "channel hold" signal from the control logic unit (independent of the condition of switch 446). If a "channel hold" signal is received, the VOX circuit 434 actuates the gated amplifier and an unmodulated carrier signal is applied to the frequency multiplier 422, whereas if an amplified tone or voice signal received, the VOX circuit 434 actuates the gated amplifier and a modulated carrier signal is applied to the multiplier 422. Whenever a tone signal is generated and applied to the audio amplifier 426, the control logic unit 126 also applies a signal via the $\overline{XMIT}$ lead to actuate the gated amplifier 418 and thereby ensure transmission of the tone signal in case the switch 446 has been placed in the "VOX OFF" position (in which case the VOX circuit 434 would not enable the gated amplifier 418). As has already been noted, the output signal of the VOX circuit 434 is also, in effect, fed back to the control logic unit 126 by way of the $\overline{XMIT}$ lead to provide an indication of when the VOX circuit 434 is enabling the gated amplifier 418, and thus of when transmission is taking place.

DESCRIPTION OF FIG. 5 CONTROL LOGIC UNIT

Figure 5A:
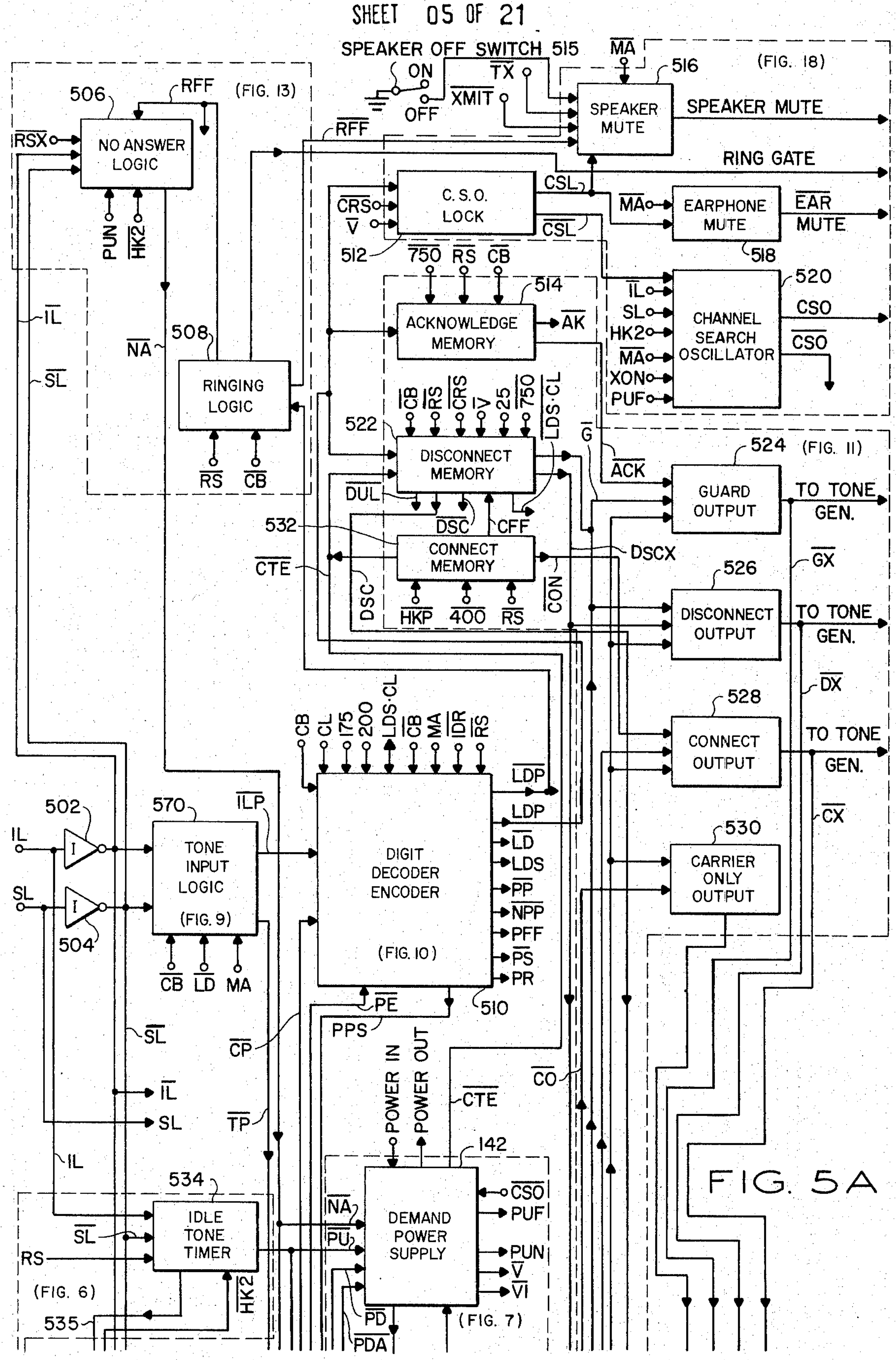
FIGS. 5A and 5B (with FIG. 5A positioned above FIG. 5B) show a more detailed block diagram of a control logic unit and a demand power supply unit used in the subscriber unit of FIG. 1.
Figure 5B:
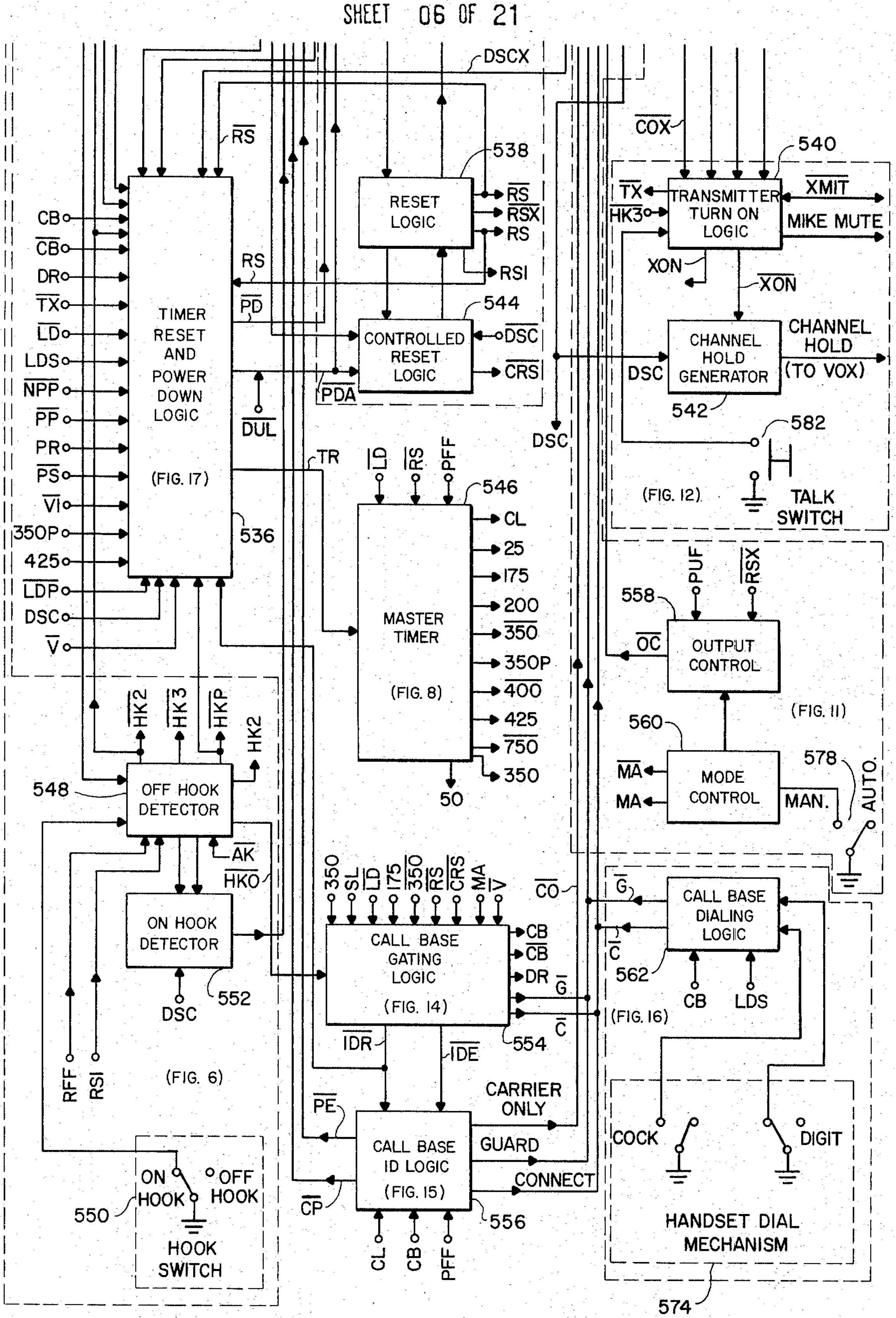

Composite FIG. 5 shows the control logic unit 126 in "block diagram" detail together with the demand power supply 142. The component units of the control logic unit and also the demand power supply are shown in greater detail in the figures indicated. Operation of the control logic unit and demand power supply will be described first for an incoming call in the IMTS mode, then for an outgoing call in the IMTS mode and finally for the MTS mode generally. Note that many of the leads interconnecting the various units of FIG. 5 are identified by letters or numerals some of which have a bar thereabove and others of which do not. Those leads identified with letters or numerals having the bar are normally at the binary one or "high" level condition (e.g., +5 volts) and application of a signal thereto will be taken to mean that the binary zero or "low" level condition (e.g., zero volts) is produced thereon. Such signals may be of relatively short duration, in which case they may be referred to as pulses, or of relatively long duration, in which case they may be referred to simply as signals. Those leads identified by letters or numerals without the bar are normally at the binary zero level and application of a signal thereto will be taken to mean that a binary one condition is produced thereon. Although the functions of many of the leads will be discussed when describing FIG. 5, the functions of other of the leads which are not essential to an understanding of the overall operation of the FIG. 5 circuitry will be discussed when describing the other FIGS. of the drawings.

INCOMING CALL — IMTS MODE

Assume that the subscriber unit of which the FIG. 5 circuitry is a part has not yet "locked" onto an idle channel and that a mode selector switch 578 is in the open or "automatic" position to enable the subscriber unit to operate in the automatic mode. In such case, no idle tone is being received from the base terminal and lead IL (left side of FIG. 5) from the tone detector 114 will be "low" making lead $\overline{IL}$ "high" (by operation of an inverter circuit 502). When lead $\overline{IL}$ is high as well as leads $\overline{CSL}$ (from a channel search oscillator [C.S.O.] lock circuit 512) and $\overline{MA}$ (from a mode control circuit 560) being high, leads HK2 (from an off-hook detector circuit 548) and XON (from a transmitter turn-on logic circuit 540) being low, and either lead SL (from the tone detector 114) or PUF (from the demand power supply 142) being low, a channel search oscillator 520 applies a succession of positive-going channel search pulses via lead CSO to the transmitter 130 (FIG. 1) causing the transmitter to successively change the frequency of the local oscillator signal applied to the receiver 110. In other words, the subscriber unit is caused to search for an idle channel. For information purposes, lead SL is low when no seize tone is being received by the subscriber unit, lead HK2 is low when the telephone handset 122 is on the switch hook, lead $\overline{MA}$ is high when the subscriber unit is operating in the IMTS mode, lead XON is low when the subscriber unit is not transmitting, and lead PUF is low when the demand power supply 142 is turned off. When an idle channel is found, i.e., the idle tone is detected, the tone detector 114 (FIG. 1) applies a high signal to lead IL and thus causes the $\overline{IL}$ lead to be brought low which, in turn, causes the channel search oscillator 520 to cease applying channel search pulses to lead CSO.

With each positive-going pulse applied to lead CSO, the channel search oscillator 520 applies a negative-going pulse to lead $\overline{CSO}$. These pulses on lead $\overline{CSO}$ are applied to the demand power supply 142 to prevent it from being turned on (e.g., by spurious signals) while the channel search pulses are being generated on lead CSO.

The high signal on lead IL also causes an idle tone timer 534 to commence timing for an interval of 120 milliseconds. If, before the termination of this interval, lead IL is brought low indicating that the idle tone is no longer being received and thus that a true base terminal idle channel has not been found, the idle tone timer 534 simply resets and the subscriber unit commences searching for the next idle channel. If lead IL remains high for this interval, the idle tone timer 534 arms itself to apply a low pulse to lead $\overline{PU}$ upon the subsequent receipt of a low signal over either of the leads $\overline{SL}$ or $\overline{HK2}$. If a low signal is subsequently received over lead $\overline{SL}$ indicating that seize tone has been detected on the idle channel, the idle tone timer 534 applies a low pulse to lead $\overline{PU}$ thereby turning on ("powering up") the demand power supply 142. When the demand power supply is turned on, it causes a reset logic circuit 538 to apply a low pulse to lead $\overline{RS}$ and a high pulse to lead RS and causes a controlled reset logic circuit 544 to apply a low pulse to lead $\overline{CRS}$. These pulses on leads RS, $\overline{RS}$ and $\overline{CRS}$ cause various component units of the FIG. 5 control logic unit to be reset as will become clear upon examination of the drawings of the individual component units to which such leads are connected. The demand power supply 142 also at this time causes the reset logic circuit 538 to apply a short low signal to lead $\overline{RSX}$ and this, in turn, causes an output control circuit 558 to apply a similarly short low signal via lead $\overline{OC}$ to a guard output circuit 524, a disconnect output circuit 526, a connect output circuit 528, and a carrier only output circuit 530. The low signal on lead $\overline{OC}$ inhibits the named circuits from enabling any transmission of tone signals from the subscriber unit to the base terminal while the demand power supply is being "powered up." Noise, for example, might otherwise cause such transmission.) Finally, the demand power supply 142 applies a high signal to lead PUF which, in conjunction with a high signal on the SL lead, prevents the channel search oscillator 520 from generating pulses on the CSO lead. The high signal on lead PUF also enables the output control circuit 558 to apply a high signal to its output lead $\overline{OC}$ following termination of low signal on lead RSX and providing the mode selector switch is in the "AUTO" position. This high signal on lead $\overline{OC}$ enables the output circuits 524, 526, 528 and 530 to operate. Thus, before the demand power supply is turned on, these output circuits are inhibited from operating. The above actions take place each time the demand power supply is turned on. The remaining output lines of the demand power supply 142 are for control purposes for indicating the status of the power supply as will be discussed later when describing FIG. 7.

In response to the low pulse on lead $\overline{RS}$, a timer reset and power down logic circuit 536 applies a high signal to lead TR (timer reset) thereby resetting a master timer 546 and at the same time inhibiting operation of the timer. In further response to the low pulse on lead $\overline{RS}$, the timer reset and power down logic 536 arms itself to apply a low signal to lead $\overline{PDA}$ if, after a predetermined interval, an idle tone has not been received by the subscriber unit. The low signal on lead $\overline{PDA}$ turns off the demand power supply 142 and causes the controlled reset logic 544 to apply a low pulse to lead $\overline{CRS}$, which in turn causes the reset logic 538 to apply a low pulse to lead $\overline{RS}$. The subscriber unit then commences searching for an idle channel.

As the name implies, the timer reset and power down logic circuit 536 controls the operation of the timer 546 and generates "power down" signals on leads $\overline{PDA}$ and $\overline{PD}$ which are used to turn off the demand power supply 142 upon the occurrence of certain events during the course of a telephone call.

Assuming that idle tone (representing the beginning of the called telephone number) is received following receipt of the seize tone, the $\overline{IL}$ lead is made low causing the timer reset and power down logic 536 to bring the TR lead low enabling the master timer 546 to commence operating. The master timer 546 produces output signals at various points in time indicated by the output leads thereof. Thus, the signal level on lead 25 is changed every 25 milliseconds following the commencement of operation of the master timer, the signal on lead 50 is changed every 50 milliseconds following commencement of operation, etc. Pulses are produced on leads CL and 350P every 25 and 350 milliseconds respectively following commencement of operation. These timing signals and pulses are used to control the operation of various ones of the other logic circuits. As will become apparent in the course of describing FIG. 5, the master timer 546 is automatically reset and started upon receipt of certain signals from the base terminal and upon the occurrence of certain operations in the control logic unit. Such automatic and periodic resetting and restarting eliminates the need for continually resynchronizing the master timer.

Receipt of the initial idle tone burst (following the seize tone) and of each subsequent idle tone burst causes a tone input logic circuit 570 to apply a low pulse via lead $\overline{ILP}$ to a digit decoder encoder 510. The tone input logic 570 was prevented from applying such a pulse to the digit decoder-encoder 510 previously because the demand power supply 142 was not yet turned on and therefore power was not being applied to the tone input logic. The pulses received by the digit decoder-encoder 510 correspond to the idle tone bursts received and therefore represent the called subscriber unit number. Each transition from either idle tone to seize tone or from seize tone to idle tone during receipt of the signals representing the called subscriber unit number, causes the tone input logic 570 to apply a low pulse via lead $\overline{TP}$ to the timer reset and power down logic 536. This pulse causes the timer reset and power down logic 536 to reset and restart the master timer 546.

The pulses applied via the $\overline{ILP}$ lead to the digit decoder-encoder 510 are counted by the encoder-decoder. After counting a group of such pulses (representing a digit of the called number), the 300 millisecond interdigit seize tone is transmitted by the base terminal. The transition from the last idle tone burst of the group to the seize tone causes the resetting and restarting of the master timer 546; and after the elapse of 175 milliseconds, the master timer applies a signal via lead 175 to the digit decoder-encoder 510. In response thereto, the decoder-encoder compares the count (of pulses from the tone input logic circuit 570) with a corresponding count "stored" in the encoder-decoder. The decoder-encoder 510 is, in effect, comparing a digit of the called number with a corresponding digit of the subscriber unit's phone or identification number to determine if the digits match and thus, ultimately, if the called number corresponds to the subscriber unit's number. If the digits compared do not match, the digit decoder-encoder 510 will, upon the subsequent receipt of a signal from the master timer 546 over lead 200, apply a "no parity pulse" to lead $\overline{NPP}$. This pulse causes the timer reset and power down logic 536 to apply a low pulse via lead $\overline{PDA}$ to the demand power supply 142 and the controlled reset logic 544 which as already discussed, turns off the demand power supply and causes the subscriber unit to commence searching for the next idle channel.

If the digits compared by the digit decoder-encoder 510 match, upon the subsequent receipt of a signal from the master timer 546 via lead 200, a pulse counter (located in the digit decoder-encoder) which counts the pulses received from the tone input logic circuit 570 is reset and the digit decoder-encoder 510 prepares to compare the next digit of the subscriber unit number with the next digit received from the base station. At this same time, a "parity pulse" is applied to lead $\overline{PP}$ causing the timer reset and power down logic 536 to apply a high signal via lead TR to the master timer 546 thereby resetting and inhibiting the timer from operating. The pulse on lead $\overline{PP}$ also arms the timer reset and power down logic 536 to apply a low signal to lead PDA if, after a certain predetermined period of time, the next group of idle tone pulses is not received from the base station (assuming that the previous group was not the last group to be received). The low signal on lead $\overline{PDA}$ would turn off the demand power supply 142 and reset the subscriber unit as already discussed. If the next group of idle tone bursts arrives before the termination of this predetermined period, the tone input logic circuit 570 applies a corresponding sequence of low pulses via the $\overline{ILP}$ Lead to the digit decoder-encoder 510 and in response thereto the decoder-encoder applies a high pulse via lead PR to the timer reset and power down logic 536. As a result, the timer reset and power down logic 536 is prevented from applying a low signal to lead $\overline{PDA}$, for which it was earlier armed, and is also caused to reset and restart the master timer 546. The control logic unit of FIG. 5 then continues processing the group of idle tone bursts then being received as previously described.

The digit decoder-encoder 510 maintains a count of the number of groups of pulses received from the tone input logic circuit 570, i.e., the number of received phone number digits, and, after receipt of the last digit of a number, the digit decoder-encoder places a high condition on lead LDS which resets and restarts the master timer 546. Then, upon receipt of a clock pulse from the master timer 546 via lead CL, the digit decoder-encoder 510 applies a low pulse to lead $\overline{LDP}$, a high pulse to lead LDP, and brings lead $\overline{LD}$ low. The low pulse on lead $\overline{LDP}$ causes the timer reset and power down logic 536 to generate a high pulse on lead TR to the master timer 546 resetting the master timer after which the master timer commences operating (when lead TR again goes low). The low pulse on lead $\overline{LDP}$ also "loads" a ringing logic circuit 508, i.e., sets a "ringing" flip-flop therein, causing the ringing logic circuit to apply a high signal to the "ring gate" lead, a low signal to lead $\overline{RFF}$, and a high signal to lead RFF. The high signal on the "ring gate" lead, as mentioned earlier in connection with FIG. 1, causes the amplifier 146 (FIG. 1) to increase its gain and thereby amplify the ringing signals to be received from the base terminal. The low signal on lead $\overline{RFF}$ causes a speaker mute circuit 516 to apply a signal to the muting circuit 118 (FIG. 1) via the "speaker mute" lead to enable the muting circuit to pass signals from the receiver 110 to the amplifier 146 of FIG. 1. Other functions of the speaker mute circuit 516 will be discussed in conjunction with FIG. 18. The high signal on lead RFF arms a no-answer logic circuit 506 to respond to certain conditions as will be described later. The high signal on lead RFF also arms an off-hook detector circuit 548 to generate a low signal on its output lead $\overline{HKP}$ when a hook switch 550 is placed in the "off hook" position as will be discussed later.

As indicated earlier, after receipt of the last digit of the called number, the digit decoder-encoder 510 applies a high pulse to lead LDP. This causes the C.S.O. lock circuit 512 to apply a low signal vai lead $\overline{CSL}$ to the channel search oscillator 520 thereby preventing the channel search oscillator from operating during the remainder of the call. The C.S.O. lock circuit 512 also in response to the high pulse on lead LDP, applies a high signal to an earphone mute circuit 518 causing the circuit to apply a signal via the "ear mute" lead to the muting circuit 118 enabling the muting circuit to pass signals from the receiver 110 to the earphone of telephone handset 122 of FIG. 1. Before describing the final operation resulting from the momentary high pulse on lead LDP, the operations resulting from the low signal on lead $\overline{LD}$ will be mentioned.

The low signal on lead $\overline{LD}$ is applied to the tone input logic circuit 570 to prevent the circuit from applying any signals to its output leads. The low signal on lead $\overline{LD}$ also prevents certain circuitry in the timer reset and power down logic 536 from interferring with the operation of the master timer 546.

The final operation initiated by the high pulse on lead LDP is to "load" an acknowledge memory circuit 514. This causes the acknowledge memory 514 to apply low signals to leads $\overline{AK}$ and $\overline{ACK}$, the latter of which causes the guard output circuit 524 to apply a low signal via lead $\overline{GX}$ to the tone generator 134 and to a transmitter turn-on logic circuit 540. The transmitter turn-on logic 540 then applies a signal via the $\overline{XMIT}$ lead to the FM transmitter 130 (FIG. 1) enabling or "turning on" the transmitter to transmit. Simultaneously therewith, the tone generator 134 is caused to generate the guard tone. Guard tone is thus transmitted to the base terminal to acknowledge reception of the transmitted subscriber unit number. The low signal applied to lead $\overline{AK}$ disables the off-hook detector 548 from responding to an off-hook indication from the hook switch 550 (hook switch in "off hook" position). This enables the completion of the acknowledge signalling interval without disruption from the hook switch 550.

Seven hundred and fifty milliseconds after the acknowledge memory 514 is loaded, the master timer 546 applies a signal via lead $\overline{750}$ to the acknowledge memory causing it to bring leads $\overline{AK}$ and $\overline{ACK}$ high again and thereby causing the termination of transmission of the guard tone. Upon termination of transmission of the guard tone, the base terminal commences to transmit the ringing signal sequence to the subscriber unit.

Recall that the no-answer logic circuit 506 was armed by a signal received over lead RFF. If leads $\overline{IL}$ and $\overline{SL}$ are both high for a predetermined period of time, indicating that the alternate idle and seize tone sequence of the ringing signal is no longer being received from the base terminal, and if lead $\overline{HK2}$ remains high indicating that the telephone handset has not been taken off the switch hook (i.e., the subscriber unit user has not answered the call), the no-answer logic circuit 506 applies a low signal to lead $\overline{NA}$ turning off the demand power supply 142 and causing a general resetting of the FIG. 5 control logic.

If the subscriber unit user removes the telephone handset from the switch hook in response to the ringing signal, the hook switch 550 is placed in the "off hook" position in response to which the off-hook detector circuit 548 (having been armed by the high signal on lead RFF) applies a low pulse to the timer reset and power down logic 536 via lead $\overline{HKP}$ causing it to reset and restart the master timer. The off-hook detector circuit 548 also applies a low signal to a connect memory circuit 532 via lead $\overline{HKP}$ thereby "loading" the memory circuit and causing it to apply a low signal to lead $\overline{CON}$. Lead CFF is also brought low at this time simply to ensure that lead DSCX is maintained low so that the disconnect sequence is not inadvertently commenced. The low signal on $\overline{CON}$ causes the connect output circuit 528 to signal the tone generator 134 and the transmitter turn-on logic 540 to transmit connect tone to the base terminal. 400 milliseconds after the commencement of the generation of the connect tone, the master timer 546 signals the connect memory 532 via lead $\overline{400}$ to bring the lead $\overline{CON}$ high again thereby causing termination of transmission of the connect tone. The connect memory 532, also in response to the signal received via lead $\overline{400}$, applies a low "connect trailing edge" signal to lead $\overline{CTE}$ turning off the demand power supply 142 and "loading" the disconnect memory 522. Turning off the demand power supply results in a low signal being applied to lead $\overline{RS}$ to reset, among other things, the ringing flip-flop of the ringing logic circuit 508.

"Loading" the disconnect memory 522 causes lead DSC to be made high and lead $\overline{DSC}$ to be made low. The high condition on lead DSC arms an on-hook detector circuit 552 to bring $\overline{PU}$ low when the telephone handset is placed on the switch hook following the conversation. The high condition on lead DSC also enables a channel hold generator 542 to generate channel hold signals a certain period after $\overline{XON}$ goes high indicating no transmission from the subscriber is occurring. These channel hold signals cause bursts of carrier frequency to be transmitted to the base terminal so that the base terminal will not take down the connection. The high condition on lead DSC also arms the on-hook detector 552 for purposes to be mentioned later. The low condition on $\overline{DSC}$ prevents the controlled reset logic 544 from generating a low signal on lead $\overline{CRS}$. "Loading" the disconnect memory 522 further causes a low signal to be applied to lead $\overline{LDS.CL}$ and this signal prepares the digit decoder-encoder 510 to maintain $\overline{LD}$ low when the demand power supply 142 is turned on again. This is necessary since, when the demand power supply is turned on again after completion of the conversation and replacement of the telephone handset on hook, the lead $\overline{LD}$ would otherwise be made high in response to the digit decoder-encoder 510 receiving the momentary low signal via $\overline{RS}$ lead. Maintaining $\overline{LD}$ low prevents the tone input logic circuit 570 from applying signals to its output leads.

Removal of the telephone handset from the switch hook also causes the off-hook detector 548 to apply a low signal to lead $\overline{HK3}$ a predetermined period of time after removal of the handset and to apply a high signal to lead HK2. The low signal on lead $\overline{HK3}$ enables a transmitter turn on logic circuit 540 to generate a low signal on lead $\overline{XMIT}$ if a push-to-talk switch 582 is depressed (closed to ground). The push-to-talk switch 582, which was discussed earlier, is located on the telephone handset for convenience. The high signal on lead HK2 disables operation of the channel search oscillator 520 as indicated earlier. Of course, at this stage of an incoming call the channel search oscillator 520 is already disabled. The feature of disabling the channel search oscillator 520 when the telephone handset is taken off hook is primarily employed to prevent initiation of an outgoing call before an idle channel has been located.

At the completion of the conversation, the subscriber unit user places the handset on the switch hook causing the hook switch 550 to be placed in the "on hook" position. The off-hook detector circuit 548 detects this condition and signals the on-hook detector circuit 552 which, since the DSC lead is high (recall that the DSC lead was made high when the disconnect memory 522 was loaded), signals the demand power supply 142 via the $\overline{PU}$ lead thus turning on the demand power supply. The demand power supply 142 then applies a high signal to lead PUF causing the output control circuit 558 to enable operation of the output circuits 524, 526, 528 and 530. The demand power supply 142 also signals the reset logic circuit 538 causing it to apply a low pulse to lead $\overline{RS}$. The controlled reset logic circuit 544 which normally generates a low pulse on $\overline{CRS}$ when the demand power supply 142 is turned on is prevented from doing so by the low signal on lead $\overline{DSC}$. Thus, the disconnect memory 522 is not reset at this time. The low signal on lead $\overline{RS}$ causes the resetting and inhibiting of the master timer 546 and causes the disconnect memory 522 to bring lead DSCX high. The high signal on lead DSCX causes the timer reset and power down logic 536 to start the master timer 546 operating. The low signal on lead $\overline{RS}$, in conjunction with power being supplied to the logic circuitry of the disconnect memory 522 by the demand power supply 142, also enables the disconnect memory 522 to commence to alternately signal the disconnect output 526 and the guard output 524 in response to signals received from the master timer 546 via lead 25. This causes generation of the disconnect signal sequence which consists of alternate disconnect and guard tones each of duration 25 milliseconds. The disconnect signal sequence continues for a period of 750 milliseconds after which the disconnect memory 522 in response to a signal from the master timer 546 via lead $\overline{\textbf{750}}$ generates a high signal on the $\overline{DSC}$ lead and a low "disconnect unload" pulse on the $\overline{DUL}$ lead, the latter causing the demand power supply 142 to turn off and causing the controlled reset logic circuit 544 to generate a low pulse on $\overline{CRS}$ and the reset logic circuit 538 to generate a low signal on lead $\overline{RS}$ and a high pulse on lead RS. The low signal on lead $\overline{CRS}$ resets the C.S.O. lock circuit 512 causing it to place a high condition on lead $\overline{CSL}$ and thus allowing the channel search oscillator 520 to commence generating channel search pulses on lead CSO so that the subscriber unit commences searching for an idle channel.

A novel feature of the present embodiment is the provision for resetting and restarting the master timer 546 during the initial contact signalling interval (interval B of FIG. 2) of an incoming call. The master timer is reset and restarted upon receipt by the subscriber unit of an idle tone or seize tone burst from the base terminal. Upon receipt of an idle tone or seize tone burst, signals are applied to leads IL and SL respectively causing the tone input logic 570 to produce relatively narrow pulses corresponding to the leading edges of the idle tone and seize tone bursts. These "edge" pulses are combined to produce a composite pulse train on lead TP which is supplied to the timer reset and power down logic 536 to cause same to supply a corresponding train of timer reset pulses via lead TR to the master timer 546. This resets and restarts the master timer 546 at the leading edge of each idle tone and seize tone burst appearing at the output of the receiver 110. This provision enables the utilization of a master timer 546 which is less complex and more economical than would otherwise be required. It also enables the control logic to tolerate variations in the time durations of the idle tone and seize tone bursts.

OUTGOING CALL — IMTS MODE

Assume that an idle channel has been located by the subscriber unit and that the idle tone timer 534 has timed for the presence of idle tone for the required 120 milliseconds and has thus "armed" the $\overline{PU}$ lead. The idle tone timer 534 will also have applied an enabling signal (high) by way of lead 535 to the off-hook detector circuit 548 enabling the off-hook detector to generate a low signal on lead $\overline{HKO}$ when the telephone handset 122 of FIG. 1 is taken off the switch hook. When the telephone handset is taken off the switch hook to place a call, the hook switch 550 is placed in the "off hook" position and the off-hook detector 548 is signalled accordingly. In response thereto, the off-hook detector circuit 548 applies a low signal via lead $\overline{HK2}$ to the idle tone timer 534 causing the idle tone timer to bring lead $\overline{PU}$ low thereby turning on the demand power supply 142 and causing the demand power supply to signal the reset logic 538 and the controlled reset logic 544 to generate low signals on leads $\overline{RS}$ and $\overline{CRS}$ respectively for resetting the FIG. 5 circuitry.

Also, in response to the hook switch 550 being placed in the "off hook" position, the off-hook detector 548 applies a low signal to a call base gating logic circuit 554 via lead $\overline{HKO}$ setting a pair of flip-flops therein and thereby causing a high signal to be applied to a "call base" or CB lead and a "dial request" or DR lead and a low signal to be applied to lead $\overline{CB}$. The low signal on lead $\overline{CB}$ and the high signal on lead CB will persist until the completion of the outgoing call if everything progresses in the normal manner. For an incoming call, these signals are not generated since the low signal on lead $\overline{HKO}$ is not produced for an incoming call because at the time the handset is taken off hook no enabling signal will be present on lead 535. The low signal on lead $\overline{HKO}$ also arms the call base gating logic 554 to generate signals on output leads $\overline{G}$, $\overline{C}$ and $\overline{IDR}$.

Placing the high condition on lead CB arms a call base dialing logic circuit 562 to respond to a signal on lead LDS and dialing pulses from a handset dial mechanism 574. The high signals on leads CB and DR also cooperate to arm the timer reset and power down logic 536 to respond to a signal on lead 425. The high signal on lead DR further arms the logic 536 to respond to other clock signals from the master timer 546. Lead DR remains high during intervals K, L and M of an outgoing call (FIG. 3). Bringing lead $\overline{CB}$ low inhibits the tone input logic circuit 570 from generating output signals, arms the disconnect memory 522 to respond to a signal on lead LDP from the digit decoder-encoder 510, inhibits the acknowledge memory 514 from responding to such signal on lead LDP, and causes the digit decoder-encoder 510 to inhibit for the present the application of signals to lead $\overline{NPP}$. The low signal on lead $\overline{CB}$ also causes the timer reset and power down logic 536 to start the master timer 546 operating. Upon arming the call base gating logic 554, a low signal is immediately generated on lead $\overline{G}$ and applied to the guard output circuit 524. In response thereto, the guard output circuit causes the tone generator and transmitter to generate and transmit guard tone to the base terminal. The guard output circuit 524 also signals the transmitter turn-on logic 540 causing it to mute the microphone of the telephone handset. The guard tone is transmitted by the subscriber unit for 350 milliseconds after which time the timer reset and power down logic 536 responds to a pulse received via lead 350P from the master timer 546 (having been armed by the high signal on lead DR) by "examining" lead $\overline{IL}$ to determine if an idle tone is being received by the subscriber unit. If it is, the timer reset and power down logic 536 does not apply a low signal to lead $\overline{PDA}$. If an idle tone is not being received, the timer reset and power down logic 536 does apply a low signal to lead $\overline{PDA}$ turning off the demand power supply and resetting the FIG. 5 control logic circuitry. Absence of the idle tone at this time would indicate that another subscriber unit has "captured" the idle channel for its own use.

After the 350 milliseconds of guard tone, the call base gating logic 554 in response to a low signal on lead $\overline{\mathbf{350}}$ and a high signal on lead 350 from the master timer 546 brings lead $\overline{G}$ high and lead $\overline{C}$ low respectively. This causes the guard output circuit 524 to signal the tone generator to cease generating guard tone and causes the connect output circuit 528 to signal the tone generator and the transmitter turn-on logic 540 to cause the generation and transmission of the connect tone. The microphone of the telephone handset also continues to be muted by the transmitter turn-on logic 540. The connect tone is transmitted for a period of 50 milliseconds, i.e., the time during which the low signal is applied to lead 350 and the high signal is applied to lead $\overline{\mathbf{350}}$, after which the guard tone is again transmitted.

Twenty-five milliseconds after the commencement of generation of the guard tone again, a signal is applied by the master timer 546 to the timer reset and power down logic 536 via the lead 425 causing the timer reset and power down logic to "examine" the $\overline{IL}$ lead to determine if the idle tone has been removed from the channel. If the idle tone has not been removed, the timer reset and power down logic 536 applies a low signal to lead $\overline{PDA}$ turning off the demand power supply and causing the control logic unit circuitry to reset. This result indicates that the subscruber unit was unsuccessful in "capturing" the idle channel since the base terminal did not remove the idle tone from the channel. If the idle tone has been removed, then the timer reset and power down logic 536 takes no action to apply a signal to the lead $\overline{PDA}$. The signal applied to lead 425 also causes the timer reset and power down logic 536 to bring lead TR high resetting and inhibiting the operation of the master timer 546 and to arm a timer in the logic 536. If the base terminal does not send the seize tone within a certain period of time, this timer causes a signal to be applied to lead $\overline{PDA}$ turning off the demand power supply 142. If the seize tone is received from the base terminal, the low signal applied to lead $\overline{SL}$ inhibits the timer from causing the application of the signal to lead $\overline{PDA}$. Also, upon receipt of the seize tone, a high signal is applied to lead SL causing a flip-flop in the call base gating logic 554 to be set. In response thereto, the call base gating logic brings lead $\overline{IDR}$ low causing the timer reset and power down logic to maintain the master timer 546 in the reset and "inhibit" condition until the seize tone is removed from the channel. After the seize tone is removed from the channel (by the base terminal), the timer reset and power down logic 536 allows the master timer 546 to commence operation. 175 milliseconds thereafter, the master timer 546 applies a signal via lead 175 to the call base gating logic 554 causing it to generate an "identification enable" signal (low) on lead $\overline{IDE}$ to thus enable the call base ID logic 556. Lead $\overline{IDE}$ remains low during interval N of an outgoing call (FIG. 3).

Enablement of the call base ID logic 556 will cause the logic to alternately generate, in response to pulses received via lead CL, a connect signal, a carrier only signal, a connect signal, a guard signal, a connect signal, a carrier only signal, etc. over the respective designated output leads. These signals serve to energize the guard output circuit 524, the connect output circuit 528, and the carrier only output circuit 530 to cause the generation of the subscriber unit identification signal sequence such as illustrated in interval N of FIG. 3. Upon the generation of each connect signal by the call base ID logic 556, a low signal is applied to lead $\overline{CP}$ and thus to the digit decoder-encoder 510 causing the digit decoder-encoder to maintain a count of the number of connect signals generated. The digit decoder-encoder 510 compares this count (each time it is increased) with a "stored" count representing a corresponding identification digit of the subscriber unit number. When the number of connect signals generated corresponds to the numerical value of the corresponding digit of the identification number, the digit decoder-encoder 510 applies a high "parity flip-flop" signal to lead PFF preventing further input of pulses via lead CL to the call base ID logic 556 and thus preventing further generation of output signals on the "connect" lead for a period of 175 milliseconds. After the 175 milliseconds period, a signal is applied via lead 175 to the digit decoder-encoder 510 causing it to remove the high signal from lead PFF thereby allowing the call base ID logic 556 to again receive pulses ove the CL lead. The call base ID logic 556 then commences to cause the generation of the next digit of the identification number of the subscriber unit. The above-described operation is then repeated.

After the last digit of the identification number has been transmitted to the base terminal the digit decoder-encoder 510 generates a "last digit" signal on lead $\overline{LD}$ (low signal) to cause the call base gating logic 544 to bring lead $\overline{IDE}$ high. This disables the call base ID logic 556. At this same time, the digit decoder-encoder 510 applies a signal via lead LDP to the disconnect memory 522 thereby "loading" the memory. The operations resulting from "loading" the disconnect memory were discussed earlier for an incoming call and will not be discussed again here.

At the same time the disconnect memory is "loaded," the digit decoder-encoder 510 brings lead LDS high and this enables the call base dialing logic 562 to generate an output in response to signals received from a handset dial mechanism 574. The subscriber unit user then listens for dial tone from the base terminal and upon receipt of same he may commence to dial the called number of the handset dial mechanism 574. "Cocking" the dial mechanism 574 causes closure of the switch labeled "cock" causing the call base dialing logic 562 to apply a low signal to lead $\overline{G}$, in turn, causing the generation of guard tone. When the dial mechanism 574 is released, the switch labeled "digit" alternately opens and closes causing the call base dialing logic 562 to periodically interrupt the low signal on lead $\overline{G}$ with a low pulse on lead $\overline{C}$. The number times the "digit" switch is opened corresponds to the numerical value of the digit being dialed. The alternate low signals on leads $\overline{G}$ and $\overline{C}$, in turn, cause the generation and transmission to the base terminal of alternate guard and connect tones representing the called number as illustrated in interval P of FIG. 3. As each digit of the called number is transmitted, the transmitter turn-on logic 540 applies a low signal via lead $\overline{TX}$ to the timer reset and power down logic 536 resetting a so-called "dialing out timer" located therein. This dialing out timer is controlled by lead DSC (which was made high upon "loading" the disconnect memory 522) and lead $\overline{HK2}$ from the off-hook detector 548, as well as by lead $\overline{TX}$. When $\overline{HK2}$ is low (telephone handset off hook) and lead DSC is high, the dialing out timer is "activated" to time during any period in which lead $\overline{TX}$ is high, i.e., when no tone signals are being transmitted to the base terminal so that leads $\overline{GX}$ (from the guard output circuit 524), $\overline{DX}$ (from the disconnect output circuit 526), $\overline{CX}$ (from the connect output circuit 528), and $\overline{COX}$ (from the carrier only output circuit 530) are high. If the dialing out timer times for approximately 10 seconds after the transmission of a digit of the called number, e.g., such as the last digit of the called number, the timer reset and power down logic 536 causes a signal to be applied to lead $\overline{PD}$ turning off the demand power supply 142. A low signal would also be generated on lead $\overline{PD}$ if dialing were never commenced.

If the called party answers, the conversation may commence. Channel hold signals are generated by the channel hold generator 542 during the course of the conversation under the same circumstances as for an incoming call.

When conversation is concluded and the subscriber unit user places the telephone handset on the switch hook, the disconnect operation as previously described for an incoming call is carried out.

MTS MODE

For operation in the MTS mode, the mode switch 578 is placed in the closed or "manual" position. This causes a mode control circuit 560 to apply a high signal to lead MA and a low signal to lead $\overline{MA}$. The high condition on lead MA causes the tone input logic circuit 570 to generate a low pulse on lead $\overline{ILP}$ and lead $\overline{TP}$ for each low signal received over either the lead $\overline{IL}$ or the $\overline{SL}$. Thus, for each transition from a seize tone to an idle tone or from an idle tone to a seize tone, a low pulse is generated on leads $\overline{ILP}$ and $\overline{TP}$. The digit decoder-encoder 510 counts the pulses recived via the $\overline{ILP}$ lead, and thus counts the transitions from seize tone to idle tone and vice-versa, which is necessary in the MTS mode since each transition, during the interval in which a subscriber unit number is being received, represents one bit of a digit of the number. (Recall that in the IMTS mode only transitions from seize to idle tones represented a bit.) The digit decoder--encoder 510 compares each group of counts representing a digit of the received number with a corresponding digit of the subscriber unit's phone number. If, after comparison of all digits, the received number matches the subscriber unit phone number, then the digit decoder-encoder 510 immediately energizes the ringing logic circuit 508 to, in turn, enable ringing signals received from the base terminal to actuate the speaker 150 of the subscriber unit (See FIG. 1).

Each low pulse applied to lead $\overline{TP}$ causes the timer reset and power down logic 536 to reset and restart the master timer 546.

The high signal on lead MA, in addition to being supplied to the tone input logic circuit 570, is also applied to the digit decoder-encoder 510 causing the decoder-encoder to change modes of operation so that the received called number digits will be compared with the appropriate "stored" digits of the subscriber unit number. In the MTS mode of operation, the called numbers consists of only five digits rather than seven digits as in the IMTS mode. Thus, when operating in the IMTS mode, the digits received will be compared with certain digits of the "stored" subscriber unit number whereas, when operating in the MTS mode, the digits received will be compared with certain other digits of the "stored" subscriber unit number. This will be explained in greater detail when describing the FIG. 10 digit decoder-encoder.

The low signal on lead $\overline{MA}$ is applied to the channel search oscillator 520 to prevent the oscillator from generating "channel search" pulses. Channel searching in the MTS mode is carried out manually, as already mentioned, and when an idle channel is found, the push-to-talk switch 582 is depressed to cause the transmission of carrier frequency to the base terminal to notify the base terminal that the subscriber unit user wishes to make a call.

The low signal on lead $\overline{MA}$ is also applied to the speaker mute circuit 516 enabling it to generate a high signal on the "speaker mute" lead to "unmute" the speaker provided the subscruber unit is not transmitting ($\overline{TX}$ and $\overline{XMIT}$ high) and the "speaker off switch" 515 is in the "ON" position. The low signal on lead $\overline{MA}$ is further applied to the earphone mute circuit 518 causing it to generate enabling signals to "unmute" the earphone of the telephone handset 122.

Finally, the mode control circuit 560 also signals the output control circuit 558 to apply a signal via lead $\overline{OC}$ to the guard output circuit 524, the disconnect output circuit 526, the connect output circuit 528 and the carrier only output circuit 530 to prevent such circuitry from enabling the generation of any tones during the operation of the subscriber unit in the MTS mode.

For a base terminal to subscriber unit call in the manual mode, the demand power supply is turned on and off in much the same manner as for the automatic mode although a number of circuits in the subscriber unit are disabled as indicated above. However, for a subscriber unit to base terminal call in manual mode, the demand power supply is never turned on. This is because no idle tone signal (or equivalent) is received by the idle tone timer and hence the idle tone timer never produces a power up signal on lead $\overline{PU}$ to turn on the demand power supply.

Figure 6:
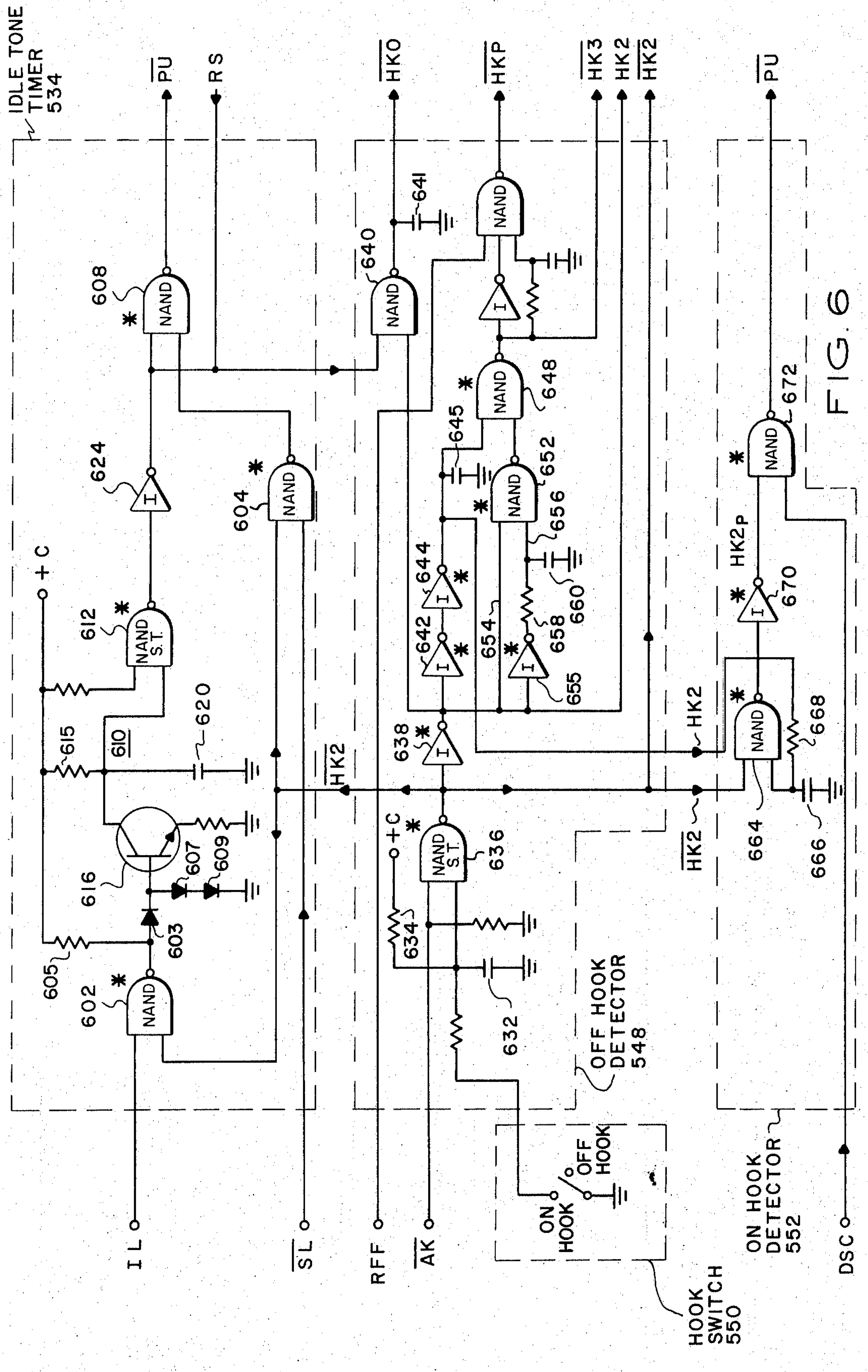
FIG. 6 shows in greater detail the construction of the idle tone timer, the off-hook detector and the on-hook detector portions of the FIG. 5 control logic.

DESCRIPTION OF FIG. 6 — IDLE TONE TIMER, OFF HOOK DETECTOR, ON-HOOK DETECTOR AND HOOK SWITCH

As noted earlier, the demand power supply 142 illustratively supplies power to all components of FIG. 6 (and FIGS. 7–18) except those connected directly to one of the terminals +A, +B, +C and −D and those designated by an asterisk. The FIG. 6 circuitry will not be described.

The principal function of the idle tone timer 534 of FIG. 6 is to turn on the demand power supply in preparation for an incoming or outgoing call. The idle tone timer generates a low signal on lead $\overline{PU}$ to turn on the demand power supply upon receipt of either a seize tone signal ($\overline{SL}$) or an off-hook signal ($\overline{HK2}$) following a period of 120 milliseconds of reception of idle tone.

Included in the idle tone timer are a number of NAND gates 602, 604 and 608, and a 120 milliseconds timing circuit 610 which includes a transistor 616, a capacitor 620 and a NAND Schmitt trigger 612. The timing circuit 610 is "off" when the output of the NAND gate 602 is high. When this condition exists, a diode 603 is forward biased and current flows from a power supply source +C through a resistor 605, the diode 603 and diodes 607 and 609 to ground. The voltage drop across diodes 607 and 609 turns on the transistor 616 which then provides a path to ground to maintain the capacitor 620 in a substantially discharged condition. The resulting low voltage level across the capacitor 620 causes the NAND Schmitt trigger 612 to produce a high output signal which is converted to a low signal by an inverter 624. The low output of the inverter 624 causes the NAND gate 608 to maintain lead $\overline{PU}$ high.

The idle tone timer generates a low signal on output lead $\overline{PU}$ in the following manner. When leads IL and $\overline{HK2}$ are both high (indicating respectively that the idle tone) is being received and that the telephone handset is on hook), the output of NAND gate 602 is low reverse biasing the diode 603 preventing the flow of current therethrough. This reduces the voltage at the base of the transistor 616 thereby placing the transistor in a non-conducting condition. With the transistor 616 in the non-conducting condition, the capacitor 620 commences to charge via a resistor 615 from the positive voltage source +C, If the high condition on leads IL and $\overline{HK2}$ continue for 120 milliseconds, the capacitor 620 reaches a voltage sufficient to trigger the NAND Schmitt trigger 612 causing it to generate a low output signal. The low signal is inverted by the inverter 624 to a high signal and applied to NAND gate 608. (Note that lead RS1 is high at this time.) Then, if the other input lead to NAND gate 608 becomes high thereafter, a low signal will be applied to lead $\overline{PU}$. The other input lead to NAND gate 608 will be made high if either input to NAND gate 604 is made low, i.e., if either $\overline{SL}$ is made low (indicating that seize tone is being received by the subscriber unit) or $\overline{HK2}$ is made low (indicating that the telephone handset has been taken off-hook). Of course, if either lead IL or $\overline{HK2}$ are made low before the end of the 120 millisecond interval, then the transistor 616 will be caused to conduct and discharge the capacitor 620 so that the NANA Schmitt trigger is not triggered and no low signal is applied to lead $\overline{PU}$.

The function of the off-hook detector circuit 548, as the name implies, is to determine when the telephone handset has been removed from its cradle or taken "off hook." As indicated above, when the telephone handset is taken off hook so that hook switch 550 is placed in the "off hook" position, lead $\overline{HK2}$ is made low. With the hook switch 550 in the "off hook" position, a capacitor 632 of the off-hook detector 548 commences to charge via a resistor 634 from a positive voltage source +C. When the voltage across the capacitor 632 reaches a certain level, and if lead $\overline{AK}$ from the acknowledge memory 514 is high, a NAND Schmitt trigger 636 is triggered bringing lead $\overline{HK2}$ low. When lead $\overline{HK2}$ is brought low, lead HK2 is made high by operation of an inverter 638. A high output from the inverter 638 together with a high output from inverter 624 of the idle tone timer 534 causes a NAND gate 640 to bring its output low. This causes a capacitor 641 to discharge so that lead $\overline{HK0}$ is eventially brought low.

A further action of bringing lead $\overline{HK2}$ low is to cause lead $\overline{HK3}$ to be brought low about one second thereafter. That is, when lead $\overline{HK2}$ is brought low, the output of inverter 638 is high causing an inverter 642 to produce a low output which, in turn, causes the output of an inverter 644 to be made high and this latter output commences to charge a capacitor 645. In the meantime, the high output of inverter 638 is applied to input 654 of a NAND gate 652. The high output of inverter 638 is also applied to an inverter 655 which inverts the high level to a low level. This low level is delayed, however, in being applied to input 656 of the NAND gate 652 by a delay circuit including a resistor 658 and a capacitor 660. During the delay, NAND gate 652, since both of its inputs are high, applies a low signal to NAND gate 648 causing it to apply a high signal to lead $\overline{HK3}$. After the delay, the low signal on input 656 of NAND gate 652 causes NAND gate 652 to apply a high signal to NAND gate 648 which, together with a high signal on the other input of NAND gate 648 (capacitor 645 having charged), causes NAND gate 648 to bring lead $\overline{HK3}$ low.

Finally, in a manner which is obvious in view of the above discussion and from an examination of FIG. 6, a momentary low pulse is generated on lead $\overline{HKP}$ when lead $\overline{HK2}$ is brought low.

The on-hook detector 552, whose function is apparent from its name, applies a momentary low signal to lead $\overline{PU}$ in response to lead $\overline{HK2}$ going high, lead HK2 going low and lead DSC being high. (Recall that lead $\overline{HK2}$ is high and lead HK2 low when the telephone handset 122 is on hook.) When the lead $\overline{HK2}$ input to NAND gate 664 goes high, the other input to the NAND gate 664 remains high momentarily due to the delay of the low signal on lead HK2 by the resistor 668 and capacitor 666. NAND gate 664 thus applies a low signal pulse to an inverter 670 which generates a high signal pulse which, in conjunction with a high signal on lead DSC, causes a NAND gate 672 to bring lead $\overline{PU}$ momentarily low.

The functions of the various output signals generated by the idle tone timer 534, off-hook detector 548 and on-hook detector 552 were discussed earlier in conjunction with FIG. 5 and will not be further discussed here.

Figure 7:
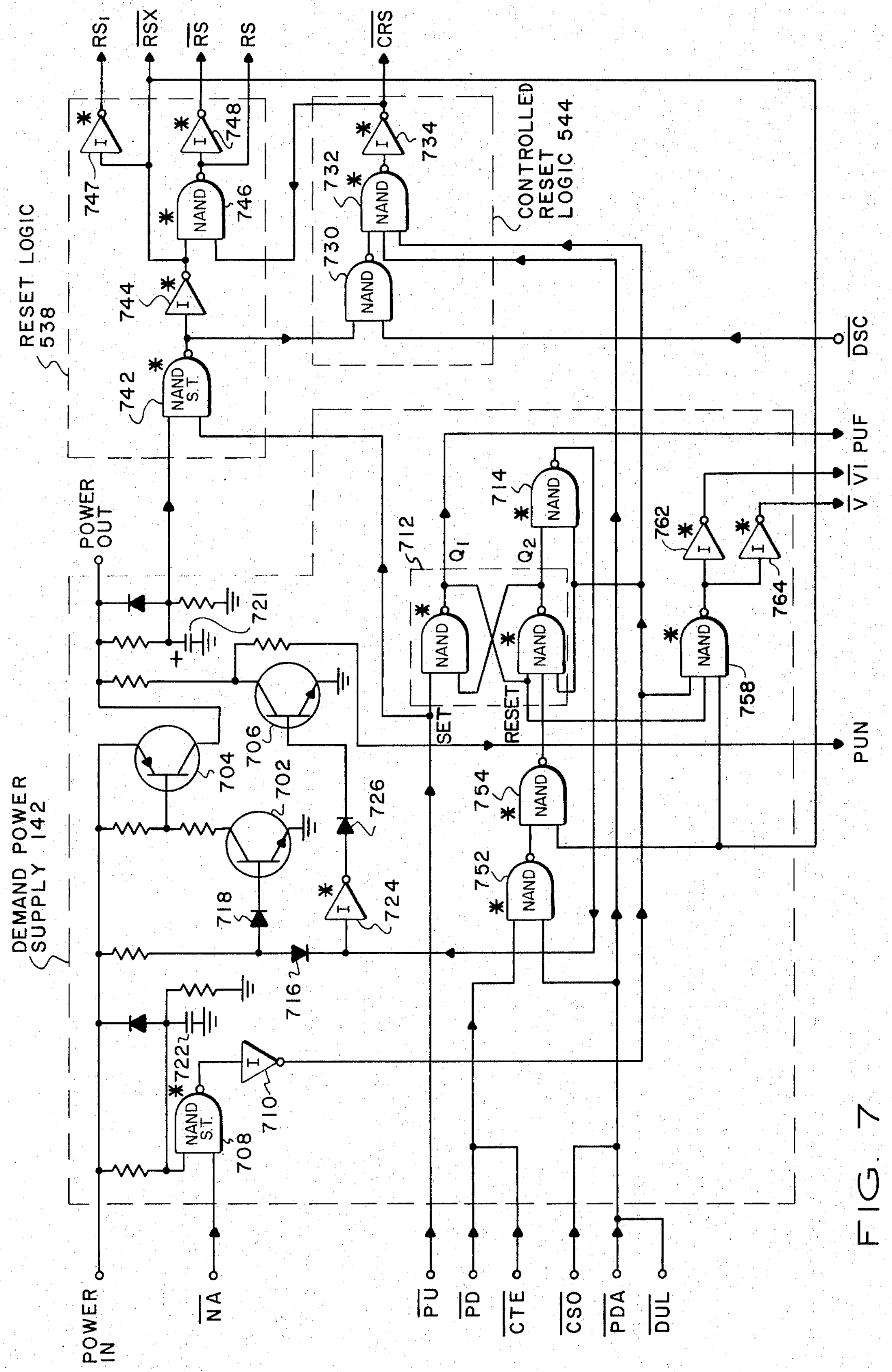
FIG. 7 shows in greater detail the construction of the demand power supply, the reset logic and the controlled reset logic portions of the FIG. 5 control logic.

DESCRIPTION OF FIG. 7 — DEMAND POWER SUPPLY, RESET LOGIC AND CONTROLLED RESET LOGIC

Referring to FIG. 7, power is supplied to the demand power supply 142 from the battery operated power supply 138 (FIG. 1) by way of the lead labeled "power in." The demand power supply, in turn, supplies power to various component units of the control logic unit 126 by way of the lead labeled "power out." Control of the application or transfer of power from the "power in" lead to the "power out" lead is effected by way of input leads $\overline{NA}$, $\overline{PU}$, $\overline{PD}$, $\overline{CTE}$, $\overline{CSO}$, $\overline{PDA}$ and $\overline{DUL}$. The demand power supply 142, together with the reset logic 538 and controlled reset logic 544 of FIG. 7, will now be described assuming that the battery operated power supply 138 has just been turned on to supply power to the control logic unit 126 and demand power supply 142 and that all input leads to the demand power supply 142 are placed in their normally high condition. Note that the reset logic 538 and controlled reset logic 544 receive their operating power directly from the battery operated power supply 142.

When power is initially applied to the "power in" lead, a capacitor 722 is in the "discharge" condition so that the voltage level at one input to a NAND Schmitt trigger 708 is low causing the output thereof to be high and thus the output of an inverter 710 to be low. With the output of inverter 710 low, the output of a NAND gate 714 is high to reverse bias a diode 716. Current applied to the "power in" lead thus flows via a diode 718 to the base of a transistor 702 creating a voltage which turns on the transistor. Turning on transistor 702 lowers the voltage level at the base of a transistor 704 turning on the transistor and thereby enabling the application of power from the "power in" lead to the "power out" lead. The low output of inverter 710 is also applied to a NAND gate 732 of the controlled reset logic 544 causing the NAND gate to apply a high signal to an inverter 734 so that the inverter brings output lead $\overline{CRS}$ low. Bringing lead $\overline{CRS}$ low causes lead RS to be brought low and lead $\overline{RS}$ to be made high by operation of NAND gate 746 and inverter 748.

Following the initial application of power to the "power in" lead, a capacitor 722 of the demand power supply commences to charge and when it reaches a certain predetermined level (and since lead $\overline{NA}$ is high), NAND Schmitt trigger 708 is triggered to apply a low signal to the inverter 710. The inverter 710 thus generates a high signal which, together with the high output on lead Q2 of a flip-flop 712 (which was reset by the previous low output from the inverter 710), causes NAND gate 714 to apply a low signal to the diode 716. The diode 716 is thus forward biased to divert current from diode 718, reverse biasing diode 718 and causing the transistor 702 to turn off and thus transistor 704 to turn off. The transfer of power from the "power in" lead to the "power out" lead is thus inhibited, i.e., the demand power supply 142 is turned off. In brief summary, when power is initially supplied to the "power in" lead, the demand power supply is momentarily turned on and leads $\overline{CRS}$ and $\overline{RS}$ are brought low and lead RS is brought high to generally reset the control logic unit 126 as discussed earlier.

An additional result of turning on the battery operated power supply 142 is that the output of a NAND Schmitt trigger 742 of reset logic 538 is made high (since a capacitor 721 of the demand power supply 142 is in the "discharge" condition) causing an inverter 744 to generate a low output signal. This brings lead $\overline{RSX}$ low and, by operation of an inverter 747, lead RSI high. The high condition on lead RSI enables the subsequent generation of a low signal on $\overline{PU}$ by the idle tone timer 534 and a low signal on lead $\overline{HK0}$ by the off-hook detector 548 (FIG. 5).

Now assume that power is being supplied to the "power in" lead of the demand power supply 142 but that the demand power supply is turned off. Under these conditions, the capacitor 722 is charged so that the NAND Schmitt 708 produces a low output causing the inverter 710 to produce a high output. Also, the flip-flop 712 is in the reset condition so that output lead Q2 thereof is high and thus the output of NAND gate 714 is low. To turn on the demand power supply 142, a low signal is supplied to lead $\overline{PU}$ setting the flip-flop 712 and thus causing a high signal to be generated on output Q1 of the flip-flop. This brings one of the inputs to the lower NAND gate of the flip-flop 712 high which, together with the other two inputs being high, causes the output lead Q2 of the flip-flop 712 to be brought low. NAND gate 714 thus generates a high output which, as previously discussed, causes the transistor 704 to conduct, i.e., causes the demand power supply 142 to turn on.

Setting the flip-flop 712 also causes a high signal to be applied to lead PUF which enables the output control circuit 558 (FIG. 5) to operate and which arms the channel search oscillator 520 (FIG. 5) to cease generating search pulses when a high signal is received via the SL input thereto. A further result of setting the flip-flop 712 and of causing the NAND gate 714 to generate a high signal is that an inverter 724 is caused to produce a low signal which reverse biases a diode 726 to turn off a transistor 706. With the transistor 706 turned off, a high signal is applied to the lead PUN enabling the no-answer logic circuit 506 (FIG. 5) to operate.

When the demand power supply 142 is first turned on by applying a low signal to $\overline{PU}$, leads RS and RSI are maintained high and leads $\overline{RS}$ and RSX are maintained low by operation of the NAND Schmitt trigger 742, the inverter 744, the NAND gate 746, and the inverters 747 and 748. Also, if input lead $\overline{DSC}$ to the controlled reset logic 544 is high, then, since the output of the NAND Schmitt trigger 742 is initially high, NAND gate 730 applies a low signal to NAND gate 732 which, in turn, applies a high signal to the inverter 734 causing it to maintain lead $\overline{CRS}$ low. After turning on the demand power supply 142, the capacitor 721 commences to charge and when it reaches a certain voltage level, the NAND Schmitt trigger 742 is triggered since the $\overline{PU}$ lead will now be high (after the momentary low signal to turn on the demand power supply) causing a low signal to be applied to the inverter 744 and the NAND gate 730. As is evident, this results in leads $\overline{RS}$, $\overline{RSX}$ and $\overline{CRS}$ being made high and leads RS and RSi being made low. The low signal on lead RSI inhibits the idle tone timer 534 and the off-hook detector 548 from generating low signals on leads $\overline{PU}$ and $\overline{HKO}$ respectively. The inadvertent generation of such low signals might otherwise disrupt the operation of the control logic unit 126.

The demand power supply 142 is turned off when low signals are applied to any one of the input leads $\overline{PD}$, $\overline{CTE}$, $\overline{CSO}$, $\overline{PDA}$, or $\overline{DUL}$. With any of these leads made low, a NAND gate 752 generates a high signal which is applied to one input of a NAND gate 754. The other input to the NAND gate 754 is also high if lead $\overline{PU}$ is high and if the demand power supply 142 has been on a sufficient period so that the capacitor 721 has reached a voltage sufficient to trigger the NAND Schmitt trigger 742 so that lead $\overline{RSX}$ is high. With both inputs to NAND gate 754 high, the output thereof is low and this resets the flip-flop 712 causing the output Q2 of the flip-flop to be made high. Since both inputs to the NAND gate 714 are high, the output thereof is low and as a result (as already described) the demand power supply 142 is turned off.

The demand power supply 142 is also turned off when lead $\overline{NA}$ from the no answer logic 506 goes low (when the subscriber unit user fails to answer a call). Specifically, the low signal on lead $\overline{NA}$ causes the NAND Schmitt trigger 708 to produce a high output which, in turn, causes the inverter to produce a low output. The low output from the inverter resets the flip-flop 712 and also causes a low signal to be produced on lead $\overline{RS}$ as already discussed. The low signal on lead $\overline{RS}$ causes the no answer logic 506 to bring lead $\overline{NA}$ high again resulting in the output of the inverter 710 again being brought high. Since the output Q2 of the flip-flop 712 is high (having been reset) and the output of the inverter 710 is high, NAND gate 714 produces a low output which, as already discussed, turns off the demand power supply.

When the demand power supply 142 is turned off, leads $\overline{V}$ and $\overline{VI}$ are brought low to "lock" certain logic circuitry of the control logic unit 126 in its then present condition. That is, when the flip-flop 712 is reset, output lead Q1 thereof is brought low causing a NAND gate 758 to produce a high signal. This high signal causes inverters 762 and 764 to produce low conditions on leads $\overline{VI}$ and $\overline{V}$ respectively. Leads $\overline{V}$ and $\overline{VI}$ and also brought low when either lead $\overline{RSX}$ is low or the output of the inverter 710 is low.

DESCRIPTION OF FIG. 8 — MASTER TIMER

Figure 8:
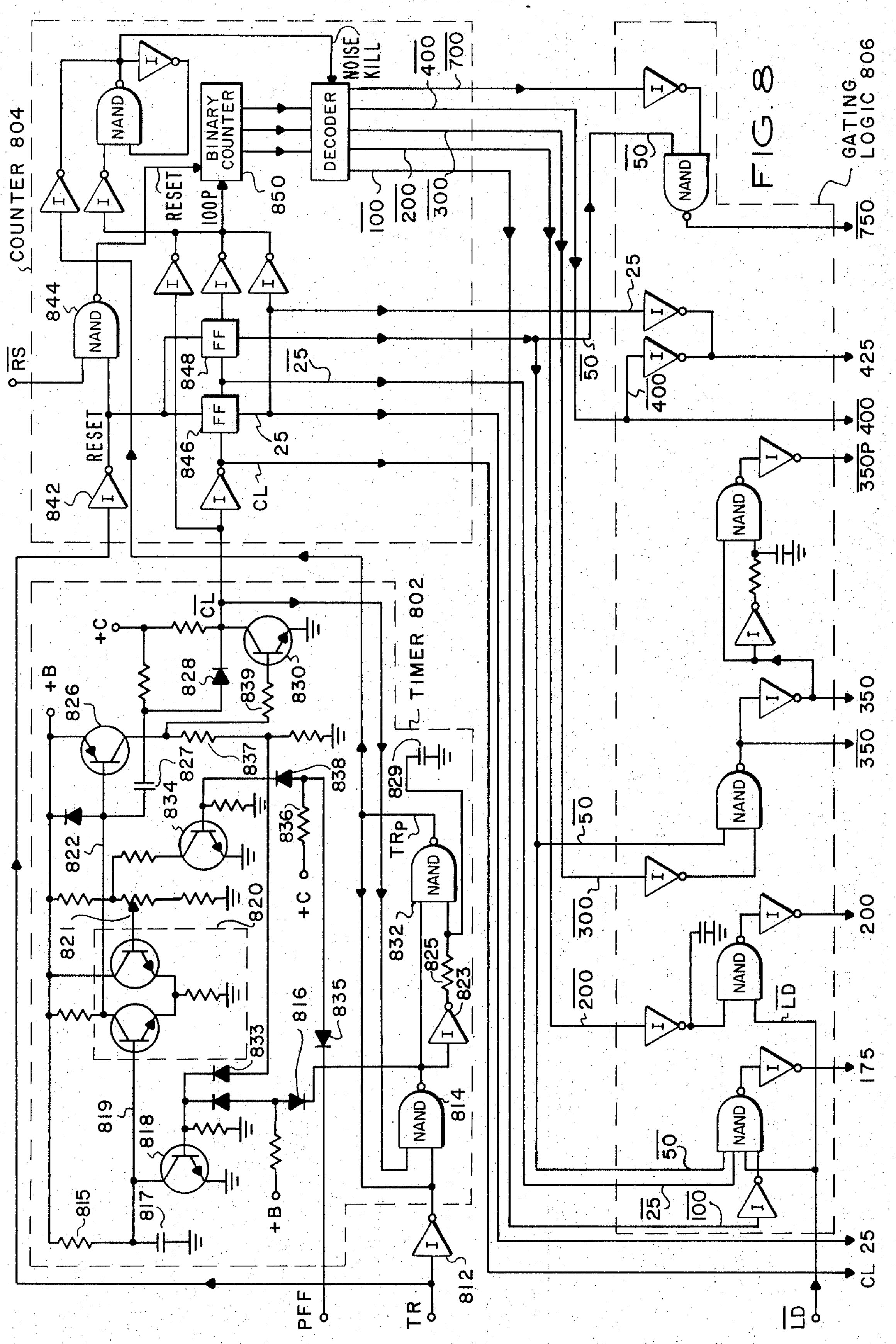
FIG. 8 shows in greater detail the construction of the master timer portion of the FIG. 5 control logic.

The master timer of FIG. 8 operates to generate signals or pulses at various time intervals to control the operation of other circuits of the control logic unit. The intervals at which the pulses or signals are generated are indicated by the numerals identifying these various output leads, except for lead CL on which a pulse is generated every 25 milliseconds while the master timer is operating.

The master timer of FIG. 8 includes a timer 802 which is enabled when input lead $\overline{TR}$ is made low so that the output of an inverter 812 to a NAND gate 814 is high. The output input to the NAND gate 814 is also normally high causing the output of the NAND gate to be made low forward biasing a diode 816 and thereby diverting the voltage of a positive voltage source +B away from the base of a transistor 818. This turns the transistor off causing a capacitor 817 to commence charging via a resistor 815 from a positive voltage source +B. When the voltage across the capacitor 817 exceeds the level of the voltage at the input 821 of a differential amplifier 820 (i.e., when the voltage level on lead 819 of the differential amplifier 820 exceeds the voltage on lead 821 thereof) the left-most transistor of the differential amplifier 820 turns on bringing the output lead 822 of the differential amplifier low and turning on a transistor 826. With transistor 826 turned on, positive voltage is applied via the transistor 826 and resistor 839 to the base of a transistor 830 turning on the transistor and thereby bringing lead $\overline{CL}$ low. Turning on the transistor 826 also enables a positive voltage to be applied via resistor 837 and a diode 833 to the base of the transistor 818 turning on the transistor so that the capacitor 817 commences to discharge. Bringing lead $\overline{CL}$ low causes NAND gate 814 to produce a high output signal which back biases the diode 816 to enable application of voltage from the voltage source +B to the base of the transistor 818. This further increases the conductivity of the transistor to accelerate the discharge of the capacitor 817. With the transistor 830 turned on, a diode 828 is forward biased to allow a capacitor 827 to charge (one side through the base of the transistor 826 and the other side through the diode 828 and the transistor 830). The capacitor 827 is chosen so that it will charge very rapidly to turn off transistor 826 which, in turn, turns off transistor 830 causing lead $\overline{CL}$ to be brought high after being low only a very short time. Backtracking momentarily, the high signal produced by NAND gate 814 in response to the low condition on lead $\overline{CL}$ is applied to one input of a NAND gate 832 and to an inverter 823. Since the resulting low signal produced by the inverter 823 is "delayed" from being applied to the other input of the NAND gate 832 by a delay circuit comprised of resistor 825 and capacitor 829, NAND gate 832 produces a low output signal which causes NAND gate 814 to maintain its high output for a short while after lead $\overline{CL}$ is brought high again. The purpose of this is to ensure that the transistor 818 remains on long enough to completely discharge the capacitor 817. When the low output from the inverter 823 "reaches" the NAND gate 832, NAND gate 832 produces a high output signal which, together with the high condition now on lead $\overline{CL}$ causes NAND gate 184 to generate a low output forward biasing the diode 816 and turning off the transistor 818. This enables the capacitor 817 to commence charging again. The above-described cycle is then repeated to successively generate low pulses on lead $\overline{CL}$. Lead PFF and the circuitry of the timer 802 to which it is connects (including two diodes and a transistor 834) is provided to increase the rate at which the timer 802 generates clock pulses on lead CL. This is done only during the interdigit periods in the identification interval O of FIG. 3 to meet telephone company requirements. Thus, when a high signal is applied to lead PFF, back biasing a diode 835, voltage is applied from a voltage source +C via a resistor 836 and a diode 838 to the base of the transistor 834 turning on the transistor. This lowers the voltage level at the input 821 of the differential amplifier 820 so that the differential amplifier generates a low signal on lead 822 at a sooner point in time after the capacitor 817 commences to charge. A pulse on lead $\overline{CL}$ is thus generated at a point sooner in time than it otherwise would be Each pulse generated by the timer 802 is applied to the counter 804 which maintains a count of the pulses and generates output signals when the count reaches certain values which are identified on the output leads of the counter 804. Thus, a low signal is produced on lead $\overline{100}$ after four pulses have been counted (each pulse representing a 25 millisecond interval), a low signal is produced on lead $\overline{200}$ after eight pulses have been counted, etc. The circuitry of the counter 804 for maintaining the count is well-known and the operation thereof is apparent from an examination of FIG. 8.

The master timer of FIG. 8 and specifically the counter 804 is reset each time lead TR is made high. Thus, when lead TR is made high, an inverter 842 of the counter 804 applies a low signal to a NAND gate 844 and to flip-flops 846 and 848 resetting the flip-flops. The low signal applied to NAND gate 844 causes the NAND gate to apply a high signal to a binary counter 850 for resetting the counter. A low signal on lead $\overline{RS}$ also causes resetting of the binary counter 815 by causing the NAND gate 844 to apply a high signal to the binary counter 850.

The gating logic 806 of the master timer is provided to generate output signals from various combinations of signals received from the counter 804. The signals generated and the time at which such signals are generated is indicated by the designations of the output leads of the gating logic 806. The circuitry for generating such output signals is standard circuitry and its operation is apparent. Lead $\overline{LD}$ is provided to inhibit the generation of signals on leads 175 and 200 whenever $\overline{LD}$ is made low.

DESCRIPTION OF FIG. 9 — TONE INPUT LOGIC

Figure 9:
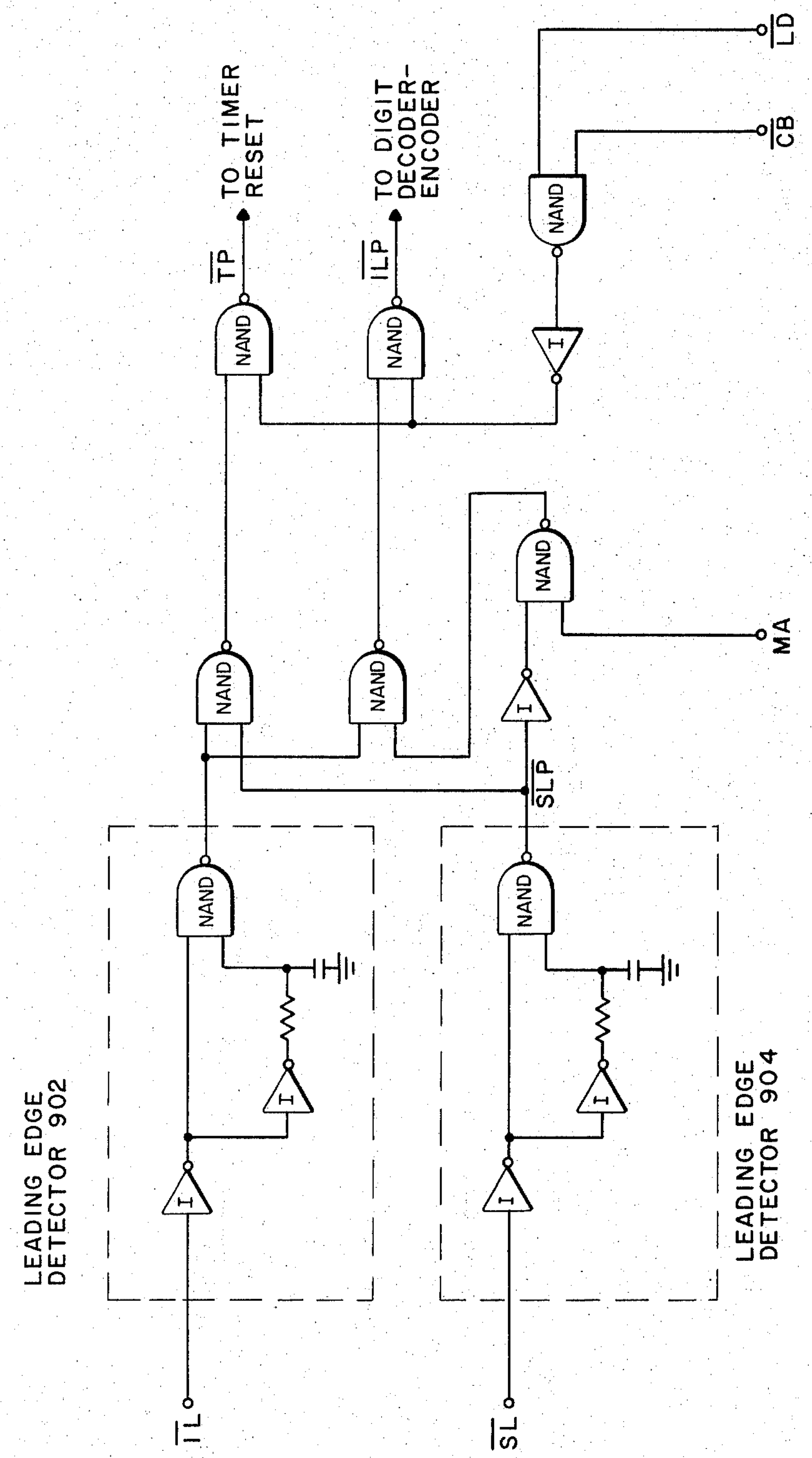
FIG. 9 shows in greater detail the construction of the tone input logic portion of the FIG. 5 control logic.

The tone input logic circuit of FIG. 9 provides for applying pulses to the timer reset and power down logic 536 (see FIG. 5) and to the digit decoder-encoder 510 in response to idle and seize tones being received by the subscriber unit. The tone input logic includes a leading edge detector 902 which generates a low output pulse each time lead $\overline{IL}$ is made low. Similarly, a leading edge detector 904 generates a low output pulse each time lead $\overline{SL}$ is made low. If leads $\overline{CB}$ and $\overline{LD}$ are both high, each time either of the detectors 902 or 904 generate a low output pulse, a low pulse is produced on lead $\overline{TP}$ which is connected to the timer reset and power down logic 536. A low pulse is also generated on lead ILP under these conditions if, in addition, lead MA is high. Lead MA is high, of course, when operating in the MTS mode and each transition from idle tone to seize tone or from seize tone to idle tone is considered a count or bit of the digits of a called number. When lead MA is low, low pulses are generated on lead $\overline{ILP}$ in response to low pulses from the detector 902 only. Thus, when in the IMTS mode, transitions only from seize tone to idle tone are considered counts or bits of the digits of a called number. Producing a low signal on either leads $\overline{CB}$ or $\overline{LD}$ inhibits the generation of low pulses on output leads $\overline{TP}$ and $\overline{ILP}$.

DESCRIPTION OF FIG. 10 — DIGIT DECODER-ENCODER

Figure 10:
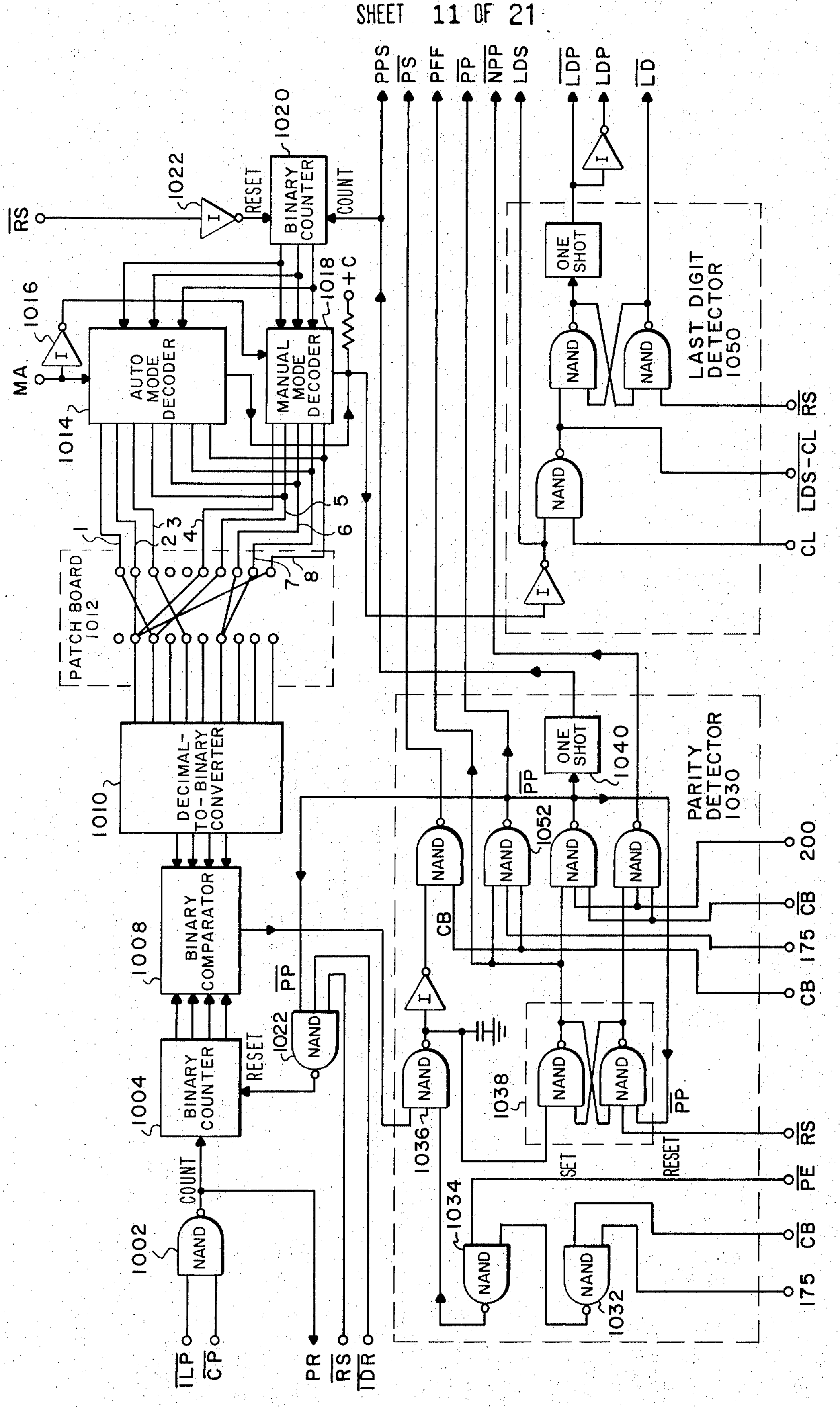
FIG. 10 shows in greater detail the construction of the digit decoder-encoder portion of the FIG. 5 control logic.

One of the principal functions of the digit decoder-encoder of FIG. 10 is to compare received called number digits with the digits of the "stored" subscriber unit ID or phone number and to generate output signals indicating the results of such comparison. The decoder-encoder provides for making the proper comparisons when operating in either the IMTS mode or the MTS mode. As previously indicated, seven digits are utilized in the subscriber unit number in the IMTS system whereas only five digits are utilized in the MTS system. Specifically, each subscriber unit is assigned a telephone company area code (three digits), office code (three digits) and station code (four digits). In an IMTS system, the area code plus station code is used to identify the subscriber units whereas in an MTS system, the last digit of the office code plus the station code is used to identify the subscriber units. In order for the subscriber unit of the present invention to be utilized with either an IMTS system or an MTS system, provision is made in the digit decoder-encoder of FIG. 10 so that either seven digits (if in the IMTS mode) or five digits (if in the MTS mode) of the "stored" subscriber unit ID number may be compared with a phone number transmitted from a base terminal. This provision will be explained later.

Assume that the base terminal is transmitting a called number to the subscriber unit of which the digit decoder-encoder of FIG. 10 is a part. Low pulses representing the received digits are applied to lead $\overline{ILP}$ and thus to a NAND gate 1002 in response to which the NAND gate 1002 applies a high pulse to a binary counter 1004. The binary counter 1004 counts the pulses representing each received digit and applies the binary-coded-decimal equivalent of the count to a binary comparator 1008. At the beginning of the comparison process, a binary counter 1020 applies a first set of signals to an automatic mode decoder 1014 and a manual mode decoder 1018. If lead MA is low, indicating that the subscriber unit is operating in the IMTS mode, the automatic mode decoder 1014 is enabled to operate. Alternatively, if lead MA is high, indicating the subscriber unit is operating in the MTS mode, an inverter 1016 supplies a low signal to enable the manual mode decoder 1018. The enabled decoder (1014 or 1018) responds to the first set of signals from the binary counter 1020 by applying a signal to one of its output leads indicating that the first digit of the "stored" ID number is to be compared with the first digit of the transmitted number. Thus, if the automatic mode decoder 1014 is enabled, a signal is applied to output lead 1 which corresponds to the first digit of the area code of the ID number. If the manual mode decoder 1018 is enabled, it applies a signal to its output lead 4 corresponding to the last digit of the office code of the ID number. This output signal from one of the decoders 1014 or 1018 is applied to a patch board 1012.

The patch board 1012 is utilized to "code" the subscriber unit ID number. That is, certain inputs of a decimal-to-binary converter 1010 are interconnected with certain outputs of the automatic mode decoder 1014 and the manual mode decoder 1018. A signal applied to one of the input leads of the decimal-to-binary converter 1010 causes the converter to generate the BCD equivalent of the digit represented by the particular input lead over which the signal was received. Each input lead of the converter 1010 represent a different one of the digits 1 through 9 with the zero digit being represented by the absence of an input to the converter 1010. For the illustrative interconnection of the patchboard 1012 of FIG. 10, a signal applied to output lead 1 of the automatic mode decoder 1014 would cause the converter 1010 to generate the BCD equivalent of 2. A signal on the output lead 4 of the manual mode decoder 1018 would cause the converter 1010 to generate the BCD equivalent of 1, etc.

The binary comparator 1008 compares the information received from the binary counter 1004 with that received from the converter 1010 and applies a high signal to its output if a match occurs and a low signal to its output if a mismatch occurs. Following the receipt of each digit of a transmitted number, a high signal is applied to lead 175 of a parity detector 1030 and this signal, together with the high signal on lead $\overline{CB}$ (high for an incoming call), causes a NAND gate 1032 to generate a low output signal. The low signal generated by NAND gate 1032 is applied to a NAND gate 1034 causing the NAND gate to apply a high signal to a NAND gate 1036. If the output of the binary comparator 1008 is high (indicating a match), the NAND gate 1036 generates a low signal which sets a flip-flop 1038. Setting the flip-flop 1038 will prevent the generation of a low signal on lead $\overline{NPP}$ (which would indicate a mismatch) when a high signal is subsequently received over lead 200. In addition, the generation of a low signal on lead $\overline{PP}$ (indicating a match) will be allowed upon receipt of the high signal on lead 200. When the low signal on lead $\overline{PP}$ is generated, it causes a one shot circuit 1040 to apply a signal to lead PPS which steps the binary counter 1020 causing it to apply a new set of signals to its output. This new set of signals, in turn, causes the automatic mode decoder 1014 or the manual mode decoder 1018, depending on which is enabled, to apply a signal to a different one of its output leads. After each digit of a transmitted number is received, the binary counter 1020 is caused to increase its count and thereby signal the appropriate one of the decoders 1014 or 1018 to apply a signal to a different one of its output leads, in effect, causing successive "read-out" of the "stored" ID number.

The low signal on lead $\overline{PP}$ also causes the resetting of flip-flop 1038 and the binary counter 1004 (via a NAND gate 1022) in preparation for comparing the next pair of digits.

If, upon comparison of a pair of digits, a mismatch occurs, NAND gate 1036 is caused to apply a high signal to flip-flop 1038 which does not change the condition of the flip-flop. Thus, upon the subsequent receipt of a high signal on lead 200, a low signal is generated on lead $\overline{NPP}$. The low signal on lead $\overline{NPP}$, of course, causes the subscriber unit circuitry to reset.

After the receipt of the last digit of a transmitted number, the manual mode decoder 1018 or the automatic mode decoder 1014 applies a signal to a last digit detector 1050 causing the detector to generate a low pulse on lead $\overline{LDP}$, a high pulse on lead LDP and a low signal on lead $\overline{LD}$. The functions of such signals were described earlier.

Now assume that the subscriber unit is transmitting the unit ID number so that lead $\overline{CB}$ is low and lead CB is high. Low pulses representing the digits of the ID number are received via lead $\overline{CP}$ from the call base ID logic 556 (FIG. 5). Each such pulse cause the NAND gate 1002 to apply a high signal to the binary counter 1004 which then increases its counter by one and applies the BCD equivalent of the count to the binary comparator 1008. In a manner similar to that described for the operation of the digit decoder-encoder for the receipt of digits, the decimal-to-binary converter 1010 applies a BCD equivalent of the digit of the ID number which is to be transmitted. In effect, this digit and the count output of the binary counter 1004 are successively compared. After each increase in the count of the binary counter 1004, a low signal is applied to lead PE by the call base ID logic 556. This causes NAND gate 1034 to apply a high signal to NAND gate 1036 so that if a high signal is being generated on the output of the binary comparator 1008 (indicating a match of the present count in the binary counter 1004 with the output of the converter 1010), NAND gate 1036 will generate a low signal to set flip-flop 1038. The results of this will be discussed shortly.

As long as a mismatch occurs between the count and the converter 1010 output, transmission of ID digit pulses to the base terminal are allowed. Specifically, flip-flop 1038 remains in the reset condition so that a low signal is applied to lead PFF and this enables the call base ID logic 556 to continue to cause the transmission of pulse representing the ID digit.

When the binary counter 1004 reaches a count which matches the output of the converter 1010, the binary comparator 1008 applies a high signal to NAND gate 1036 causing the flip-flop 1038 to set bringing lead PFF high, in turn, inhibiting the call base ID logic 556 from causing the generation of further ID pulses. Upon the occurrence of the match, lead $\overline{PS}$ is also brought low causing the timer reset and power down logic 536 (FIG. 5) to reset the master timer 546. Thereafter, when the master timer 546 applies a high signal to lead 175 of the parity detector 1030 of FIG. 10, a NAND gate 1052 applies a low signal to lead $\overline{PP}$ resetting the flip-flop 1038 and also the binary counter 1004. With the flip-flop 1038 reset, lead PFF is made low enabling the call base ID logic 556 to commence to cause the generation of further ID digit pulses. Just as in the case of receiving transmitted digits, after the last pair of digits is compared, the automatic mode decoder 1014 or the manual mode decoder 1018 applies a signal to the last digit detector 1050 causing it to generate output signals designated by the identifying symbols on the output leads.

Leads $\overline{RS}$ and $\overline{IDR}$ are for resetting various circuits of the digit decoder-encoder. Lead $\overline{LDS.CL}$ is for maintaining lead LD low after the disconnect memory is "loaded" as previously discussed.

The digit decoder-encoder of FIG. 10 in the manner described above provides a simple and economical means of enabling the subscriber unit to operate in either the IMTS mode or the MTS mode, for determining when the subscriber unit is being called, and for controlling the transmission of ID digits to the base terminal.

DESCRIPTION OF FIG. 11 — MEMORY CIRCUITS AND OUTPUT CIRCUITS

Figure 11:
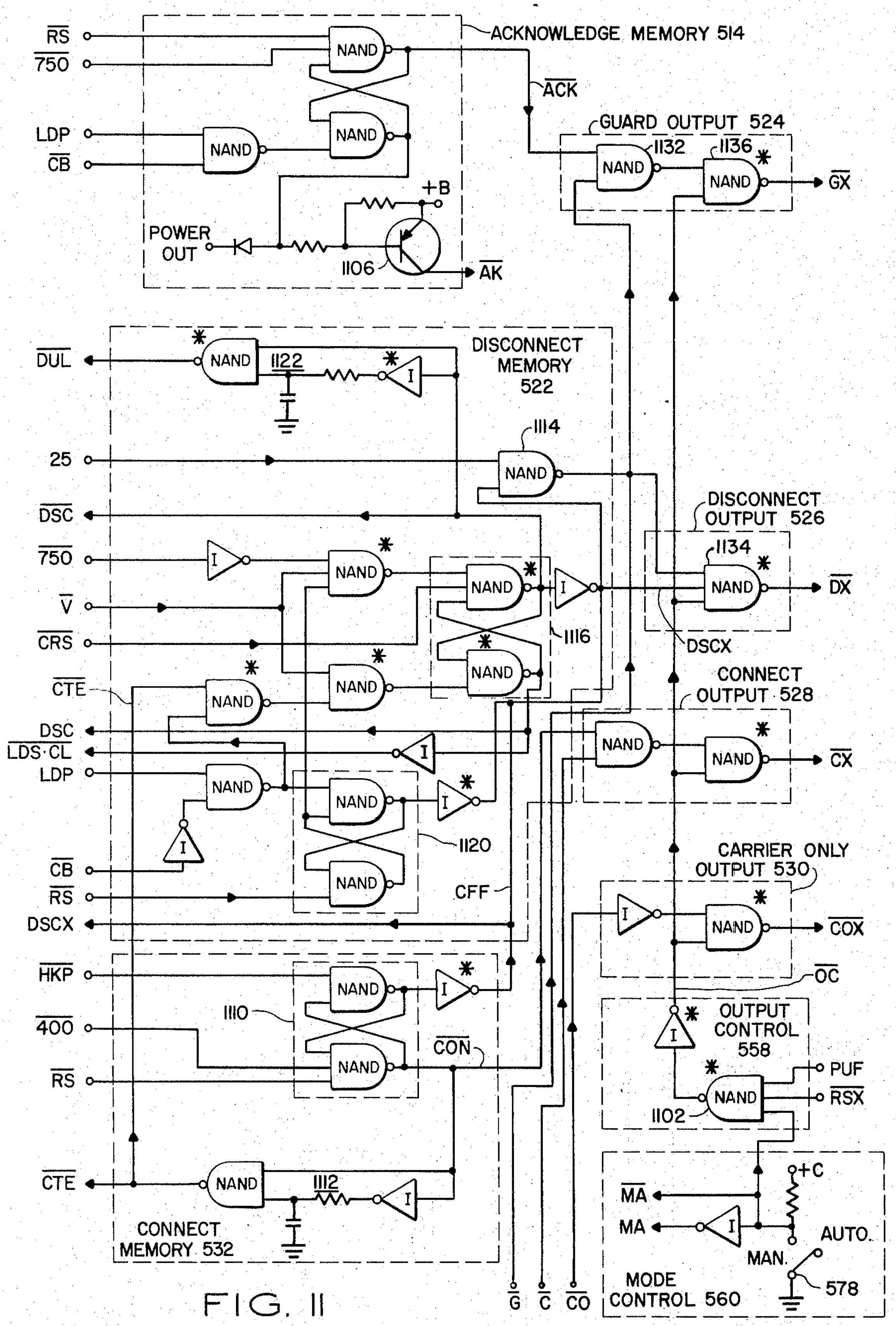
FIG. 11 shows in greater detail the construction of the acknowledgement memory, the disconnect memory, the connect memory, the guide output, the disconnect output, the connect output, the carrier only output, the output control and the mode control portions of the FIG. 5 control logic.
Figure 12:
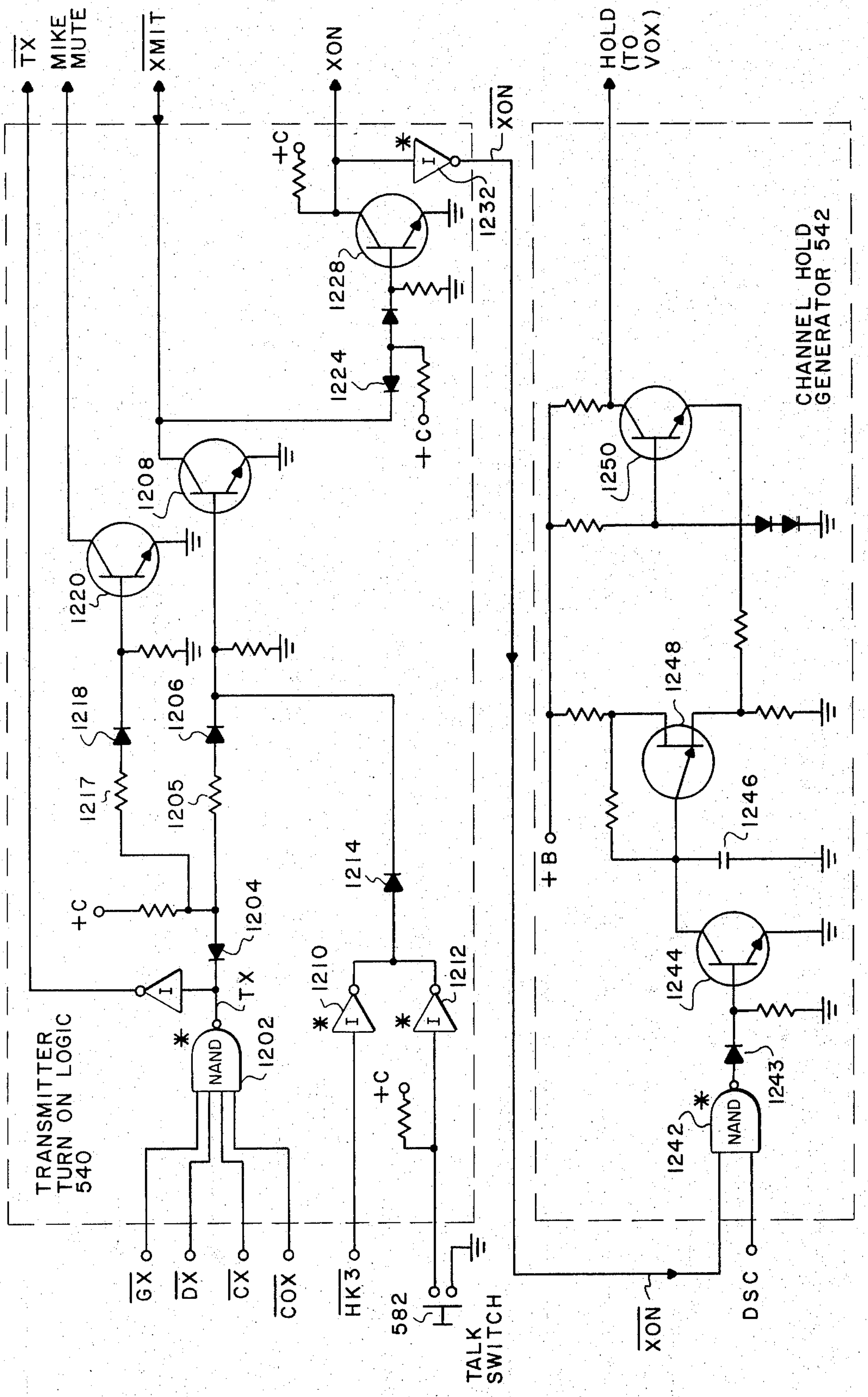
FIG. 12 shows in greater detail the construction of the transmitter turn-on logic and the channel hold generator portions of the FIG. 5 control logic.

The acknowledge memory 514, disconnect memory 522 and connect memory 532 shown in FIG. 11 are all utilized in the course of an incoming call. The disconnect memory 522 is also used in the course of an outgoing call. The guard output circuit 524, disconnect output circuit 526, connect output circuit 528 and carrier only output circuit 530 also shown in FIG. 11 are utilized to initiate and control the generation and transmission of guard tone, disconnect tone, connect tone and carrier frequency respectively in response to signals from the acknowledge memory 514, disconnect memory 522, connect memory 532 and leads $\overline{G}$, $\overline{C}$ and $\overline{CO}$. The output control circuit 558 provides for inhibiting the above-mentioned output circuits from causing the generation of the respective tones or carrier frequency whenever any of the inputs to a NAND gate 1102 are low. The mode control circuit 560 is utilized for operating the output control circuit 1102 and for generating signals on leads $\overline{MA}$ and MA for causing the subscriber unit to operate in either the IMTS or MTS mode. When the switch 578 is in the closed position, voltage from a positive voltage source +C is diverted to ground so that a low condition is placed on lead $\overline{MA}$ and a high condition on lead MA. Alternatively, when the switch 578 is placed in the open position, the voltage source +C places a high condition on lead $\overline{MA}$ and a low condition on lead MA.

The acknowledge memory 514 causes the generation of guard tone by applying a low signal to lead $\overline{ACK}$ upon the receipt of high signal over lead LDP and $\overline{CB}$ (the latter indicating that the subscriber unit is receiving an incoming call). Output lead $\overline{AK}$ of the acknowledge memory 514 also goes low when lead $\overline{ACK}$ goes low since a high signal is applied to the base of a transistor 1106 turning off the transistor thereby bringing lead $\overline{AK}$ low. The connection of the base electrode of the transistor 1106 via a resistor and diode to the "power out" terminal of the demand power supply 142 is provided to ensure the maintenance of lead AK high when the demand power supply is turned off.

The connect memory 532 causes the generation of connect tone (during interval E of FIG. 2) by bringing lead $\overline{CON}$ low upon the setting of a flip-flop 1110 in response to a low pulse over lead HKP. After 400 milliseconds, at which time lead $\overline{400}$ is made low, the flip-flop 1110 is reset bringing lead $\overline{CON}$ high terminating the generation of the connect tone and causing circuitry 1112 to generate a low pulse on lead $\overline{CTE}$.

The disconnect memory 522 causes generation of the disconnect tone by bringing lead DSCX high. Lead DSCX is made high when a flip-flop 1116 is set in response to either a low signal on lead $\overline{CTE}$ or a high signal on lead LDP (and assuming that lead $\overline{V}$ is high and lead $\overline{CP}$ is low). With lead DSCX high and a NAND gate 1114 generating a high output signal in response to lead 25 being low, the disconnect output circuit 526 generates a low signal on lead $\overline{DX}$.

To generate a disconnect signal sequence the input signal on lead 25 alternately goes high for 25 milliseconds, low for 25 milliseconds, etc. thereby alternately causing the generation of 25 milliseconds of guard tone and then 25 milliseconds of disconnect tone, etc. for an interval of 750 milliseconds. When lead 25 is high, NAND gate 1114 applies a low signal to NAND gate 1132 of the guard output circuit 524 and NAND gate 1134 of the disconnect output circuit 526. The resulting high output produced by NAND gate 1132 causes NAND gate 1136 to produce a low signal on lead $\overline{GX}$ which will cause the generation of guard tone. The resulting high output produced on lead $\overline{DX}$ by NAND gate 1134 will, of course, not result in the generation of disconnect tone. When lead 25 is low, the disconnect tone will be produced and the guard tone will not be produced. After 750 milliseconds, lead $\overline{750}$ goes low resetting flip-flop 1116 and thereby terminating the generation of alternate disconnect and guard tones. Resetting the flip-flop 1116 also results in a high signal being applied to lead $\overline{DSC}$ which, in turn, causes circuitry 1122 to apply a low pulse to lead $\overline{DUL}$. These signals cause resetting of the subscriber unit logic enabling the subscriber unit to commence searching for an idle channel. Note that flip-flop 1120 is set in response to a high signal on lead LDP to maintain lead DSCX in a low condition after receipt of the last digit of a phone number transmitted from the base terminal and until conversation commences, i.e., until lead $\overline{RS}$ is made low causing resetting of the flip-flop 1120.

DESCRIPTION OF FIG. 12 — TRANSMITTER TURN-ON LOGIC AND CHANNEL HOLD GENERATOR

The transmitter turn-on logic 540 is utilized for controlling the generation of carrier frequency and for generating certain other signals when such transmission is taking place. The transmitter turn-on logic 540 causes the generation of carrier frequency by bringing lead $\overline{XMIT}$ low in response to a low signal on either lead $\overline{GX}$, $\overline{DX}$, $\overline{CX}$, or $\overline{COX}$ or a low on lead $\overline{HK3}$ together with the talk switch 582 being closed. When a low signal appears on any of the first four mentioned leads, a NAND gate 1202 generates a high signal back biasing a diode 1204 enabling voltage from a positive voltage source +C to be applied via a resistor 1205 and diode 1206 to the base of a transistor 1208. This turns the transistor on bringing lead $\overline{XMIT}$ low. If lead $\overline{HK3}$ is low and switch 582 is closed, the resulting high signals from inverters 1210 and 1212 respectively forward bias a diode 1214 again turning on the transistor 1208 bringing lead $\overline{XMIT}$ low.

A low signal is also generated on lead $\overline{TX}$ whenever NAND gate 1202 generates a high signal. This signal is for resetting the "dialing out timer" of the timer reset and power down logic 536. In addition, when NAND gate 1202 generates a high signal, voltage from the positive voltage source +C is applied via a resistor 1217 and diode 1218 to a transistor 1220 turning on the transistor and bringing the lead labeled "mike mute" low to mute the microphone in the telephone handset 122 of FIG. 1. The speaker 150 of FIG. 1 is similarly muted when lead $\overline{XMIT}$ is made low since a diode 1224 of the transmitter turn-on logic 540 is forward biased to divert voltage from a voltage source +C away from the base of a transistor 1228 causing the transistor to turn off resulting in a high condition being placed on lead XON. The high signal on lead XON is applied to the muting circuit 118 (FIG. 1) causing it to prevent the application of signals from the FM receiver 110 to the amplifier 146 and speaker 150. The high signal on lead XON also inhibits the channel search oscillator 520 (FIG. 5) from generating channel search pulses.

Recall that the channel hold generator 542 generates so-called hold signals during lulls in transmitting frequency (lulls in transmitting voice or tone signals) from the subscriber unit to the base terminal to notify the base terminal that the connection is not to be "taken down." When carrier frequency is being transmitted from the subscriber unit to the base terminal, a low signal is applied by the VOX circuit 234 to lead $\overline{XMIT}$ and thus to the transmitter turn-on logic 540. As already described, this forward biases the diode 1224 turning off transistor 1228 and bringing lead XON high. The high signal on lead XON causes an inverter 1232 to apply a low signal to the channel hold generator 542 and specifically to NAND gate 1224. The low signal input to NAND gate 1242 causes the NAND gate to apply a high signal via a diode 1243 to the base of a transistor 1244 turning on the transistor to maintain a capacitor 1246 discharged. With the capacitor 1246 discharged, the voltage at the base of a unijunction transistor 1248 is not sufficient to cause the transistor 1248 to fire so that the emitter of a transistor 1250 is maintained low. The transistor 1250 is thereby maintained in the "ON" condition so that the lead labeled "hold" is maintained low and no channel hold signals are caused to be generated.

When carrier frequency is not being transmitted by the subscriber unit, lead $\overline{XMIT}$ is high to back bias a diode 1224 and cause the transistor 1228 to be turned on. This brings lead XON low and thus lead $\overline{XON}$ high causing NAND gate 1242 to generate a low output signal (since lead DSC is high at this time). The voltage level at the base of the transistor 1244 is thus brought low turning the transistor off and enabling the capacitor 1246 to commence charging. When the voltage across the capacitor 1246 reaches the trigger voltage of the unijunction transistor 1248, the unijunction transistor fires (assumes a conducting condition) enabling the capacitor 1246 to discharge through the unijunction transistor and bring the emitter of the transistor 1250 high. With the emitter of transistor 1250 made high, the transistor 1250 turns off so that the voltage at the collector of the transistor is brought high and thus the "hold" lead is made high. This signal on the "hold" lead causes the VOX circuit 234 of FIG. 2 to enable the transmission of a channel hold signal (a burst of carrier frequency) to the base terminal.

Following triggering of the unijunction transistor 1248, the unijunction transistor returns to a nonconducting condition and transistor 1250 turns on again bringing the "hold" lead low. The capacitor then commences to charge again until the voltage thereacross again reaches the trigger level of the unijunction transistor 1248 and the firing cycle described above is repeated.

DESCRIPTION OF FIG. 13 — RINGING LOGIC AND NO-ANSWER LOGIC

Figure 13:
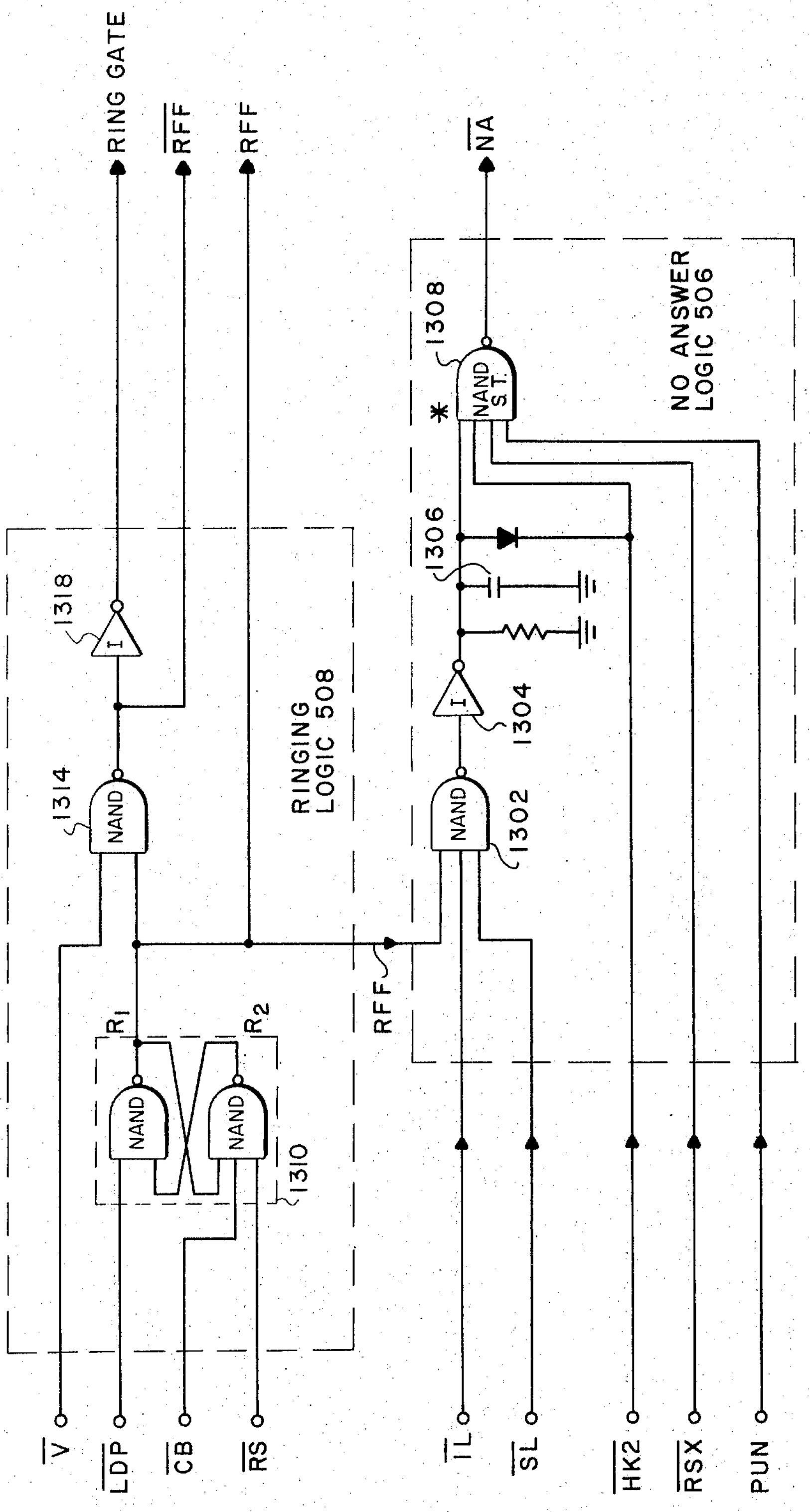
FIG. 13 shows in greater detail the construction of the ringing logic and the no-answer logic portions of the FIG. 5 control logic.

The ringing logic 508 of FIG. 13 operates to increase the gain of the amplifier 146 (FIG. 1) when a ringing signal sequence is being received from the base terminal as described earlier. This is accomplished by the ringing logic 508 bringing the "ring gate" lead high in response to a low signal on lead $\overline{LDP}$. A low signal on lead $\overline{LDP}$ sets a flip-flop 1310 causing a high signal to be applied to a NAND gate 1314. This high signal, together with the high signal on lead $\overline{V}$ causes the NAND gate 1314 to apply a low signal to an inverter 1318, thus causing a high signal to be generated on the "ring gate" lead.

In further response to a low signal being applied to lead $\overline{LDP}$, a high signal is generated on lead RFF and a low signal is generated on lead $\overline{RFF}$. The high signal on lead RFF, among other things, arms the no-answer logic 506 to respond to a predetermined period of absence of idle and seize tones. Thus, when RFF is high and when both $\overline{IL}$ and $\overline{SL}$ are high (indicating neither idle nor seize tone are being received), a NAND gate 1302 of the no answer logic 506 is caused to apply a low signal to an inverter 1304 causing the inverter to generate a high output. This high output commences to charge a capacitor 1306. If the high signals on leads $\overline{IL}$ and $\overline{SL}$ continue for the predetermined period of time, the capacitor 1306 reaches a level which will cause a NAND Schmitt trigger 1308 to apply a low signal to lead $\overline{NA}$ (providing leads $\overline{HK2}$, $\overline{RSX}$ and PUN are all high at this time). NAND gate 1308 is prevented from applying a low signal to lead $\overline{NA}$ if any of the leads $\overline{HK2}$, $\overline{RSX}$ or PUN are low. The low signal on $\overline{NA}$ turns off the demand power supply and causes the control logic unit circuitry to reset.

DESCRIPTION OF FIG. 14 — CALL BASE GATING LOGIC

Figure 14:
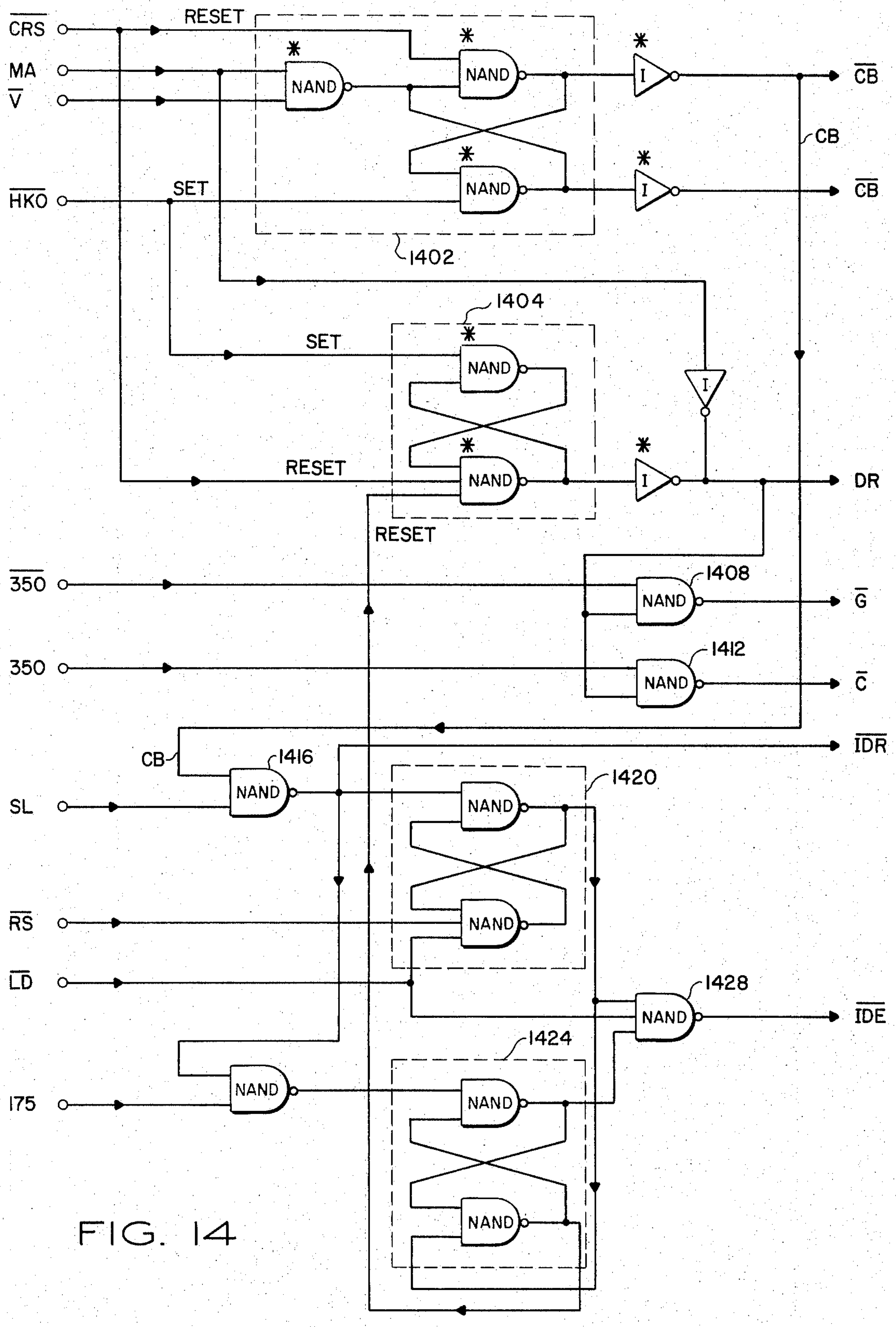
FIG. 14 shows in greater detail the construction of the call base gating logic portion of the FIG. 5 control logic.
Figure 15:
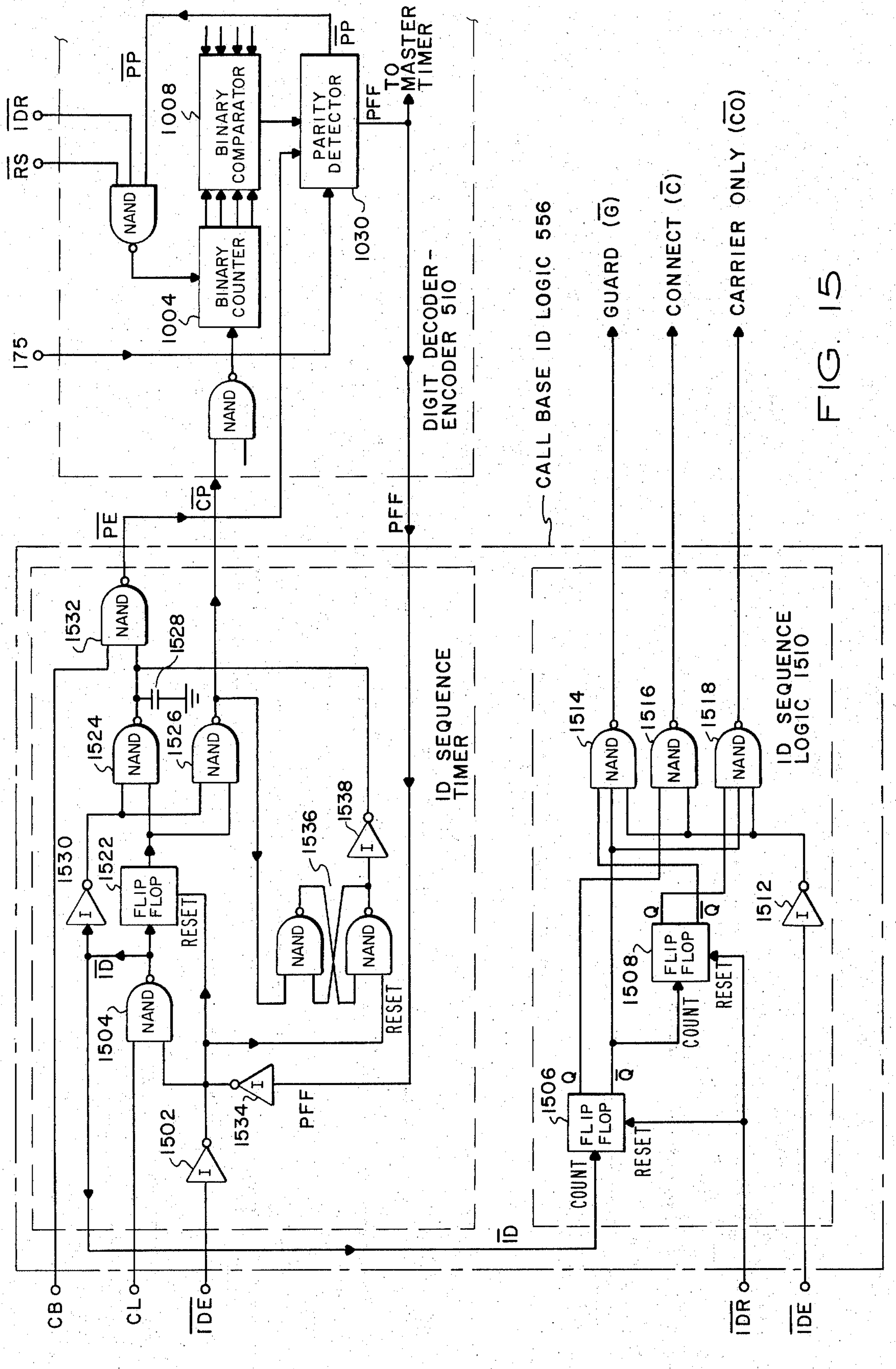
FIG. 15 shows in greater detail the construction of the call vase identification logic portion of the FIG. 5 control logic.

The call base gating logic of FIG. 14, in conjunction with the call base ID logic 556 (FIG. 5), controls the generation and transmission of the tone signals utilized in the initial contact and identification interval (FIG. 3) of an outgoing call. When the telephone handset is taken off the switch hook, lead $\overline{HKO}$ is made low setting flip-flops 1402 and 1404 of the call base gating logic. Setting flip-flop 1402 causes the application of a low signal to lead $\overline{CB}$ and a high signal to lead CB both of which are utilized to prepare the control logic unit for making an outgoing call as heretofore described. Setting flip-flop 1404 places a high condition on lead DR and this arms two NAND gates 1408 and 1412. The high condition on lead DR also arms the timer reset and power down logic 536 (FIG. 5) to bring lead $\overline{PDA}$ low in case seize tone is not received from the base terminal following the dial request procedure. Application of the high signal to NAND gate 1408 causes the NAND gate to bring lead $\overline{G}$ low (since lead $\overline{350}$ is high at this time) thereby causing the generation and transmission of guard tone. Generation of the guard tone continues for 350 milliseconds until lead $\overline{350}$ is made low and lead 350 is made high. At this time, NAND gate 1408 brings lead $\overline{G}$ high terminating the generation of guard tone and NAND gate 1412 brings lead $\overline{C}$ low causing the generation and transmission of connect tone. Connect tone is generated for 50 milliseconds and until lead $\overline{350}$ is made high again and lead 350 is made low at which time NAND gate 1408 brings lead $\overline{G}$ low causing guard tone to again be generated and NAND gate 1412 brings lead $\overline{C}$ high terminating the generation of connect tone.

Upon receipt of seize tone from the base terminal, lead SL is made high and, since lead CB is high due to flip-flop 1402 being set, a NAND gate 1416 applies a low signal to a flip-flop 1420 setting the flip-flop. Lead $\overline{IDR}$ is also made low at this time and this causes the timer reset and power down logic 536 to reset and prevent the master timer 546 (FIG. 5) from operating. Setting the flip-flop 1420 arms a flip-flop 1424 to respond to a high signal to be subsequently received over lead 175. After the seize tone is removed from the channel, NAND gate 1416 generates a high output so that lead $\overline{IDR}$ is made high. The high signal on lead $\overline{IDR}$ causes the timer reset and power down logic 536 to start the master timer 546 operating to ultimately generate a high signal on lead 175. Upon receipt of the high signal over lead 175, flip-flop 1424 is set causing a NAND gate 1428 to bring lead $\overline{IDE}$ low (since lead $\overline{LD}$ is high until the last digit of the identification number is transmitted on an outgoing call). Setting flip-flop 1424 causes the resetting of flip-flop 1404 and the removal of the high condition from lead DR. As a result, the NAND gate 1408 brings lead G high and the generation of guard tone is terminated. Bringing lead $\overline{IDE}$ low causes the call base ID logic 556 (FIG. 5) to initiate the generation of tone signals for the identification interval (FIG. 4). After the identification interval, lead $\overline{LD}$ is made low causing the NAND gate 1428 to bring lead $\overline{IDE}$ high.

DESCRIPTION OF FIG. 15 — CALL BASE ID LOGIC

The call base ID logic of FIG. 5 controls the transmission of the subscriber unit identification number to the base terminal. When the telephone handset is removed from the switch hook in preparation for making an outgoing call, the call base gating logic 554 (FIG. 5) applies a high signal to lead CB arming the call base ID logic of FIG. 15. After the initial contact is made with the base terminal, the call base gating logic 554 applies a low signal to lead $\overline{IDE}$ to enable the call base ID logic of FIG. 15 to commence generating the signals necessary to cause the transmission of appropriate guard and connect tone bursts representing the subscriber unit identification number. The low signal on lead $\overline{IDE}$ causes an inverter 1502 to apply a high signal to a NAND gate 1504 so that upon the subsequent receipt of clock pulses from the master timer 546 over lead CL, the NAND gate 1504 will apply low pulses to its output lead $\overline{ID}$.

Before the first of the low pulses is produced on lead $\overline{ID}$, flip-flops 1506 and 1508 of ID sequence logic 1510 are both in the reset condition in response to a low signal having been received via lead $\overline{IDR}$ from the call base gating logic 554 (so that output leads $\overline{Q}$ of both the flip-flops are high and output leads Q of both the flip-flops are low). When the call base ID logic is first enabled by application of a low signal to lead $\overline{IDE}$, an inverter 1512 applies a high signal to NAND gates 1514, 1516 and 1518. Since flip-flop 1506 is applying a high signal to its output lead $\overline{Q}$, NAND gate 1514 applies a low signal to the output lead labeled "guard.". This low signal is applied to the guard output circuitry 524 which causes the generation and transmission of guard tone to the base terminal.

Upon production of the first low pulse on lead $\overline{ID}$ (specifically the trailing edge of the low pulse), flip-flop 1506 is caused to apply a low signal to its output lead $\overline{Q}$ and a high signal to its output lead Q. This results in the NAND gate 1514 applying a high signal to the "guard" output lead and NAND gate 1516 applying a low signal to the output lead labeled "connect." Generation and transmission of the guard tone is thereby terminated and connect tone is generated and transmitted to the base terminal. Upon application of the next low pulse to lead $\overline{ID}$, the flip-flop 1506 is triggered to again apply a high signal to its output lead $\overline{Q}$ and a low signal to its output lead Q. The high signal on output lead $\overline{Q}$ of the flip-flop 1506 causes the flip-flop 1508 to apply a low signal to its output lead $\overline{Q}$ and a high signal to its output lead Q. Since the inputs to NAND gate 1518 are high, a low signal is applied the output lead labeled "carrier only" and carrier frequency is thus generated and transmitted to the base terminal. Upon application of the next low pulse to lead $\overline{ID}$, the flip-flop 1506 again changes the conditions on both of its output leads bringing lead $\overline{Q}$ low and lead Q high. With flip-flop 1506 output leads $\overline{Q}$ low and Q high, NAND gate 1518 applies a high signal to its output and NAND gate 1516 applies a low signal to its output. Connect tone is thus again generated and transmitted to the base terminal. With the next low pulse on lead $\overline{ID}$, the output signals on both flip-flops 1506 and 1508 are changed so that NAND gate 1514 again generates a low output signal causing the generation and transmission of guard tone. In the manner described, the call base ID logic causes the generation of guard tone, connect tone, carrier only, connect tone, guard tone, connect tone, etc. Note that flip-flop 1506 changes condition with each low pulse (i.e., trailing edge) received over lead $\overline{ID}$ and flip-flop 1508 changes condition with every other low pulse received over lead $\overline{ID}$.

After each connect tone signal is generated on the "connect" output lead, a low pulse is applied via lead $\overline{CP}$ to the digit decoder-encoder 510 providing the decoder-encoder with an indication of the number of connect tone bursts generated. This is accomplished by a flip-flop 1522 which responds to the initial low pulse on lead $\overline{ID}$ by applying a high signal to NAND gate 1526 which, together with the high signal applied to the other input of the NAND gate 1526 (by way of an inverter 1530 from the $\overline{ID}$ lead) results in a low pulse being applied to the lead $\overline{CP}$. Upon the application of the next low pulse to lead $\overline{ID}$, the flip-flop 1522 applies a low signal to its output lead so that NAND gate 1526 is inhibited from applying a low pulse to lead $\overline{CP}$. Then, upon application of the next low pulse to lead $\overline{ID}$, the flip-flop 1522 brings its output lead high and NAND gate 1526 again applies a low pulse to lead $\overline{CP}$. Thus, with every other low pulse produced on lead $\overline{ID}$, a low pulse is similarly produced on lead $\overline{CP}$ and these latter pulses are counted by the binary counter 1004 as already described in connection with FIG. 10.

After each low pulse is produced on lead $\overline{CP}$ and lead $\overline{ID}$ returns to a high condition, the inverter 1530 applies a low signal to a NAND gate 1524 causing it to generate a high signal on its output lead. This causes a capacitor 1526 to commence charging. When the voltage across the capacitor 1526 reaches a certain level, NAND gate 1532 is caused to generate a low signal on lead $\overline{PE}$ (since lead CB is high at this time). The low signal on lead $\overline{PE}$ enables the parity detector 1030 of the digit decoder-encoder 510 to receive from the binary comparator 1008 the results of comparing the count then stored in the binary counter 1004 with the corresponding digit of the subscriber unit's identification number. If the comparison result indicates a match (in turn indicating that the correct number of connect tone bursts have been transmitted), the parity detector applies a high signal to lead PFF causing an inverter 1534 to apply a low signal to the NAND gate 1504 inhibiting further application of low pulses to lead $\overline{ID}$ in response to clock pulses received over lead CL. WIth the production of low pulses on lead ID inhibited, the ID sequence logic 1510 remains in its then-present condition. Depending upon which digit of the subscriber unit identification number was represented by the previously transmitted group of connect tones, the ID sequence logic 1510 will at this time be applying a low signal to either the "guard" lead or the "carrier only" lead. After a period of 175 milliseconds, the high signal on lead PFF is removed by the digit decoder-encoder 510 and the process of generating appropriate guard, connect and carrier only signals representing the next digit in the subscriber unit identification number is commenced.

Flip-flop 1536 is provided to prevent generation of a low signal on lead $\overline{PE}$ during the 25 milliseconds preceding the arrival of the first clock pulse over lead CL. This is necessary to prevent any premature comparison results from being received by the parity detector 1030. The flip-flop 1536 is reset whenever lead $\overline{IDE}$ is made high (preceding and following generation of the subscriber unit identification number) as a result of a low signal received from the inverter 1502. When the flip-flop 1536 is reset, a high signal is applied to an inverter 1538 causing it to bring its output low. With the output of inverter 1538, low, capacitor 1528 is prevented from charging so that NAND gate 1532 maintains lead $\overline{PE}$ in a high condition. Upon generation of the first pulse on lead $\overline{CP}$, flip-flop 1536 is set causing the inverter 1538 to bring its output high and thereby enable the capacitor 1528 to charge in response to a high output signal from NAND gate 1524.

After generation and transmission of the last digit of the identification number, the digit decoder-encoder 510 signals the call base gating logic 554 causing it to apply a high signal to lead $\overline{IDE}$ disabling the call base ID logic from further operation.

DESCRIPTION OF FIG. 16 — CALL BASE DIALING LOGIC

Figure 16:
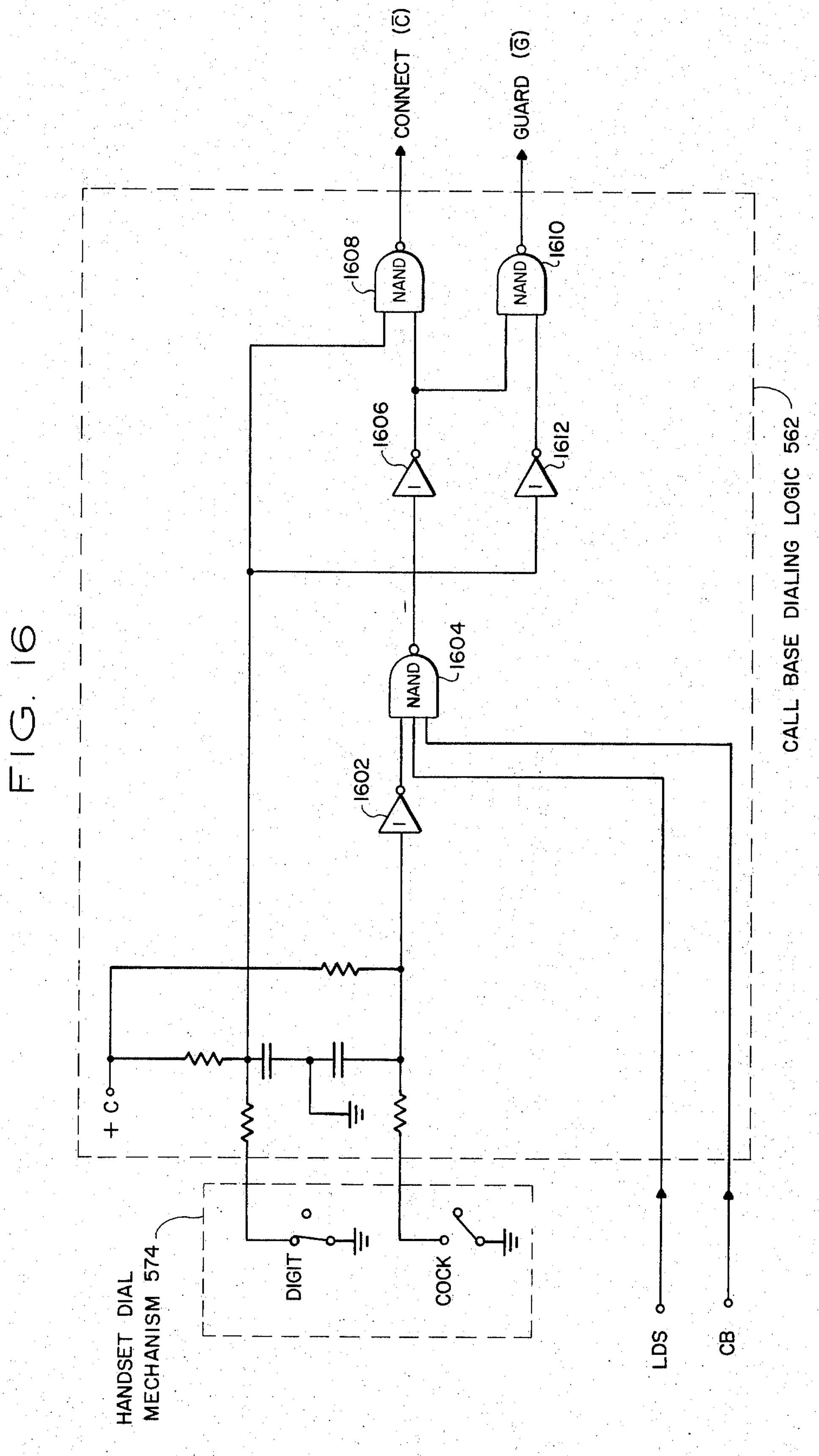
FIG. 16 shows in greater detail the construction of the call base dialing logic portion of the FIG. 5 control logic.

The call base dialing logic of FIG. 16 simply provides for the generation of alternate connect and guard tone signals representing the called number. After the preliminary actions have taken place in preparation for dialing the number, leads LDS and CB are in the high condition. When the handset dial mechanism 574 is "cocked," the switch labeled "cock" is closed diverting to ground the voltage from a positive voltage source +C and causing an inverter 1602 to apply a high signal to a NAND gate 1604. Since the other inputs to the NAND gate 1604 are also high, the NAND gate applies a low signal to an inverter 1606 causing it to apply a high signal to NAND gate 1608 and 1610. At this time, the switch labeled "digit" of the handset dial mechanism 574 is also closed diverting voltage from the voltage source +C to ground away from an inverter 1612. The output of the inverter 1612 is thus high and this together with the high output of the inverter 1606 causes the NAND gate 1610 to apply a low signal to the "guard" output lead. When the handset dial mechanism 574 is released, the switch labeled "digit" is alternately opened and closed resulting in low signals being generated on the "connect" lead and "guard" leads respectively. Specifically, when the switch labeled "digit" is open, the voltage from the voltage source +C to the NAND gate 1608 and to the inverter 1612 causes the NAND gate 1608 to apply a low signal to the "connect" lead and causes the inverter 1612 to apply a low signal to the NAND gate 1610 which thus applies a high signal to the "guard" lead. When the switch labeled "digit" is closed, voltage is diverted from both the NAND gate 1608 and the inverter 1612 so that the NAND gate 1608 applies a high signal to the "connect" lead and the NAND gate 1610 is caused to apply a low signal to the " guard" lead. The call base dialing logic of FIG. 16 is disabled from generating connect or guard signals whenever a low signal is applied to either lead LDS or CB.

DESCRIPTION OF FIG. 17 — TIMER RESET AND POWER DOWN LOGIC

Figure 17:
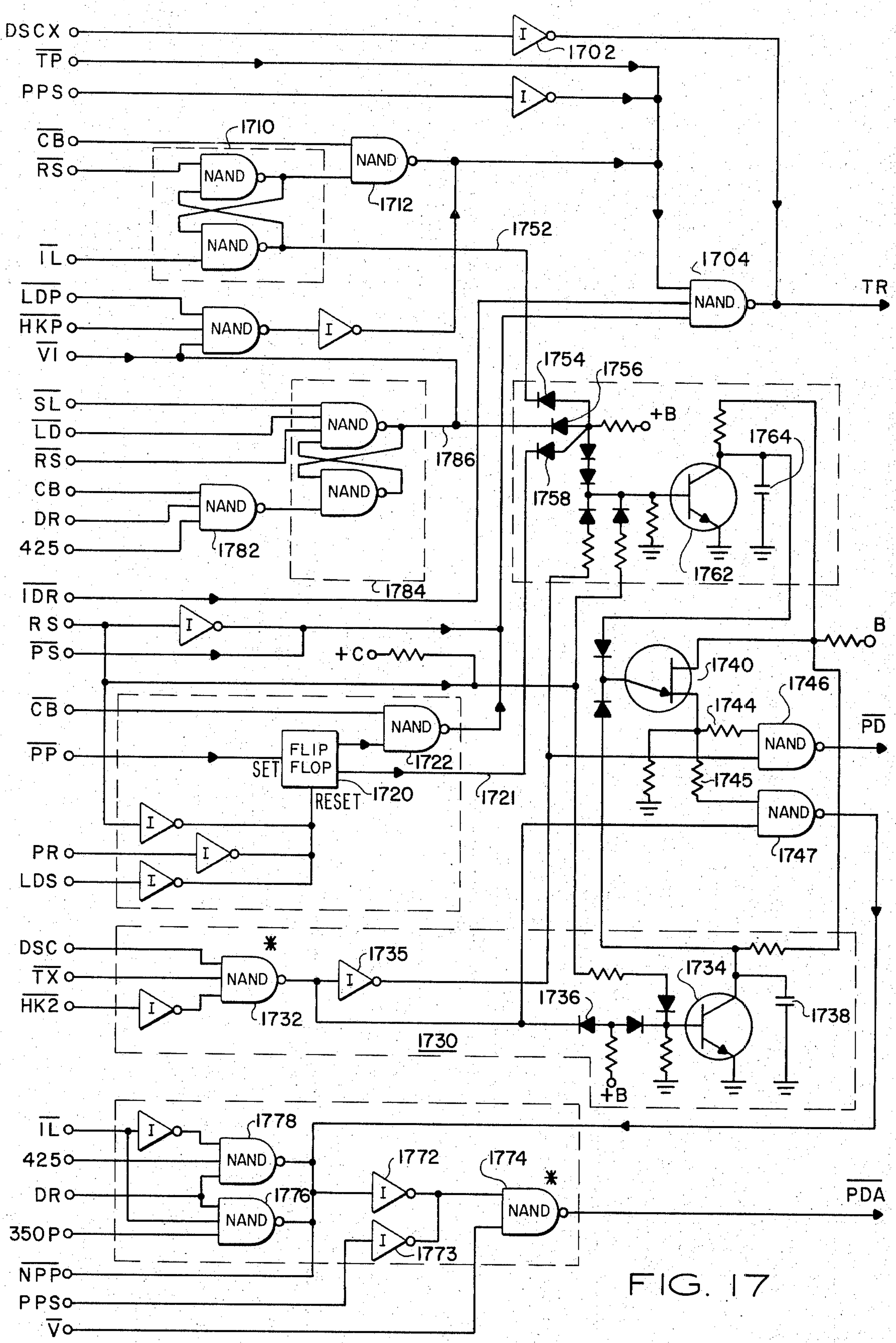
FIG. 17 shows in greater detail the construction of the timer reset and power down logic portion of the FIG. 5 control logic.

As the name indicates, the timer reset and power down logic of FIG. 17 provides for controlling the operation of the master timer 546 and the demand power supply 142. When the output lead TR of the timer reset and power down logic is brought high, the master timer 546 is reset and inhibited from operation. When lead TR is brought low, the master timer 546 is allowed to commence timing. Lead TR is high when the outputs of both an inverter 1702 and a NAND gate 1704 are high and is low when either of the outputs of the inverter 1702 or the NAND gate 1704 are low. NAND gate 1704 produces a low output when all inputs thereto are high. The upper input of NAND gate 1704 is high when lead $\overline{TP}$ is high, lead PPS is low, lead $\overline{RS}$ is high so that flip-flop 1710 is applying a low signal to a NAND gate 1712 or lead $\overline{CB}$ is low, lead $\overline{LDP}$ is high, lead $\overline{HKP}$ is high and lead $\overline{VI}$ is high. When the condition on any of these leads changes, the upper input lead of NAND gate 1704 becomes low and the output of the NAND gate 1704 thus becomes high. The middle input to the NAND gate 1704 is high when lead $\overline{IDR}$ is high. Finally, the lower input lead to the NAND gate 1704 is high when lead RS is low, lead $\overline{PS}$ is high, and either lead $\overline{CB}$ is low or a flip-flop 1720 is in the reset state so that it is applying a low signal to NAND gate 1722. Again, if either the middle or lower input lead to NAND gate 1704 becomes low, the output of the NAND gate becomes high.

Recall that one of the novel features mentioned for the present embodiment is that the master timer 546 is reset and restarted with each burst of idle or seize tone received during the initial contact signalling interval of an incoming call (interval B of FIG. 2). That is, each time an idle or seize tone burst is received, a low pulse is applied to lead TP causing NAND gate 1704 to apply a high pulse to lead TR which resets and restarts the master timer 546.

Output leads $\overline{PD}$ and $\overline{PDA}$ are utilized, as described earlier, for turning off the demand power supply 142 (FIG. 5). In addition, lead $\overline{PDA}$ is utilized for signalling the controlled reset logic 544 (FIG. 5) to cause the generation of reset signals over leads $\overline{CRS}$, RS and $\overline{RS}$, as also described earlier. A low signal is typically generated on lead $\overline{PD}$ a predetermined period of time after transmission by the subscriber unit of the last digit of a called number. Specifically, referring to FIG. 17, after transmission of the last digit of a called number, lead DSC will be high since the disconnect memory 522 (FIG. 5) will have been "loaded" following transmission of the last digit of the subscriber unit identification number, lead $\overline{HK2}$ will be low since the telephone handset will be off-hook pursuant to the placing of the call, and lead $\overline{TX}$ will be high following transmission of the last digit of the called number so that the output of a NAND gate 1732 will be low. The low signal on the output lead of the NAND gate 1732 forward biases a diode 1736 thus diverting voltage from the voltage source +B away from the base of a transistor 1734 to turn off the transistor. With the transistor 1734 turned off, a capacitor 1738 commences to charge and when the voltage thereacross reaches a certain predetermined "firing voltage," a unijunction transistor 1740 is caused to fire. The capacitor 1738 is chosen to provide a predetermined delay before the unijunction transistor 1740 is fired following generation of the low signal by NAND gate 1732. When the unijunction transistor 1740 fires, a high signal is applied by the unijunction transistor via a resistor 1744 to a NAND gate 1746. Since the other input to the NAND gate 1746 from an inverter 1735 is high (since the output of the NAND gate 1732 is low), the NAND gate 1746 applies a low signal to lead $\overline{PD}$ to turn off the demand power supply.

The timing circuitry generally identified as block 1730 of FIG. 17 was referred to earlier as the "dialing out timer," when discussing FIG. 5. As is clear from the above description of the timing circuitry 1730, after transmission of any digit of a called number, lead $\overline{TX}$ is made high causing the capacitor 1738 to commence charging, i.e., causing the circuitry 1730 to commence timing. If another digit of the called number is transmitted, a low signal is applied to lead $\overline{TX}$ so that the output of NAND gate 1732 is high and voltage from the voltage source +B is not diverted from the base of the transistor 1734 so that the transistor is turned on. With the transistor 1734 turned on, the capacitor 1738 discharges and the timing circuitry 1730 ceases to time.

A low signal on lead $\overline{PDA}$ is generated under any of the following circumstances: (1) if idle tone is not received by the subscriber unit within a certain predetermined period of time following receipt of seize tone in the "initial contact signalling" interval of an incoming call (see FIG. 2), (2) if a telephone number received from the base terminal fails to match the subscriber unit number, (3) if any digit of a telephone number being transmitted from the base terminal is not received within a certain period of time following receipt of the previous digit of the number, (4) if idle tone is not being received by the subscriber unit following receipt of the initial burst of guard tone in the "initial contact" interval of an outgoing call (see FIG. 3), (5) if idle tone has not been removed from the channel after receipt of the initial burst of guard tone and the burst of connect tone in the "initial contact" interval of an outgoing call (FIG. 3), and (6) if seize tone is not received within a certain period of time after the initiation of the "initial contact" interval of an outgoing call. The circuitry which causes the generation of the low signal on $\overline{PDA}$ under each of the above-named conditions will now be described.

Referring to condition (1) above, upon initiation of the "initial contact signalling" interval of an incoming call, the demand power supply of the subscriber unit is turned on causing a low signal to be applied to lead $\overline{RS}$ thereby setting flip-flop 1710 of FIG. 17. Setting flip-flop 1710 causes output lead 1752 to be made low forward biasing a diode 1754 and diverting voltage from a voltage source +B away from the base of a transistor 1762. With the voltage diverted away from the base of the transistor 1762, the transistor turns off thereby enabling a capacitor 1764 to commence charging, i.e., the path to ground for discharging the capacitor is "removed." When the voltage across the capacitor 1764 reaches a certain predetermined level, i.e., after a certain predetermined period of time, the unijunction transistor 1740 is caused to fire resulting in a high signal being applied by the unijunction transistor via a resistor 1745 to a NAND gate 1747 thereby causing the NAND gate to bring its output lead low. With the output lead of NAND gate 1747 brought low, an inverter 1772 applies a high signal to a NAND gate 1774 which, together with a high signal on the other input of NAND gate 1774, causes the NAND gate 1774 to apply a low signal to lead $\overline{PDA}$. The capacitor 1764 is prevented from charging to its predetermined voltage level if, within a certain predetermined period of time following the setting of the flip-flop 1710, idle tone is received by the subscriber unit causing a low signal to be generated on lead $\overline{IL}$. The low signal on lead $\overline{IL}$ resets the flip-flop 1710 causing lead 1752 to be made high reverse biasing the diode 1754 and enabling voltage to be applied to the base of the transistor 1762. This turns on the transistor 1762 so that a path for discharging the capacitor 1764 is provided and the capacitor is prevented from reaching the predetermined voltage level.

When the second condition named above occurs, the digit decoder-encoder applies a low pulse to lead $\overline{NPP}$ low causing the inverter 1772 to apply a high pulse to the NAND gate 1774, in turn, causing the NAND gate 1774 to apply a low pulse to lead $\overline{PDA}$. Of course, if all digits of a received telephone number match the subscriber unit number, a low pulse is never applied to lead $\overline{NPP}$ by the digit decoder-encoder and thus no low signal is generated on lead $\overline{PDA}$.

The circuitry for generating the low signal on lead $\overline{PDA}$ under condition (3) above includes the flip-flop 1720 which is set via lead $\overline{PP}$ each time a digit of a received telephone number matches the corresponding digit of the subscriber unit number. When the flip-flop 1720 is set, its output lead 1721 is brought low forward biasing a diode 1758 and thus diverting voltage from the base of the transistor 1762. The transistor 1762 is thus turned off so that the capacitor 1764 may commence to charge. Of course, if the capacitor 1764 is not prevented from reaching the predetermined voltage level necessary to cause the unijunction transistor 1740 to fire, then a low signal will be generated on lead $\overline{PDA}$ as previously described. If, before the capacitor 1764 reaches this predetermined voltage level, a high signal is received over lead PR from the digit decoder-encoder 510 (FIG. 5), indicating that another digit of a transmitted telephone number has been received, the flip-flop 1720 is reset causing the flip-flop output lead 1721 to be made high reverse biasing the diode 1758 and enabling the application of voltage to the base of the transistor 1762 to turn on the transistor and discharge the capacitor 1764. Thus, as described, if a digit of a telephone number is not received from the base terminal within a predetermined period of time following receipt of the previously transmitted digit, a low signal is generated on lead $\overline{PDA}$.

Note that the first three conditions named above all concern the generation of a low signal on lead $\overline{PDA}$ during the course of an incoming call. The remaining named conditions, on the other hand, concern the generation of a low signal on lead $\overline{PDA}$ during the course of an outgoing call as will now be described.

Under condition (4) above, lead DR from the call base gating logic 554 (FIG. 5) is high so that upon receipt of a high pulse on lead 350P and if lead $\overline{IL}$ is high indicating that idle tone is not being received by the subscriber unit, a NAND gate 1776 generates a low pulse on its output lead. The low output pulse of NAND gate 1776 causes the inverter 1772 to apply a high pulse to the NAND gate 1774 which, in turn, generates a low pulse on lead $\overline{PDA}$.

A NAND gate 1778 is utilized to cause the generation of a low signal on lead $\overline{PDA}$ under condition (5) above. That is, since a high signal is still being applied to lead DR under condition (5), the NAND gate 1778 generates a low output signal if, upon receipt of a high signal over lead 425, lead $\overline{IL}$ is low indicating that idle tone has not been removed from the channel. The low output signal from NAND gate 1778, of course, causes generation of a low signal on lead $\overline{PDA}$ as required.

The high signal on lead 425 also establishes the conditions under which condition (6) above may occur. Specifically, the high signal on lead 425 causes a NAND gate 1782 to apply a low signal to a flip-flop 1784 setting the flip-flop. Setting flip-flop 1784 causes the flip-flop output lead 1786 to be brought low forward biasing a diode 1756 and thus diverting voltage from the base of the transistor 1762. As with conditions (1) and (3), this causes the transistor 1776 to turn off so that a low signal will be generated on lead PDA after a predetermined interval unless, before the end of that interval, the transistor 1762 is again turned on. If a seize tone is received before the end of this interval, lead SL is made low and this resets the flip-flop 1784 causing the flip-flop's output lead 1786 to be brought high. This, of course, causes the transistor 1776 to turn on and discharge the capacitor 1764.

Lead PPS is provided to inhibit the spurious generation of a low signal on lead PDA when a match occurs between a digit of a received telephone number and the corresponding digit of the subscriber unit number. When such a match occurs, lead PPS is made high so that an inverter 1773 brings its output low. This inhibits NAND gate 1774 from bringing lead PDA low.

Figure 18:
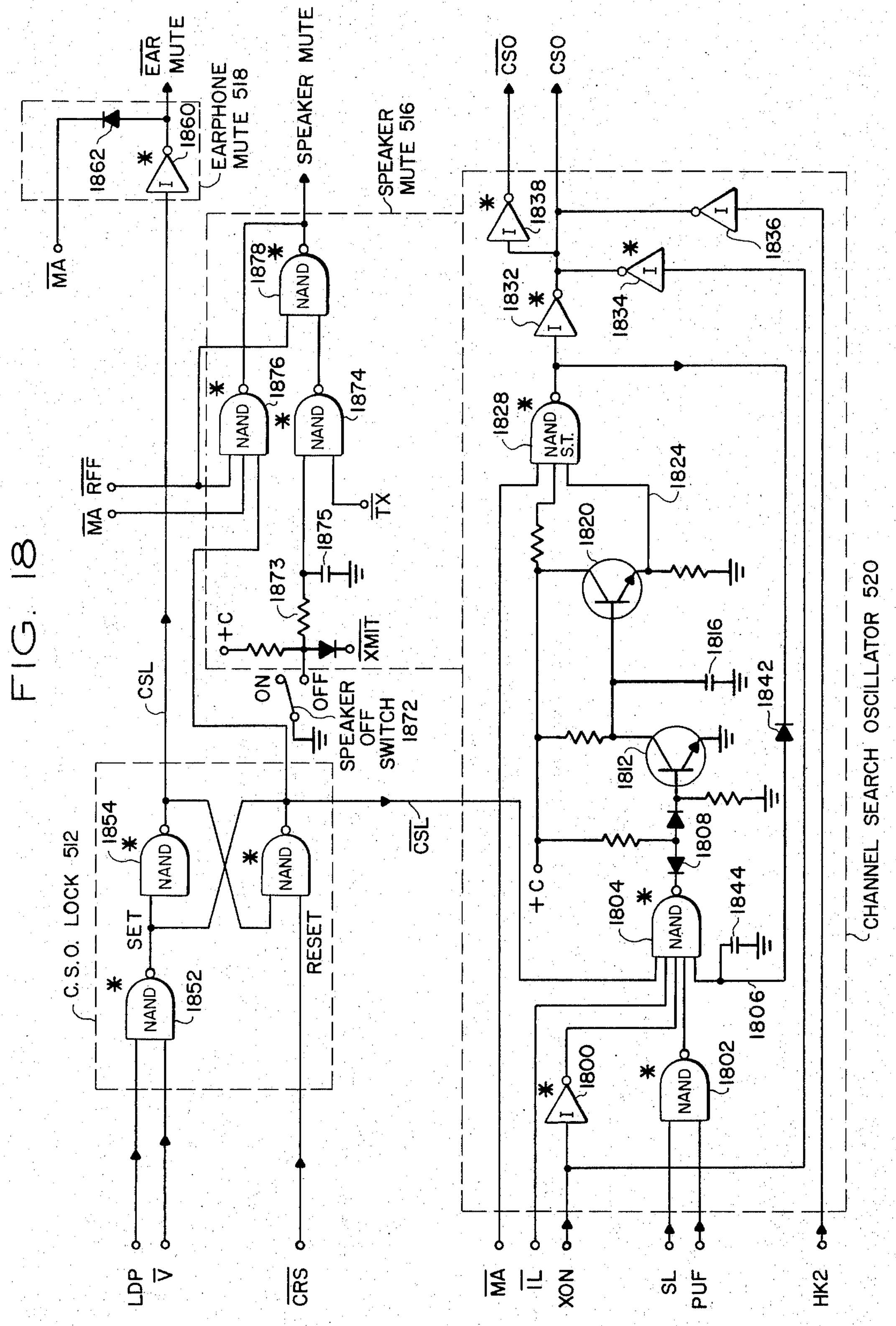
FIG. 18 shows in greater detail the construction of the channel search oscillator, the CSO lock, the earphone mute circuit and the speaker mute circuit portions of the FIG. 5 control logic.

DESCRIPTION OF FIG. 18 — CHANNEL SEARCH OSCILLATOR, CSO LOCK, EARPHONE MUTE AND SPEAKER MUTE CIRCUITS

The CSO lock circuit 512 and the channel search oscillator 520 of FIG. 18 control the channel searching operation of the subscriber unit. The subscriber unit "searches" over the channels in response to channel search pulses on output lead CSO. These pulses are generated when leads HK2, XON and either SL or PUF are low and leads $\overline{IL}$, $\overline{MA}$ and $\overline{CSL}$ are high. Thus, if lead XON is low, an inverter 1800 applies a high signal to a NAND gate 1804. If either lead SL or PUF are low, then a NAND gate 1802 applies a high signal to the NAND gate 1804. Then, since leads $\overline{IL}$ and $\overline{CSL}$ are high and since input lead 1806 is normally high, the NAND gate 1804 generates a low output signal. This low output signal forward biases a diode 1808 diverting voltage from a voltage source +C away from the base of a transistor 1812 thereby turning off the transistor. With the transistor 1812 turned off, a capacitor 1816 is allowed to commence charging (since the transistor 1812 no longer provides a discharge path to ground). When the voltage across the capacitor 1816 reaches a predetermined level, a transistor 1820 is caused to conduct thereby bringing lead 1824 high which, together with the high conditions on the other two input leads to a NAND Schmitt trigger 1828, causes the NAND Schmitt trigger 1828 to generate a low pulse. Since leads HK2 and XON are both low resulting in inverters 1834 and 1836 generating high output signals, the low pulse from the NAND Schmitt trigger 1828 causes an inverter 1832 to generate a high pulse on lead CSO. The high pulse on lead CSO also causes an inverter 1838 to generate a low pulse on lead $\overline{CSO}$. The low pulse produced by the NAND Schmitt trigger 1828 also forward biases a diode 1842 so that a capacitor 1844 is discharged. With the discharge of the capacitor 1844, lead 1806 is brought low causing the NAND gate 1804 to generate a high output signal. This high output signal reverse biases the diode 1808 enabling voltage from the voltage source +C to be applied to the base of the transistor 1812 causing the transistor to turn on and discharge the capacitor 1816. Since the low output pulse of the NAND Schmitt trigger 1828 persists for only a short time, input lead 1806 to the NAND gate 1804 is maintained low for only a short time, the diode 1842 is forward biased for only a short time after which it again assumes a reverse bias condition allowing the capacitor 1842 to charge bringing lead 1806 high again. Withe lead 1806 high enough to enable the NAND gate 1804 to generate a low output signal, the transistor 1812 is again turned off allowing the capacitor 1816 to commence charging. The above-described sequence is then repeated.

As is apparent from the examination of FIG. 18, if any of the leads HK2, XON, or SL and PUF are made high or if any of the leads $\overline{IL}$, $\overline{MA}$ or $\overline{CSL}$ are made low, then the channel search oscillator 520 is prevented from generating "channel search" pulses on lead CSO. Thus, if either leads HK2 or XON are made high, then lead CSO is maintained low by operation of inverters 1836 and 1834 respectively. Also, if any of the inputs to the NAND gate 1804 are made low, i.e., if either lead $\overline{IL}$ or $\overline{CSO}$ are made low or lead XON or lead SL and PUF are made high, then the NAND gate 1804 generates a high output signal enabling the transistor 1812 to be turned on to prevent the capacitor 1816 from charging. Finally, if lead $\overline{MA}$ is made low, the NAND Schmitt trigger 1828 is prevented from generating the low output pulse.

The CSO lock circuit 512 is provided to inhibit the operation of the channel search oscillator 520 following receipt of the last digit of a telephone number transmitted from the base terminal or transmission of the last digit of the subscriber unit number. When either such receipt or transmission occurs, a high pulse is applied to lead LDP causing a NAND gate 1852 of the CSO lock circuit 512 to apply a low pulse to a flip-flop 1854 thereby setting the flip-flop. With the flip-flop 1854 set, a low signal is generated by the flip-flop on lead $\overline{CSL}$ to inhibit the operation of the channel search oscillator 520 as previously described. The flip-flop 1854 is reset and thus the low signal on lead $\overline{CSL}$ is removed upon receipt of a low pulse over lead $\overline{CRS}$.

The earphone mute circuit 518 and speaker mute circuit 516, as their names indicate, are for muting or inhibiting the operation of the earphone of the telephone handset and the speaker respectively at various times in the course of the operation of the subscriber unit. The earphone of the handset is prevented from operating when the lead labeled "$\overline{\text{ear mute}}$" is high and is allowed to operate when that lead is low. The "$\overline{\text{ear mute}}$" lead is made low when either the flip-flop 1854 is set or lead $\overline{MA}$ is low. Thus, the earphone is allowed to operate following receipt of a high pulse over lead LDP by the CSO lock circuit 512 or when the subscriber unit is operating in the manual mode so that the $\overline{MA}$ is low. When the flip-flop 1854 is set, an inverter 1860 applies a low signal to the "$\overline{\text{ear mute}}$" lead. When lead $\overline{MA}$ is low, a diode 1862 is forward biased bringing the "$\overline{\text{ear mute}}$" lead low.

The amplifier 146 and thus the speaker 150 (FIG. 10 are muted or inhibited from operating when the "speaker mute" lead is low and are allowed to operate when the "speaker mute" lead is high. The "speaker mute" lead is low when the output of either NAND gate 1876 or NAND gate 1878 are low. The output of NAND gate 1876 is low when all of the inputs thereto are high and similarly the output of NAND gate 1878 is low when all the inputs thereto are high. Specifically, a low signal is generated on the "speaker mute" lead when (1) the subscriber unit is operating in the automatic mode (lead $\overline{MA}$ is high), no ringing signals are being received from the subscriber unit (lead $\overline{RFF}$ is high) and flip-flop 1854 is in the reset state, or (2) no ringing signals are being received and either a "speaker off switch" is closed to divert voltage from a voltage source +C to ground, the subscriber unit is transmitting (lead $\overline{XMIT}$ is low to divert voltage from the voltage source +C) or lead $\overline{TX}$ is low. A high signal is generated on the "speaker mute" lead to enable operation of the speaker when ( 1 ) ringing signals are being received (lead $\overline{RFF}$ is low), or (2) the subscriber unit is operating in the manual mode (lead $\overline{MA}$ is low) and the speaker off switch 1872 is open, the leads $\overline{XMIT}$ and $\overline{TX}$ are both high, or (3) the flip-flop 1854 is in the set state (so that lead $\overline{CSL}$ is low), the speaker off switch 1872 is open and leads $\overline{XMIT}$ and $\overline{TX}$ are high.

The function of the resistor 1873 and the capacitor 1875 of the speaker mute circuit 516 is to filter out and prevent RF signal components from affecting the operation of the NAND gate 1874.

DESCRIPTION OF FIG. 19 — RADIO FREQUENCY SIGNAL GENERATOR

Figure 19:
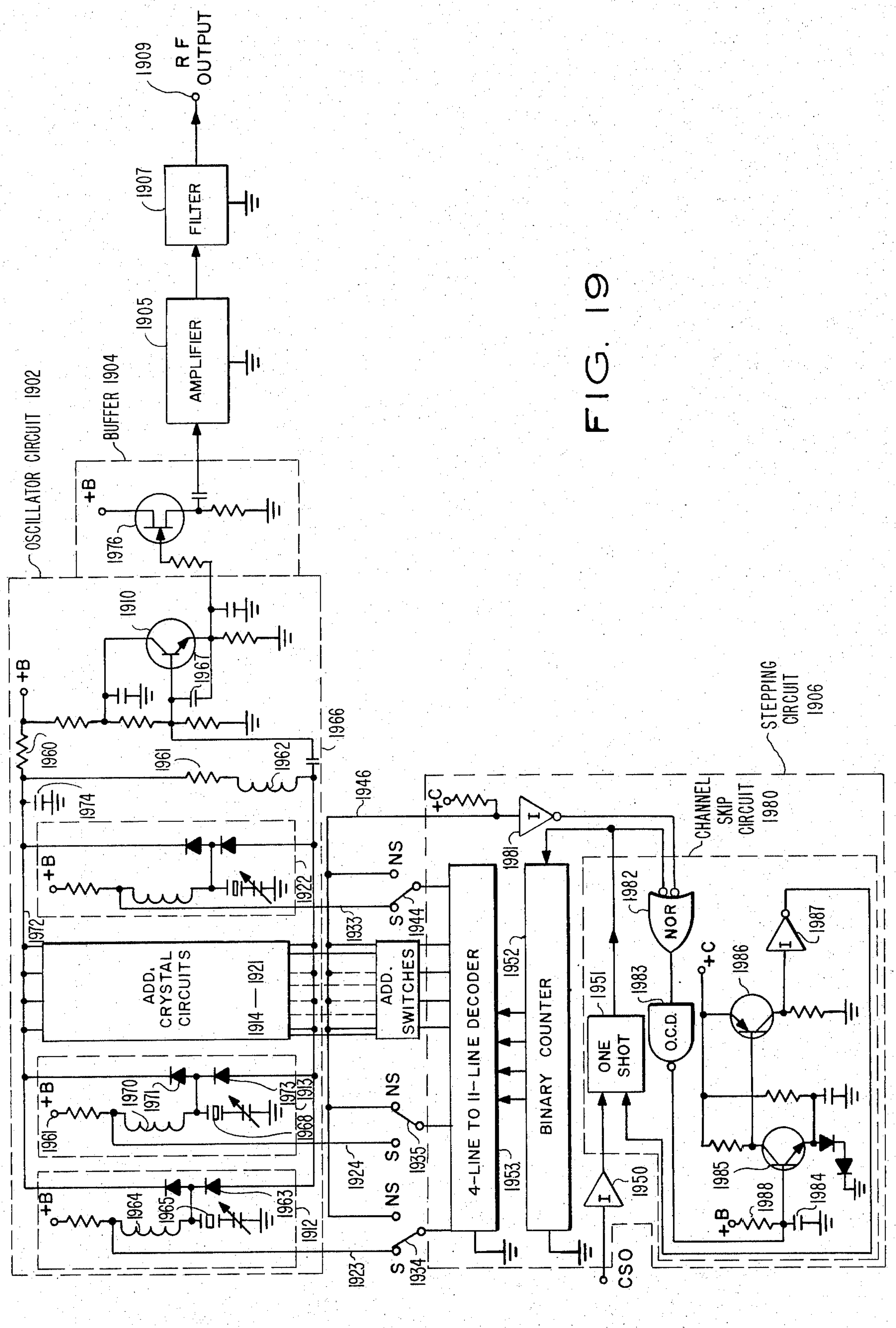
FIG. 19 shows in greater detail the construction of a radio-frequency signal generator used in the FM transmitter of FIG. 2.

FIG. 19 shows the detailed construction of the radio frequency signal generator 402 of FIG. 4. The FIG. 19 circuit includes an adjustable oscillator circuit 1902 which is capable of generating a radio frequency sine wave signal at any one of 11 different frequencies. For the presently used telephone company mobile unit transmit frequency set forth above (and bearing in mind that the signal generated by the FIG. 19 circuitry is multiplied by a factor of 18 to obtain the transmitted carrier), the lowest frequency to be generated by the oscillator circuit 1902 is 8.765 megahertz and the highest frequency is 8.782 megahertz, with the remaining nine frequencies spaced therebetween and separated by a factor of approximately 1.67 kilohertz. The oscillator circuit 1902 includes a transistor 1910 and a set of eleven identical and individual crystal circuits 1912–1922 which operate in a one-at-a-time manner to provide the eleven different radio frequency signals. Only the first two crystal circuits 1912 and 1913 and the last crystal circuit 1922 are shown in detail. Other than the frequency of the particular crystal used in each of these circuits, the circuits are of identical construction.

The operative status of each of the crystal circuits 1912–1922 is determined by the voltage condition on conductors 1923–1933 respectively. The voltage condition on these conductors is, in turn, controlled by a stepping circuit 1906 and the settings of a set of 11 selector switches 1934–1944. Each of the switches 1934–1944 includes a pair of fixed contacts labeled "S" (selected) and "NS" (non-selected), one of which is contacted by the movable element of the switch at any given instant. The "S" contacts of the switches 1934–1944 are connected respectively to conductors 1923–1933. The "NS" contact of the switches is connected to a common conductor 1946 which will be considered later. The movable element of each of the switches is connected to the stepping circuit 1906.

Assuming for the moment that each of the selector switches 1934–1944 is set to the "S" position, then stepping circuit 1906 operates to turn on or activate the crystal circuits 1912–1922 one at a time in a sequential manner in response to a series of channel search pulses applied to lead CSO. More particularly, each channel search pulse supplied over lead CSO is applied by way of an inverter 1950 to one input terminal of a one-shot multi vibrator circuit 1951. Each negative-going pulse at this input causes the multi vibrator 1951 to produce a negative-going pulse at its output which is supplied to the counting input of a pulse counter 1952. In the present embodiment, counter 1952 is a "count of 11" counter, i.e., it counts from one to 11 and then repeats itself. Counter 1952 drives a four-line to 11-line decoder 1953, the 11 output lines of which are each connected to a different one of the movable elements of the selector switches 1934–1944. The output of the counter 1952 is a four-bit parallel-type binary coded output and in response thereto the decoder 1953 selects one of its output lines to the exclusion of the other 10. The output circuits of the decoder 1953 are constructed such that the selected output line is placed at ground level voltage and the unselected output lines are placed in an open circuit condition. The particular output line selected, of course, depends on the condition of the four output lines from counter 1952. By way of example only, if counter 1952 contains a count of one, then the decoder output lne connected to the switch 1934 is selected (grounded) and the other 10 output lines are unselected (open circuited), if counter 1952 contains a count of two then the decoder output line connected to switch 1935 is selected (grounded) and the other ten lines are unselected (open circuited), etc.

When a selector switch is set to its "S" position, the grounding of the corresponding decoder output line activates the crystal circuit to which the selector switch is connected to in effect connect the crystal of that crystal circuit to the base of the transistor 1910. Conversely, when a selector switch is set in its "NS" position or when the corresponding decoder output line is in an open circuit condition, the crystal circuit connected to that switch is disabled so that in effect the crystal of that crystal circuit is disconnected from the transistor 1910.

In order to illustrate the operation of selecting a particular crystal circuit, it will be assumed that the crystal circuit 1912 is activated (control conductor 1923 grounded) and that the remainder of the crystal circuits 1913–1922 are disabled (control conductors open circuited). With the control conductor 1923 grounded, current flows from the +B power supply through resistor 1960, resistor 1961, choke coil 1962, diode 1963 and the choke coil 1964 to the control conductor 1923 and thus to ground. In this mode, the diode 1963 is conductive thereby, in effect, connecting the upper terminal of crystal 1965 by way of capacitor 1966 to the base of the transistor 1910. This transforms the circuit associated with the transistor 1910 into a crystal controlled oscillator circuit with the resonant frequency thereof being determined by the crystal 1965. Feedback by way of capacitor 1967 provides the energy for keeping the crystal 1965 oscillating with oscillation of the crystal 1965 initially being induced by the electrical noise in the circuit.

The open circuit condition on control conductor 1924 of the second crystal circuit 1913 causes the crystal 1968 thereof to, in effect, be disconnected from the transistor 1910. Specifically, with the lower end of the control conductor 1924 open circuited (caused by the open circuit condition of the corresponding output lead of the decoder 1953), current flows from the +B power supply through resistor 1969, choke coil 1970, diode 1971, conductor 1972, resistor 1961, choke coil 1962, diode 1963, choke coil 1964, control conductor 1923 and switch 1934 to ground. Since the anode of diode 1973 is at almost ground potential while the cathode is at a positive potential somewhat less than the +B power supply potential, the diode 1973 is nonconductive and the crystal 1968 is, in effect, disconnected from the transistor 1910. At the same time, the upper terminal of the crystal 1968 is effectively grounded from an alternating current standpoint by way of diode 1971 (which is conductive) and capacitor 1974. Choke coil 1962 presents a relatively high alternating current impedance to further insure that no oscillations from the crystal 1968 can reach the transistor 1910 by way of the circuit branch formed by such coil 1962 and resistor 1961. The remainder of the crystal circuits 1914–1922 are at this time also disconnected from the transistor 1910 in the same manner as for the crytsal 1913. The other crystals are selected one at a time by grounding their control conductors and placing an open circuit on the remainder of the control conductors all under the control of the decoder 1953.

The oscillating signals produced by the oscillator circuit 1902 are supplied by way of a buffer stage 1904, an amplifier 1905 and a filter 1907 to an output terminal 1909. Buffer stage 1904 includes a field effect transistor 1976 arranged to provide a source-follower type circuit. Filter 1907 is a band-pass type filter for preventing passage of higher order harmonics of the basic oscillator signal. The signal produced at the output terminal 1909, of course, constitutes the radio frequency output signal for the signal generator of FIG. 19.

For the IMTS mode of operation, selector switches 1934–1944 can all be set in the "S" position. In such case, the subscriber unit will search through all eleven available telephone company channels until it finds an idle channel. If desired, however, one or more of the 11 possible channels may be excluded from this channel searching operation by setting the appropriate ones of the selector switches 1934–1944 to their "NS" positions. The crystal circuits corresponding to the selector switches thus set to the "NS" position will then be excluded (disabled) from the process of sequentially switching from one crystal circuit to the next when searching for an idle channel.

In the present embodiment, the channel search pulses received over lead CSO may be spaced, for example, 100 milliseconds apart. Thus, when searching for a new idle channel, the decoder 1953 swiatches from one to the next of its output leads at 100 milliseconds intervals. In the event that one or more of the crystal circuits 1912–1922 is placed in a non-selected condition so as to always be excluded from the searching operation, then it is desirable that the decoder 1953 not wait the entire 100 milliseconds period before switching from one of its non-selected output leads to the next one of its output leads which is in a selected condition. In other words, it is desirable that the searching operation be shortened by causing the decoder 1953 to rapidly skip over any one of its output leads for which the corresponding one of the selector switches 1934–1944 is set in the "NS" position. This is accomplished by means of a channel skip circuit 1980. Operation of the channel skip circuit 1980 is determined by the selector switches 1934–1944 whose "NS" contacts are connected via an inverter 1981 to a first input of a NOR gate 1982. If all of the selector switches 1934–1944 are in the "S" position, then the channel skip circuit 1980 remains disabled and the binary counter 1952 functions in a normal manner to advance the decoder 1953 one position each time a channel search pulse is received.

Assume that one of the selector switches 1934–1944 is in the "NS" position. So long as the output line of the decoder 1953 corresponding to that switch is in the ungrounded condition, the input to the inverter 1981 is at the +C level (due to the +C power supply) so that the output of the inverter 1981 is at a zero voltage level. This output causes the NOR gate 1982 to generate a high signal. The other input to the NOR gate 1982 is normally at a high level except during the occurrence of a negative-going output pulse at the output of the one-shot multi vibrator 1951. (The logic of a NOR gate is that its output will be high if either input is low.) With the output of the NOR gate 1982 high, the output of an open collector type NAND gate 1983 is at zero or ground level. The NAND gate 1983 is such that when its input is high, its output is at ground level whereas when its input is low, its output is in an open circuit condition. The ground level output of the NAND gate 1983 grounds a timing capacitor 1984 and maintains the same in a discharged condition. This turns off a transistor 1985 which, in turn, turns off transistor 1986. This places the input to an inverter 1987 in a low condition causing its output to be high. This high condition is fed back to the one-shot multi vibrator 1951 and the multi vibrator 1951 simply remains in its unpulsed condition.

Now assume that in response to channel search pulses received over lead CSO, the decoder 1953 grounds the output line corresponding to the selector switch which is placed in its "NS" position. Since the switch is in the "NS" position, it is desired that the decoder 1953 immediately step to the next position so as to ground the next output line. This is accomplished as hereafter described. Grounding the output line corresponding to the selector switch in the "NS" position places the input to the inverter 1981 at ground level causing the output thereof to become high. Since both inputs to the NOR gate 1982 are high, the output thereof is low and this causes the output of the NAND gate 1983 to assume an open circuit condition. The capacitor 1984 is thus allowed to commence charging by way of current flow through a resistor 1988. As the voltage builds up across the capacitor 1984, a point is reached at which the transistor 1985 is turned on and this, in turn, turns on the transistor 1986. The input to the inverter 1987 is thus brought high causing the inverter to generate a low output signal which triggers the one-shot multi vibrator 1951. The negative-going pulse produced by the one-shot multi vibrator 1951 is supplied to the binary counter 1952 which causes the decoder 1953 to skip to the next output line, i.e., causes the decoder 1953 to ground the next output line following the one corresponding to the selector switch in the "NS" position. The negative-going pulse at the output of the one-shot multi vibrator 1951 is also supplied to the NOR gate 1982 causing the output thereof to return to the high level. This returns the output of the NAND gate 1983 to the ground level to discharge the capacitor 1984. If the selector switch connected to the decoder 1953 output line most recently grounded is set in the "S" position, then nothing further happens and the stepping circuit 1906 "waits" until the receipt of the next channel search pulse on lead CSO. If, on the other hand, the selector switch connected to the most recently grounded decoder output line is also in the "NS" position, then the output of the inverter 1981 continues in the high condition. Then, upon termination of the negative-going output pulse from the one-shot multi vibrator 1951, the channel skip circuit 1980 immediately returns to the condition where the output of the NAND gate 1983 is "open circuited." This enables the capacitor 1984 to begin charging again so as to repeat the above-described cycle in which another negative-going output pulse is produced at the output of the one-shot multi vibrator 1951. Thus, as long as the input to the inverter 1981 remains grounded, the channel skip circuit continues to operate and negative-going pulses continue to be generated at the output of the one-shot multi vibrator 1951. When the input to the inverter 1981 becomes ungrounded, the production of the so-called channel-skip pulses ceases and the stepping circuit "awaits" the arrival of the next channel search pulse over lead CSO. In the MTS mode of operation, the normal operating procedure is to place only one of the selector switches 1934–1944 in the "S" position at a time and to place the remainder of the selector switches in the "NS" position. When this is done, the channel skip circuit 1980 automatically operates to pulse the binary counter 1952 to a condition where the decoder 1953 provides a ground condition for the output line connected to the selector switch in the "S" position. In effect, the search for an idle channel is carried out by manually and on a one-at-a-time basis placing the selector switches 1934–1944 in the "S" position.

DESCRIPTION OF FIG. 20 — VOX CIRCUIT

The VOX circuit, as discussed earlier in connection with FIG. 4, provides for enabling a gated amplifier 418 (FIG. 4) in response to audio signal received from the audio amplifier 426 or channel hold signals received from the control logic unit 126 (FIG. 1). The VOX circuit responds to the audio signals only when a switch 446 is in the "VOX ON" position, but responds to the channel hold signal regardless of the setting of the switch 446. The purpose of the VOX circuit of FIG. 20 enabling the gated amplifier 418 is to enable transmission of signals by the subscriber unit to the base terminal.

Assume that neither audio nor channel hold signals are being applied to the VOX circuit and that the switch 446 is in the "VOX ON" position. Under these conditions, positive voltage is supplied by the positive voltage source +B via resistor 2002, resistor 2003 and a potentiometer 2004 to the positive input terminal of an operational amplifier 2012. As will be discussed later, positive voltage is also supplied by way of a transistor 2024 and resistor 2023 under the conditions assumed. The signal applied to the positive input terminal of the amplifier 2012 is referred to as the reference signal. A lower level positive voltage signal is also applied to the negative input terminal of the amplifier 2012 via a resistor 2005 from the potentiometer 2004. When the voltage level at the positive input terminal of the amplifier 2012 is higher than the voltage level at the negative input terminal thereof, the amplifier 2012 operates to produce a high level positive output signal. Conversely, when the voltage level at the negative input terminal of the amplifier 2012 is greater than the voltage level at the positive input terminal thereof, the amplifier 2012 operates to produce a zero level output signal. Thus, under the conditions assumed above, the amplifier 2012 generates a high level positive output signal which reverse biases a diode 2014. With the diode 2014 reverse biased and thus in a nonconductive state, a capacitor 2007 is allowed to charge with current supplied from the power supply +B via a resistor 2008. The voltage across the charged capacitor 2007 maintains a PNP-type transistor 2020 in the "OFF" condition causing the collector of the transisor 2020 to be maintained at a low voltage level. The low level voltage on the collector of the transistor 2020, in turn, maintains a PNP-type transistor 2040 in the "ON" condition and an NPN-type transistor 2028 in the "OFF" condition. As indicated earlier, when the transistor 2024 is on, a reference voltage is supplied to the positive input terminal of the amplifier 2012. When the transistor 2028 is in the "off" condition, the collector thereof is at a high level so that the gated amplifier to which the collector is connected is disabled.

Now assume that an audio signal is applied to input terminal 2000. This signal is applied via a capacitor 2030, a resistor 2032 to a diode 2034. The positive going portions of the audio signal forward bias the diode 2034 and are thus transferred via the diode to the negative input terminal of the amplifier 2012. If the amplitude of the audio signal is greater than the reference voltage level at the positive input terminal of the amplifier 2012, the amplifier operates to place its output at the zero or ground voltage level. This forward biases the diode 2014 discharging the capacitor 2007 and thereby bringing the level of the voltage at the base of the transistor 2020 low. The transistor 2020 is thus turned on so that its collector terminal is made high to turn off the transistor 2024 and turn on the transistor 2028. With the transistor 2028 turned on, its collector terminal assumes a substantially ground voltage level and this enables or activates the gated amplifier 418 of FIG. 4.

Turning off the transistor 2024 lowers the reference voltage level at the positive input terminal of the amplifier 2012 to provide a type of hysteresis effect in deactivating the VOX circuit. That is, since the reference voltage at the positive input terminal of the amplifier 2012 is higher when the VOX circuit is not active (i.e., is applying a high signal to the gated amplifier 418) than when the VOX circuit is active, the audio signal level necessary to activate the VOX circuit is higher than the audio signal level necessary to maintain the VOX circuit in the active condition.

Figure 20:
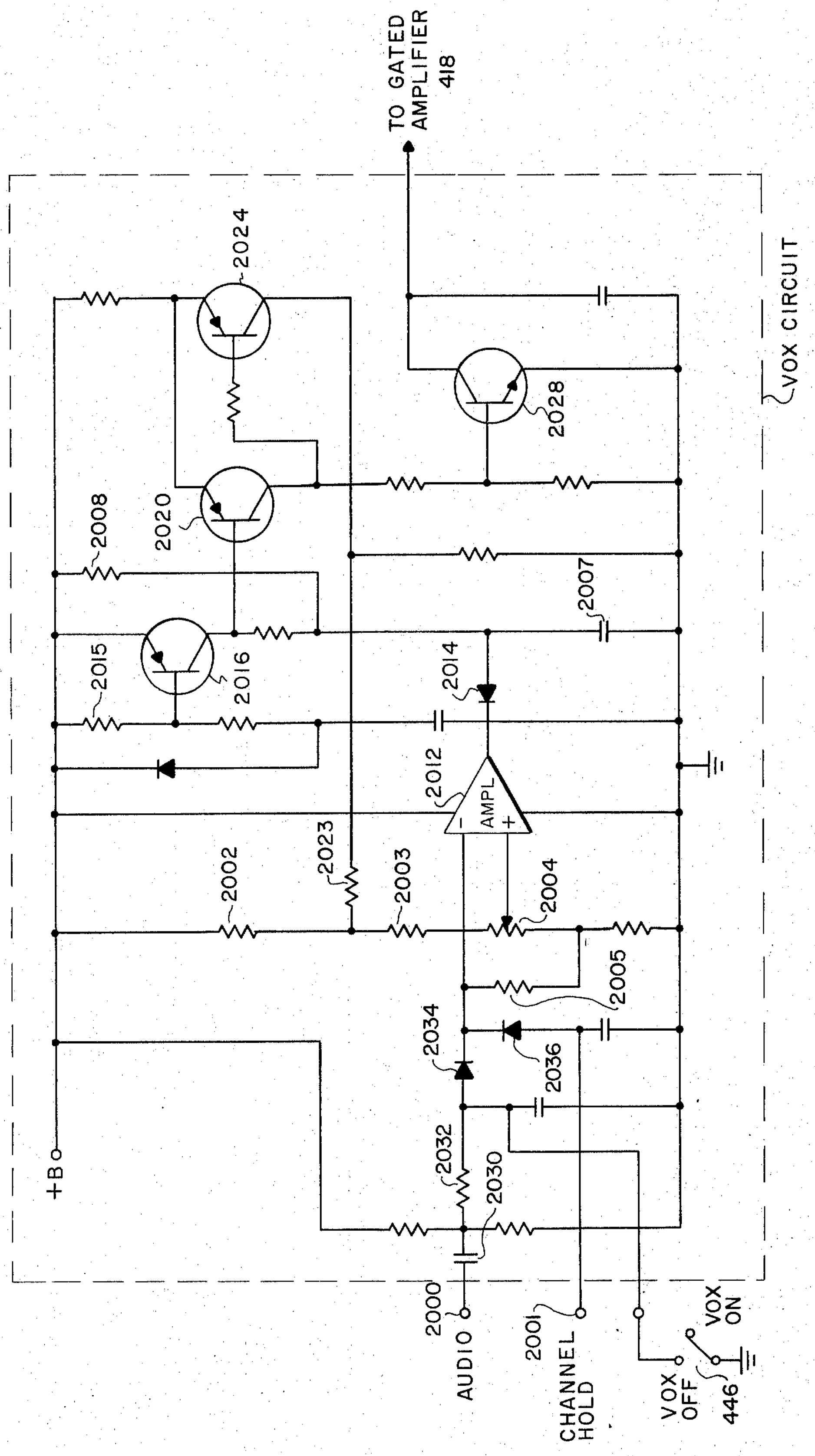
FIG. 20 shows in greater detail the construction of a VOX circuit used in the FM transmitter of FIG. 2.

Operation of the VOX circuit of FIG. 20 in response to channel hold signals applied to the terminal 2001 is essentially the same as that for the application of audio signals to the terminal 2000 except that channel hold signals will activate the VOX circuit regardless of the position of the switch 446. When the switch 446 is in the "VOX OFF" position, any audio signals applied to the terminal 2000 are transferred via the capacitor 2030, the resistor 2032 and the switch 446 to ground. Thus, when the switch 446 is in the "VOX OFF" position, the VOX circuit ignores audio signals. However, since the channel hold signals applied to terminal 2001 are applied via a diode 2036 directly to the negative input terminal of the amplifier 2012, the setting of the switch 446 in no way affects the channel hold signals.

Transistor 2016 and its associated circuitry are provided for preventing inadvertent activation of the VOX circuit when power from the power supply +B is initially applied to the circuit. If the transistor 2016 and its associated circuitry were not provided, when power from the +B power supply were initially supplied to the VOX circuit, the capacitor 2007, being in a discharged condition, would cause the transistor 2020 to turn on and remain turned on until the capacitor 2007 were charged. Of course, while the transistor 2020 were turned on, the collector of the transistor 2028 would be at a low level thereby enabling the gated amplifier 418. This is not desirable and the transistor 2016 and its associated circuitry prevents its occurrence as next described. When power is applied to the VOX circuit by the +B power supply, the emitter voltage of the transistor 2016 is placed at the +B level and the base voltage of the transistor 2016 is placed at a lower level because of the voltage drop across resistor 2015. This turns on the transistor 2016 bringing the base voltage level of the transistor 2020 high and thereby preventing the transistor 2020 from turning on. Since the transistor 2020 is prevented from being turned on, the transistor 2028 remains off so that a high voltage is applied to the gated amplifier 418.

It should be understood that the embodiment of the radio telephone subscriber unit described herein is only illustrative of the principles of the present invention. Numerous circuit configurations could be employed without departing from the spirit and scope of the present invention. For example, the signal frequencies of the control signals employed, the number of control signals utilized, the time duration and the time intervals between the generation of the various control signals, and the specific circuit configurations for generating such control signals should be understood to be illustrative and not limiting of the present invention. The appended claims are intended to cover all modifications and changes which might be made in the disclosed embodiment which do not depart from the spirit and scope of the invention.

What is claimed is:

1. A radio telephone subscriber unit for transmitting radio signals to and receiving radio signals from a radio telephone base terminal, said subscriber unit including control logic circuit means for generating control signals for controlling the operation of the subscriber unit, said control logic circuit means including circuitry for processing signals received from said base terminal, battery operated power supply means for providing operating power for the subscriber unit, and power supply control means coupled between the battery operated power supply means and said processing circuitry of the control logic circuit means and responsive to a first signal generated by the control logic circuit means for allowing the flow of operating power to said processing circuitry to thereby enable said circuitry to process subsequently received signals and responsive to a second signal generated by the control logic circuit means for disabling the flow of operating power to said processing circuitry.

2. A radio telephone subscriber unit for transmitting radio signals to and receiving radio signals from a radio telephone base terminal, said subscriber unit including control logic circuit means including circuitry for generating a first signal when establishment of a radio link-up between the subscriber unit and the radio telephone base terminal is initiated and circuitry for generating a second signal when such radio link-up is established and following transmission by the subscriber unit of a certain signal to the base terminal, battery operated power supply means for providing operating power for the subscriber unit, and power supply control means coupled between the battery operated power supply means and predetermined circuitry of the control logic circuit means and responsive to said first signal for enabling the flow of operating power to the predetermined circuitry and responsive to said second signal for disabling the flow of operating power to the predetermined circuitry.

3. A radio telephone subscriber unit for transmitting radio signals to and receiving radio signals from a radio telephone base terminal, said subscriber unit including control logic circuit means including circuitry for generating a first signal when disconnection of a radio link-up between the subscriber unit and the radio telephone base terminal is initiated and circuitry for generating a second signal upon completion of disconnection of the radio link-up, battery operated power supply means for providing operating power for the subscriber unit, and power supply control means coupled between the battery operated power supply means and predetermined circuitry of the control logic circuit means and responsive to said first signal for enabling the flow of operating power to the predetermined circuitry and responsive to said second signal for disabling the flow of operating power to the predetermined circuitry.

4. A radio telephone subscriber unit for transmitting radio signals to and receiving radio signals from a radio telephone base terminal, said subscriber unit including control logic circuit means for generating control signals for controlling the operation of the subscriber unit, battery operated power supply means for providing operating power for the subscriber unit, and power supply control means coupled between the battery operated power supply means and predetermined circuitry of the control logic circuit means and responsive to a first signal generated by the control logic circuit means for enabling the flow of operating power to the predetermined circuitry and responsive to a second signal generated by the control logic circuit means for disabling the flow of operating power to the predetermined circuitry, said power supply control means including a power input terminal connected to said battery operated power supply means, a power output terminal connected to said predetermined circuitry, bistable means responsive to said first signal for generating an enabling signal and responsive to said second signal for generating a disabling signal, and means interconnecting said input terminal and said output terminal and responsive to said enabling signal for allowing the transfer of operating power from said input terminal to said output terminal and responsive to said disabling signal for preventing the transfer of operating power from said input terminal to said output terminal.

5. A radio telephone subscriber unit as in claim 4 wherein said interconnecting means includes a first transistor whose emitter and collector are connected in series between said power input terminal and said power output terminal, and a second transistor coupled to said bistable means and to said first transistor, said second transistor operative to conduct current in response to said enabling signal and to inhibit the conduction of current in response to said disabling signal, and said first transistor operative to allow the transfer of operating power therethrough when said second transistor is conducting and to prevent the transfer of operating power therethrough when said second transistor is not conducting.

6. A radio telephone subscriber unit for transmitting radio signals to and receiving radio signals from a radio telephone base terminal, said subscriber unit including control logic circuit means for generating control signals for controlling the operation of the subscriber unit, battery operated power supply means for providing operating power for the subscriber unit, and power supply control means coupled between battery operated power supply means and predetermined circuitry of the control logic circuit means and responsive to a first signal generated by the control logic circuit means for enabling the flow of operating power to the predetermined circuitry and responsive to a second signal generated by the control logic circuit means for disabling the flow of operating power to the predetermined circuitry, said power supply control means further including circuitry for generating an inhibit signal in response to said second signal, and said control logic circuit means including circuitry responsive to said inhibit signal for preventing the transmission of radio signals to the base terminal.

7. A radio telephone subscriber unit for use in a two-way radio telephone system in which a radio telephone base terminal transmits an idle tone signal to identify an available radio channel and a seize tone signal to initiate a telephone call between the base terminal and a selected subscriber unit, said radio telephone subscriber comprising control logic circuit means for generating control signals to control the operation of said subscriber unit and including circuitry for generating a first signal in response to the transmission of a seize tone signal by the base terminal, battery operated power supply means for supplying operating power for said subscriber unit, and power supply control means coupled between said battery operated power supply means and predetermined portions of said control logic circuit means and responsive to said first signal for allowing the flow of operating power to said predetermined portions and responsive to certain other control signals from said control logic circuit means for preventing the flow of operating power to said predetermined portions.

8. A radio telephone subscriber unit for use in a two-way telephone system in which a radio telephone base terminal transmits an idle tone signal to identify an available radio channel, a seize tone signal to initiate a telephone call between the base terminal and a selected subscriber unit, and a called number signal sequence to identify the selected subscriber unit, said radio telephone subscriber unit comprising control logic circuit means for generating control signals to control the operation of said subscriber unit and including circuitry for generating a second signal if any but a particular called number signal sequence is transmitted by said base terminal, battery operated power supply means for supplying operating power for said subscriber unit, and power supply control means coupled between said battery operated power supply means and predetermined portions of said control logic circuit means and responsive to certain of said control signals for allowing the flow of operating power to said predetermined portions and responsive to said second signal for preventing the flow of operating power to said predetermined portions.

9. A radio telephone subscriber unit for use in a two-way telephone system in which a radio telephone base terminal transmits an idle tone signal to identify an available radio channel, a seize tone signal to initiate a telephone call between the base terminal and a selected subscriber unit, and a called number signal sequence to identify the selected subscriber unit, said radio telephone subscriber unit comprising control logic circuit means for generating control signals to control the operation of said subscriber unit and including circuitry for generating a second signal if more than a certain predetermined period of time elapses between transmission of various portions of the called number signal sequence by the base terminal, battery operated power supply means for supplying operating power for said subscriber unit, and power supply control means coupled between said battery operated power supply means and predetermined portions of said control logic circuit means and responsive to certain of said control signals for allowing the flow of operating power to said predetermined portions and responsive to said second signal for preventing the flow of operating power to said predetermined portion.

10. A radio telephone subscriber unit for use in a two-way radio telephone system in which a radio telephone base terminal transmits a called number signal sequence to identify a selected subscriber unit, and a ringing signal sequence to notify the selected subscriber unit that that unit is being called, said radio telephone subscriber unit comprising a hook switch having on-hook and off-hook conditions, control logic circuit means for generating control signals to control the operation of said subscriber unit and including circuitry for generating first and second enabling signals if a particular called number signal sequence is transmitted by said base terminal and circuitry responsive to said first enabling signal for generating a third signal a predetermined period of time after termination of transmission of a ringing signal sequence if said hook switch is in the on-hook condition, battery operated power supply means for supplying operating power for said subscriber unit, and power supply control means coupled between said battery operated power supply means and predetermined portions of said control logic circuit means and responsive to certain of said control signals for allowing the flow of operating power to said predetermined portions and responsive to said third signal for preventing the flow of operating power to said predetermined portions.

11. A radio telephone subscriber unit as in claim 10 wherein said control logic circuit means further includes circuitry responsive to said second enabling signal for generating a fourth signal if said hook switch is placed in the off-hook condition and wherein said power supply control means further includes circuitry responsive to said fourth signal for preventing the flow of operating power to said predetermined portions.

12. A radio telephone subscriber unit as in claim 11 wherein said control logic circuit means further includes circuitry responsive to said fourth signal for generating a third enabling signal and circuitry responsive to said third enabling signal for generating said first signal upon said hook switch being placed in the on-hook condition.

13. A radio telephone subscriber unit as in claim 12 wherein said control logic circuit means further includes circuitry responsive to the generation of said first signal in response to said third enabling signal for generating a disconnect signal sequence of predetermined duration and circuitry for generating a fifth signal upon termination of generation of said disconnect signal sequence and wherein said power supply control means further includes circuitry responsive to said fifth signal for preventing the flow of operating power to said predetermined portions.

14. A radio telephone subscriber unit for use in a two-way radio telephone system in which a radio telephone base terminal transmits an idle tone signal to identify an available radio channel, a seize tone signal to initiate a telephone call between the base terminal and a selected subscriber unit, a called number signal sequence to identify the selected subscriber unit, and a ringing signal sequence to notify the selected subscriber unit that that unit is being called, said radio telephone subscriber unit comprising a hook switch having on-hook and off-hook conditions, control logic circuit means for generating a first signal in response to the hook switch being placed in the off-hook condition, battery operated power supply means for supplying operating power for said subscriber unit, and power supply control means coupled between said battery operated power supply means and predetermined portions of said control logic circuit means and responsive to said first signal for allowing the flow of operating power to said predetermined portions.

15. A radio telephone subscriber unit as in claim 14 wherein said control logic circuit means further includes circuitry for generating a second signal if, after a first predetermined period of time, the idle tone signal is not being transmitted by the base terminal or if, after a second predetermined period of time, the idle tone signal is being transmitted by the base terminal, and wherein said power supply control means further includes circuitry responsive to said second signal for preventing the flow of operating power to said predetermined portions.

16. A radio telephone subscriber unit as in claim 15 wherein said control logic circuit means further includes circuitry for generating the second signal if, within a third predetermined period of time, the seize tone signal is not being transmitted by the base terminal.

17. A radio telephone subscriber unit as in claim 14 wherein said subscriber unit further includes means for producing dialed signal sequences for transmission to the base terminal, each such dialed signal sequence representing a digit of a called telephone number, wherein said control logic circuit means further includes circuitry for producing an identification signal sequence for transmission to the base terminal, said identification signal sequence for identifying said subscriber unit, circuitry for generating and enabling signal after production of the identification signal sequence, and circuitry responsive to said enabling signal when the hook switch is in the off-hook condition for generating a third signal if no dialed signal sequence is produced within a predetermined period of time after generation of said enabling signal or if no dialed signal sequence is produced within a predetermined period of time after the production of each dialed signal sequence, and wherein said power supply control means includes circuitry responsive to said third signal for preventing the flow of operating power to said predetermined portions.

18. A radio telephone subscriber unit as in claim 17 wherein said control logic circuit means further includes circuitry responsive to said enabling signal for generating said first signal when said hook switch is placed in the on-hook condition.

19. A radio telephone subscriber unit as in claim 18 wherein said control logic circuit means further includes circuitry responsive to the generation of said first signal when said hook switch is placed in the on-hook condition for generating a disconnect signal sequence of predetermined duration and circuitry for generating a fourth signal upon termination of generation of said disconnect signal sequence and wherein said power supply control means further includes circuitry responsive to said fourth signal for preventing the flow of operating power to said predetermined portions.

20. In a radio telephone system including a radio telephone base terminal for transmitting called number signal sequences and ringing signal sequences and at least one radio telephone subscriber unit, said subscriber unit including control logic means for producing control signals for controlling the operation of the subscriber unit, battery operated power supply means for supplying operating power to the subscriber unit, power supply control means interconnecting the battery operated power supply means with certain circuitry of the control logic means, microphone and earphone circuitry, and a hook switch for enabling transmission of voice signals to and reception of voice signals from the base terminal by means of the microphone and earphone circuitry respectively when the hook switch is in a first position and for disabling transmission of voice signals to and reception of voice signals from the base terminal when the hook switch is in a second position, a method of controlling the flow of operating power to said certain circuitry comprising the steps of a. enabling the flow of operating power to said certain circuitry when the base terminal transmits a seize tone signal, b. disabling the flow of operating power to said certain circuitry when any but a particular called number signal sequence is transmitted by the base terminal, c. disabling the flow of operating power to said certain circuitry upon termination of transmission of a ringing signal sequence by the base terminal if, upon such termination, the hook switch is in the second position, d. disabling the flow of operating power to said certain circuitry a predetermined period of time after the hook switch is placed in the first position following transmission of a ringing signal sequence, e. enabling the flow of operating power to said certain circuitry upon replacing the hook switch in the second position, and f. disabling the flow of operating power to said certain circuitry a predetermined period of time after the replacement of the hook switch in the second positionn.

21. In a radio telephone system including a radio telephone base terminal for transmitting called number signal sequences and ringing signal sequences and at least one radio telephone subscriber unit, said subscriber unit including control logic means for producing control signals for controlling the operation of the subscriber unit, battery operated power supply means for supplying operating power to the subscriber unit, power supply control means interconnecting the battery operated power supply means with certain circuitry of the control logic means, means for producing dialed signal sequences for transmission to the base terminal, means for producing an identification signal sequence, microphone and earphone circuitry, and a hook switch for enabling transmission of voice signals to and reception of voice signals from the base terminal by means of the microphone and earphone circuitry respectively when the hook switch is in a first position and for disabling transmission of voice signals to and reception of voice signals from the base terminal when the hook switch is in a second position, a method of controlling the flow of operating power to said certain circuitry comprising the steps of a. enabling the flow of operating power to said certain circuitry when the hook switch is placed in the first position, b. disabling the flow of operating power to said certain circuitry if, after a first predetermined period of time, an idle tone signal is not being transmitted by the base terminal or if, after a second predetermined period of time, an idle tone signal is being transmitted by the base terminal, c. disabling the flow of operating power to said certain circuitry if, within a third predetermined period of time, a seize tone signal is not being transmitted by the base terminal, d. disabling the flow of operating power to said certain circuitry when no dialed signal sequence is produced within a predetermined period of time following production of the identification signal sequence or when no dialed signal sequence is produced within a predetermined period of time following production of a previous dialed signal sequence, e. enabling the flow of operating power to said certain circuitry upon replacing the hook switch in the second position, and f. disabling the flow of operating power to said certain circuitry a predetermined period of time after the replacement of the hook switch in the second position.

22. A radio telephone subscriber unit for use in a radio telephone system in which a radio telephone base terminal identifies a selected subscriber unit by transmitting a called number signal sequence representing that subscriber unit's identification number and then notifies the selected subscriber unit by transmitting an audio ringing signal sequence, said subscriber unit comprising a receiver for receiving signals transmitted by the base terminal, a speaker for generating audible signals, an amplifier responsive to audio signals applied thereto for actuating said speaker in accordance with the audio signals control logic means responsive to the receipt by the subscriber unit of a particular called number signal sequence for generating a control signal, and means coupled between said receiver and said amplifier and responsive to said control signal for applying to said amplifier ringing signal sequences received by said receiver.

23. A radio telephone subscriber unit as in claim 22 wherein said control logic means further includes circuitry responsive to the receipt by the subscriber unit of said particular called number signal sequence for causing said amplifier to increase its gain by a predetermined amount.

24. A radio telephone subscriber unit for use in a radio telephone system in which a radio communication channel may be established and maintained between the subscriber unit and a radio telephone base terminal so long as a radio signal is transmitted between the base terminal and subscriber unit within a predetermined interval of time following establishment of the channel or following any transmission of a radio signal, said subscriber unit comprising a transmitter for transmitting radio signals over the radio communication channel, and control logic means for monitoring said transmitter to determine when radio signals are being transmitted and for actuating said transmitter to transmit a radio signal burst if no signals were transmitted by the transmitter in a preceding predetermined time interval.

25. The radio telephone subscriber unit as in claim 24 further including means for generating modulating signals, and wherein said transmitter includes means for generating radio signals, means for applying the radio signals to the radio communication channel, gating means coupled between said radio signal generating means and said applying means and responsive to the presence of an enabling signal for allowing passage of signals from said radio signal generating means to said applying means, and activating means responsive to the presence of an activating signal from said control logic means and to the presence of said modulating signals for producing an enabling signal of duration substantially equal to the duration of the activating signal or modulating signal present.

26. The radio telephone subscriber unit as in claim 25 wherein said control logic means includes means coupled to said activating means for generating a first signal whenever said enabling signal is being produced and for generating a second signal whenever said enabling signal is not being produced, and timing means responsive to the generation of said second signal for producing an activating signal of certain duration after a predetermined time interval unless said first signal is generated within that time interval.

27. The radio telephone subscriber unit as in claim 26 wherein said timing means includes a capacitor, means responsive to said second signal for enabling said capacitor to charge and responsive to said first signal for discharging said capacitor, and trigger circuit means for producing said activating signal and discharging said capacitor when the voltage across said capacitor reaches a predetermined level.

28. A radio telephone subscriber unit as in claim 24 wherein said control logic means includes means for producing a first signal when a particular signal sequence is transmitted by the base terminal, means for producing a second signal following transmittal of said particular signal sequence by the subscriber unit, and means responsive to said first and second signals for activating said transmitter to transmit said signal burst if no signals are transmitted by the transmitter within a particular time interval.

29. A radio telephone subscriber unit as in claim 28 wherein said transmitter includes means for generating radio signals, means for applying the radio signals to a radio communication channel, activating means including an output line and responsive to an activating signal from said control logic means for applying a gating signal of predetermined duration to said output line, gating means coupled between radio signal generating means and said applying means and responsive to the presence of said gating signal on said output line for enabling signals from said radio signal generating means to be applied to said applying means, and wherein said control logic means includes means for generating control signals for establishing a radio communication channel between the subscriber unit and the base terminal and means responsive to various ones of said control signals for applying gating signals to said output line.

30. A radio telephone subscriber unit for use in a radio telephone system which includes a radio telephone base terminal which transmits a plurality of radio signals for establishing a radio link-up with the subscriber unit, said subscriber unit including means for receiving the radio signals transmitted by the base terminal and for generating digital signals representing such radio signals, said digital signals including combinations of idle tone signal bursts and seize tone signal bursts, each combination representing a digit of a subscriber unit identification number, and a control logic unit for producing a plurality of control signals to control the operation of the subscriber unit, said control logic unit including timing means for producing a plurality of timing signals at predetermined timing intervals following activation of the timing means, and timing control means responsive to certain ones of said digital signals and said control signals for resetting and activating said timing means at certain times during the course of establishing the radio link-up, responsive to certain other of said digital signals in said control signals for resetting and deactivating said timing means at certain other times during the course of establishing the radio link-up, and responsive to each idle tone signal burst and each seize tone signal burst of a combination for resetting and activating said timing means.

31. A radio telephone subscriber unit as in claim 30 wherein said control logic unit further includes means for producing a first signal when a particular combination of idle and seize tone signal bursts is generated, and wherein said timing control means further includes circuitry responsive to said first signal for resetting and deactivating said timing means.

32. A radio telephone subscriber unit as in claim 30 wherein said control logic unit further includes means for producing a second signal after a particular combination of idle and seize tone signal bursts has been generated, and wherein said timing control means further includes circuitry responsive to said second signal for resetting and activating said timing means.

33. A radio telephone subscriber unit as in claim 30 further including a hook switch having on-hook and off-hook conditions, and wherein said control logic unit further includes means for producing a third signal when said hook switch is placed in the off-hook condition following generation of a particular combination of idle and seize tone signal bursts, and wherein said timing control means further includes circuitry responsive to said third signal for resetting and activating said timing means.

34. A radio telephone subscriber unit as in claim 33 wherein said control logic unit further includes means for producing a fourth signal when said hook switch is replaced in the on-hook condition, and wherein said timing control means further includes circuitry responsive to said fourth signal for resetting and activating said timing means.

35. A radio telephone subscriber unit which includes a radio telephone base terminal which transmits a plurality of radio signals for establishing a radio link-up with the subscriber unit, said subscriber unit including means for receiving the radio signals transmitted by the base terminal and for generating digital signals representing such radio signals, a hook switch having on-hook and off-hook conditions, a logic unit for producing a first signal when said hook switch is placed in the off-hook condition, timing means for producing a plurality of timing signals at predetermined timing intervals following activation of the timing means, and timing control means responsive to said first signal for resetting and activating said timing means, responsive to a particular timing signal produced by said timing means following production of said first signal for resetting and deactivating said timing means, and responsive to a particular digital signal for thereafter activating said timing means.

36. A radio telephone subscriber unit as in claim 35 wherein said control logic unit further includes means for producing a second signal when said hook switch is replaced in the on-hook condition and wherein said timing control means further includes circuitry responsive to said second signal for resetting and activating said timing means.

37. A radio telephone subscriber unit for use in a radio telephone system having a radio telephone base terminal which transmits a called number signal sequence specifying a subscriber unit identification number, said subscriber unit comprising:

means for receiving said signal sequence, means for producing a first plurality of digital counts, each of said counts representing the value of a different one of the digits of the identification number specified by said signal sequence, means for successively storing each of said counts, means for producing a second plurality of digital counts, each representing the value of a different one of the digits of an identification number assigned to said subscriber unit, means for comparing each count stored in said storing means with a corresponding count produced by said second plurality producing means, means responsive to said comparing means for producing a parity signal each time a pair of compared counts match, means for clearing said storing means each time a parity signal is produced in preparation for storing the succeeding count, means for causing said second plurality producing means to produce the succeeding count of the second plurality each time a parity signal is produced, means for producing a no-parity signal each time a pair of compared counts fails to match, means for generating a last-digit signal if all pairs of compared counts match, timing means for producing a time-out signal a predetermined period of time after each parity signal is produced unless a succeeding digital count is stored in said storing means within said predetermined period or unless a last-digit signal is generated, and means responsive to said no-parity signal or said time-out signal for deactivating a predetermined portion of the subscriber unit components.

38. A radio telephone subscriber unit as in claim 37 wherein said storing means comprises a binary counter and said second plurality producing means includes circuitry for producing binary counts.

39. A radio telephone subscriber unit as in claim 37 further including means for successively generating a pulse signal, means responsive to said pulse signals for transmitting to the base terminal radio signals representing said pulse signals, means for applying each pulse signal to said storing means to thereby cause said storing means to increase its count by one, means responsive to said parity signal for temporarily inhibiting the generation of pulse signals to allow for clearing said storing means and to allow said second plurality of producing means to produce a succeeding count of the second plurality of counts, the resulting radio signals transmitted to the base terminal thereby representing the identification number assigned to the subscriber unit.

40. A radio telephone subscriber unit as in claim 39 further including means for inhibiting further generation of pulse signals after a predetermined number of counts has been produced by said second plurality of producing means.

41. A radio telephone subscriber unit for use in a radio telephone system having a radio telephone base terminal which transmits a called number signal sequence specifying a subscriber unit identification number, said subscriber unit comprising:

means for receiving said signal sequence, means for producing a first plurality of digital counts, each of said counts representing the value of a different one of the digits of the identification number specified by said signal sequence, means for successively storing each of said counts, means for producing a second plurality of digital counts, each representing the value of a different one of the digits of an identification number assigned to said subscriber unit, means for comparing each count stored in said storing means with a corresponding count produced by said second plurality producing means, means responsive to said comparing means for producing a parity signal each time a pair of compared counts match, means for clearing said storing means each time a parity signal is produced in preparation for storing the succeeding count, means for causing said second plurality producing means to produce the succeeding count of the second plurality each time a parity signal is produced, and wherein said second plurality producing means comprises decoder means having a plurality of output lines, each representing a different digit of the identification number assigned to the subscriber unit, and responsive to said parity signals for successively energizing each of said output lines, decimal-to-binary converter means having a plurality of input lines, each representing a different of the decimal digits, and responsive to the energization of an input line for producing a binary count equivalent to the value of the decimal digit represented by that input line, and, means for connecting said output lines to various ones of said input lines so that as the output lines are successively energized the converter means is caused to produce a plurality of counts representing the identification number assigned to the subscriber unit.

42. A radio telephone subscriber unit as in claim 41 further including a mode switch having a manual position and an automatic position and means for generating a first signal when said mode switch is in the manual position and for generating a second signal when the mode switch is in the automatic position, and wherein said decoder means includes means responsive to said first signal for energizing a different one of a first set of said output lines in response to said parity signal and means responsive to said second signal for energizing a different one of a second set of said output lines in response to said parity signal.

* * * * *